US009134178B2

(12) United States Patent
Kurtz et al.

(10) Patent No.: US 9,134,178 B2
(45) Date of Patent: *Sep. 15, 2015

(54) OBSERVER METAMERIC FAILURE COMPENSATION METHOD

(75) Inventors: Andrew F. Kurtz, Macedon, NY (US); Elena A. Fedorovskaya, Pittsford, NY (US); Thomas O. Maier, Rochester, NY (US)

(73) Assignee: IMAX Corporation, Mississauga, Ontario ( * ) Notice: Subject to any disclaimer, the term of this patent is extended or adjusted under 35 U.S.C. 154(b) by 206 days.

This patent is subject to a terminal disclaimer.

(21) Appl. No.: 13/559,638

(22) Filed: Jul. 27, 2012

(65) Prior Publication Data

US 2014/0028697 A1 Jan. 30, 2014

(51) Int. Cl.
| G09G 5/02 | (2006.01) |
| G06K 9/00 | (2006.01) |
| G03F 3/08 | (2006.01) |
| G01J 3/46 | (2006.01) |
| H04N 9/31 | (2006.01) |
| H04N 9/67 | (2006.01) |
| H04N 1/58 | (2006.01) |

(52) U.S. Cl.
CPC . *G01J 3/465* (2013.01); *H04N 1/58* (2013.01); *H04N 9/3161* (2013.01); *H04N 9/3182* (2013.01); *H04N 9/67* (2013.01)

(58) Field of Classification Search
USPC ............ 345/589, 690; 382/162, 167; 358/518
See application file for complete search history.

(56) References Cited

U.S. PATENT DOCUMENTS

| 4,941,039 | A | 7/1990 | E'Errico | |
| 5,557,712 | A | * | 9/1996 | Guay ............................ 345/611 |
| 5,583,666 | A | * | 12/1996 | Ellson et al. ................... 358/518 |
| 6,337,923 | B1 | * | 1/2002 | Yoon et al. ..................... 382/167 |
| 6,816,284 | B1 | | 11/2004 | Hill et al. |
| 7,362,336 | B2 | | 4/2008 | Miller et al. |
| 8,085,476 | B2 | | 12/2011 | Silverstein et al. |
| 2002/0031258 | A1* | | 3/2002 | Namikata ...................... 382/165 |

(Continued)

FOREIGN PATENT DOCUMENTS

| EP | 2375230 A1 | 10/2011 |
| WO | 2010/085505 | 7/2010 |

OTHER PUBLICATIONS

Wyszecki and Stiles, *Color Science*, 2$^{nd}$ Ed., John Wiley & Sons, New York, pp. 817-822 (1982).

(Continued)

*Primary Examiner* — Jason M Repko
*Assistant Examiner* — Yi Yang
(74) *Attorney, Agent, or Firm* — Kilpatrick Townsend & Stockton LLP

(57) ABSTRACT

A method for color correcting an input color image having input color values adapted for display on a reference display device having a plurality of input color primaries to account to provide reduced observer metemaric failure on a narrow-band display device. A metamerism correction transform is applied to the input color image to determine an output color image having output color values in an output color space appropriate for display on the narrow-band display device. The metamerism correction transform modifies colorimetry associated with the input colors to provide output color values such that an average observer metameric failure is reduced for a distribution of target observers.

22 Claims, 31 Drawing Sheets

(56) References Cited

U.S. PATENT DOCUMENTS

| | | | | |
|---|---|---|---|---|
| 2003/0081831 | A1* | 5/2003 | Fukao et al. | 382/167 |
| 2006/0152524 | A1* | 7/2006 | Miller et al. | 345/589 |
| 2008/0239334 | A1* | 10/2008 | Jasinski et al. | 358/1.6 |
| 2010/0014072 | A1* | 1/2010 | Bosselmann et al. | 356/73.1 |
| 2011/0175925 | A1* | 7/2011 | Kane et al. | 345/589 |
| 2011/0261050 | A1* | 10/2011 | Smolic et al. | 345/419 |
| 2011/0310303 | A1* | 12/2011 | Marcus et al. | 348/649 |
| 2012/0133649 | A1* | 5/2012 | Reder | 345/419 |
| 2013/0033528 | A1* | 2/2013 | Sarkar et al. | 345/690 |

OTHER PUBLICATIONS

Thornton and Hale, "Color-imaging primaries and gamut as prescribed by the human visual system," Proc. SPIE, vol. 3963, pp. 28-35 (2000).

Ramanath, "Minimizing observer metamerism in display systems," Color Research and Application, vol. 34, pp. 391-398 (2009).

Koenig et al., "A Multiprimary Display: Discounting Observer Metamerism," Proc. SPIE, vol. 4421, pp. 898-901 (2002).

Fairchild and Wyble, "Mean observer metamerism and the selection of display primaries," Proc. 15$^{th}$ Color Imaging Conference, pp. 151-156 (2007).

Bergquist, "Display with arbitrary primary spectra," SID Digest, vol. 39, pp. 783-786 (2008).

Sarkar et al., "Toward reducing observer metamerism in industrial applications: colorimetric observer categories and observer classification," Proc. 18$^{th}$ Color Imaging Conference, pp. 307-313 (2010).

Trezona, "Individual observer data for the 1955 Stiles-Burch 2° pilot investigation," J. Opt. Soc. Am. A., vol. 4, pp. 769-782 (1987).

H.R. Kang, *Computational Color Technology*, Society of Photo-Optical Engineers, Bellingham, WA, Section 3.5, pp. 39-41, (2006).

Brainard, "Cone contrast and opponent modulation color spaces," in *Human Color Vision*, 2$^{nd}$ edition, Ed. Kaiser and Boynton, Optical Society of America, Washington, DC., pp. 563-579 (1996).

Silverstein et al., "A laser-based digital cinema projector," SID Symposium Digest, vol. 42, pp. 326-329 (2011).

\* cited by examiner

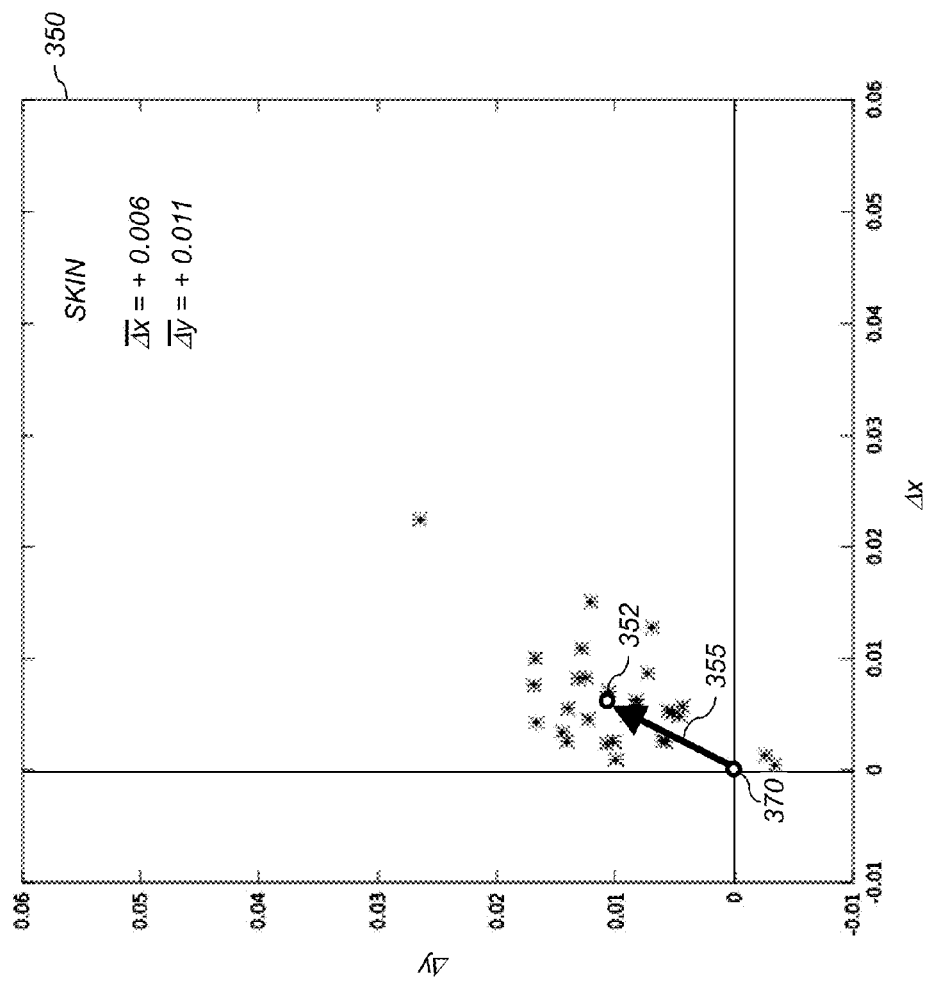

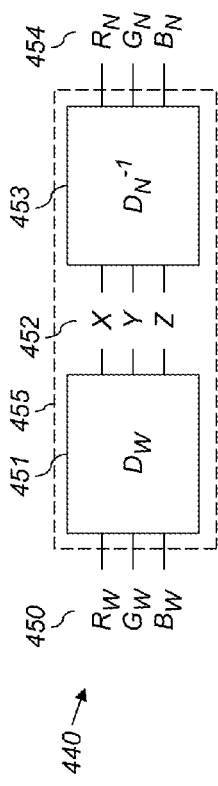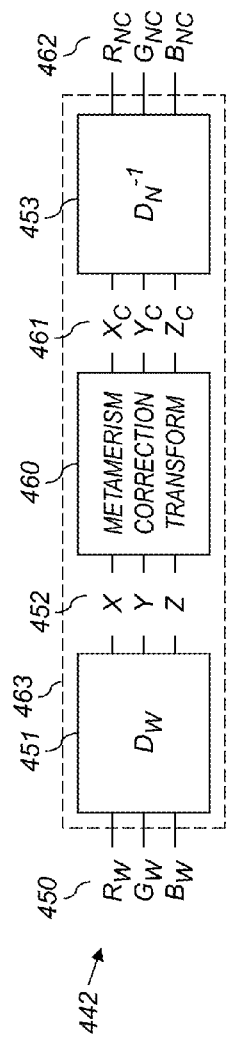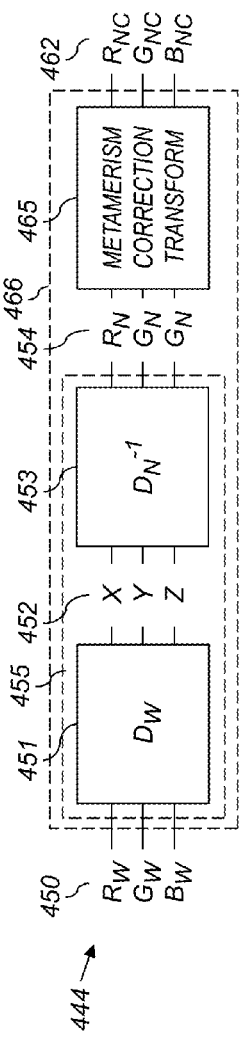
FIG. 8A (Prior Art)
FIG. 8B
FIG. 8C

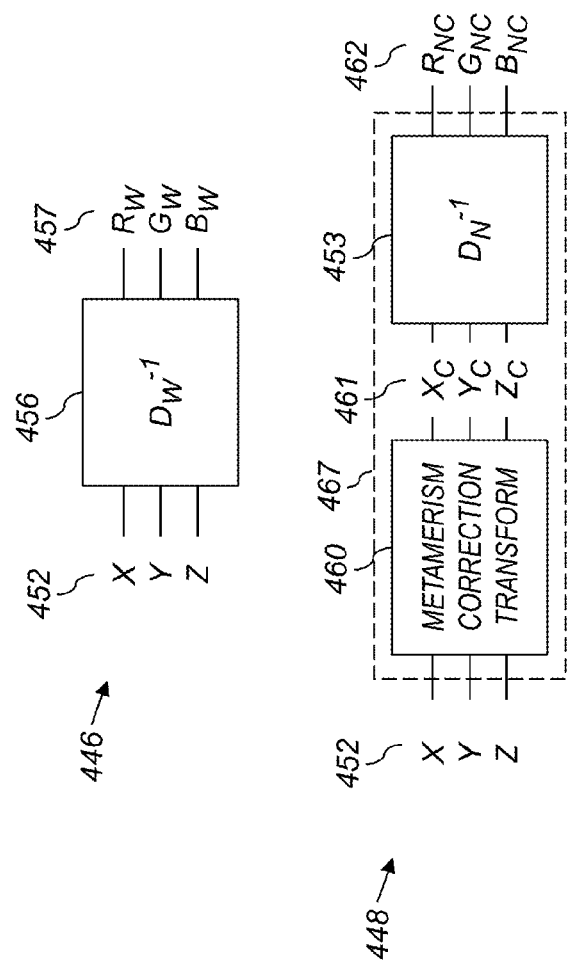

OBSERVER METAMERIC FAILURE COMPENSATION METHOD

CROSS-REFERENCE TO RELATED APPLICATIONS

Reference is made to commonly assigned, co-pending U.S. patent application Ser. No. 13/559,647, entitled: "Observer metameric failure reduction method", by Maier et al.; and to commonly assigned, co-pending U.S. patent application Ser. No. 13/559,651, entitled: "Display system providing observer metameric failure reduction", by Kurtz et al., each of which is incorporated herein by reference.

FIELD OF THE INVENTION

The present invention relates to the field of digital display systems with narrow-band primaries, and more particularly to methods for reducing the experience of observer metameric failure.

BACKGROUND OF THE INVENTION

The motion picture industry is presently transitioning from traditional film based projectors to digital or electronic cinema. This trend is accelerating due to the popularity of 3-D movies. Even as digital cinema projection has matured and succeeded, largely based on the use of the well-known Digital Light Projection (DLP) technology, the promise of a further evolution to laser-based projection has been hovering in the background. Laser projection, whether for digital cinema, home projection, or other markets, has long been held back due to the cost and complexity of the laser sources, particularly in the green and blue spectral bands. As the necessary lasers are now becoming increasingly mature and cost competitive, the potential benefits expected from laser projection, including the larger color gamut, more vivid, saturated and brighter colors, high contrast, and low cost optics are increasingly being realized. An exemplary system is described in the paper "A Laser-Based Digital Cinema Projector", by B. Silverstein et al. (SID Symposium Digest, Vol. 42, pp. 326-329, 2011).

Additionally, other commonly recognized laser projection problems, including the reduction of the visibility of laser speckle and the management of laser safety to reduce eye exposure risk or hazard potential, are increasingly being addressed in a satisfactory manner. As these issues are resolved, other less recognized issues will become increasingly important. As one example, image displays with narrow-bandwidth light sources, including lasers, can suffer from observer metameric failure, such that individual viewers can perceive significantly different colors.

In the field of color science, metamerism is the visual perception of color matching for color stimuli having different spectral power distributions. Two stimuli that have the same broadband spectral power distribution are said to be isomers, and will generally be seen as identical color matches by all observers. Whereas, two colors that appear identical to an observer but which have different spectral power distributions are called metamers. Due to differences in spectral sensitivity among observers, a metamer for one observer may not be a metamer for all observers. The greater the spectral differences between a pair of metameric stimuli, the more sensitive the color perception of that metameric pair will be to any changes in the illuminant, material compositions, observers, or field of view.

As can then be anticipated, there are various circumstances in which the spectral differences of a nominal metameric pair can lead to metameric failure, in which the expected color match is no longer perceived. As a first example, observer metameric failure (sometimes referred to as observer color perception variability) occurs when the color of two objects, or two elements in a displayed image, are perceived differently by two or more observers in the same viewing conditions. Observer metameric failure occurs because the optical system of the eyes, the color receptor response, and neural color processing varies among individuals. As another example, illuminant metameric failure occurs when colors match under one light source, but not another. For example, two color patches with different reflectance spectra can appear to be identical, providing the same color appearance when viewed under daylight illumination. However, then when viewed under fluorescent illumination, the color patches can appear differently, even to a single observer. Conditions of metameric failure are further defined to include field-size metameric failure and geometric metameric failure. Field-size metameric failure occurs because the relative proportions of the three cone types in the retina vary from the center to the periphery of the visual field. This is exemplified by the differences observed in the CIE standard observer color matching functions for 2° and 10° viewing fields (see FIG. 1B). Therefore, colors that match when viewed as very small, centrally fixated areas can appear different when presented over large color areas. Geometric metameric failure can occur when two samples match when viewed from one angle, but fail to match when viewed from a different angle. For the purposes of the present invention, observer metameric failure and illuminant metameric failure are of predominant interest.

One method to prevent metameric failure from occurring is to construct color imaging systems based on spectral color reproduction. Such systems would be based on the principle of isomers, with the relative spectral power distribution of scene color being carefully captured and then reproduced. A famous example is the Lippmann two-step method of photography introduced in 1891, in which color images were made and viewed essentially using spectral color reproduction, or regeneration of the captured scene's wavelength spectrum. However, such systems are complex, radiometrically inefficient, and sensitive to viewing angles. Therefore they have never come into wide use.

The fact that the human visual system has only three types of cone photoreceptors makes it possible for two stimuli to match in perceived color without having identical spectral power distributions, and thus metameric color matching occurs. In particular, each type of cone, red (long), green (medium), or blue (short), responds to the cumulative or integrated energy from a broad range of wavelengths. As a result, different combinations of light across all wavelengths can produce an equivalent receptor response. As long as the integrated responses of the three cone types are equal, for one spectrum compared to another, the stimuli will represent a metameric match, and will have the same perceived color to the observer.

Most practical color imaging systems use a limited set of colorants (typically three or four) and rely on the phenomenon of metamerism to produce color images having the desired color appearance, even though the reproduced color spectra will generally not match the original color spectra. The comparative amounts of the colorants provided by the color imaging system are adjusted to produce a color which will appear to closely match the original scene color. Modern color imaging systems are optimized to provide close color matches between the original and the reproduction for as many important colors as possible, relative to a standard observer, or set of observers.

As suggested previously, the phenomenon of metamerism, in which color matches occur despite spectral differences, is prone to failure. In general, metamerism depends on the interaction of the light source spectrum with the spectral reflectance/transmittance properties of the materials illuminated with the light, and the spectral response of the observer (or the camera sensor). Color perception among color normal observers varies depending on pre-retinal filtering in the optical media (cornea, lens, and humors), macular photo pigment density, cone distribution differences, color neural processing differences, and differences in cone spectral sensitivity. Human color perception can be measured using color matching functions (CMFs), which vary among individuals and are known to change with age. FIG. 1A illustrates twenty sets of color matching functions 300 measured for a set of different individuals having "normal" color vision, for 10° observational fields, using data from Table 1(5.5.6) in the book "Color Science" by Wyszecki and Stiles ($2^{nd}$ Ed., John Wiley & Sons, New York, pp 817-822, 1982). In particular, FIG. 1A shows that color sensitivity can vary significantly among individual observers, with significant local variations of 5-10% or more at many wavelengths.

The Commission International de l'Eclairage (CIE) has documented color matching functions for two different standard observers: a 2° 1931 CIE standard observer and a 10° 1964 CIE standard observer. FIG. 1B compares the CIE 2° color matching functions 300a and CIE 10° color matching functions 300b. It is noted that the CIE 10° color matching functions 300b deviate from the CIE 2° color matching functions 300a in each of the red, green, and blue portions of color space, but the biggest differences occur in blue portion of color space. In particular, the largest differences occur in the blue (<500 nm), as the blue (short) color matching function response peaks ~10% higher for the CIE 10° color matching functions 300b compared to the CIE 2° color matching functions 300a. Additionally, both the green (middle) and red (long) color matching functions crosstalk into the blue spectral range, and the color response differences between the respective CIE 2° color matching functions 300a and the CIE 10° color matching functions 300b are larger in the blue than in many portions of the red and green color spectra. In particular, above 540 nm, the blue color matching function lacks significant response with only two color matching functions (red and green) contributing significantly to the perception of color samples, the color differences between these cones being comparatively smaller. Also, the presence of the short wavelength "blue" cones is very small in the fovea and increases on the periphery. These differences reflect the fact that metameric color perception differences can be observed for different observational field sizes and can vary with wavelength.

Under normal circumstances, for example in daylight viewing conditions, the most common source of observer metameric failure is colorblindness (i.e., impaired color vision) among one or more observers. However, as the spectral properties of a light source or an object's reflectivity narrow and become more complex, and lack spectral color diversity, significant observer metameric failure can occur even amongst individuals who are considered to have normal color vision.

Systems (e.g., displays) that utilize narrow-band color primaries are most susceptible to observer metameric failure effects. Therefore, it can be anticipated that viewers of laser based displays, including digital laser projectors, and other displays with narrow spectrum primaries (such as LEDs), may experience observer metameric failure. While the expanded color gamut that laser displays can offer has been eagerly anticipated, in reality, it will include many wide-gamut colors that are not only outside of a conventional film or CRT display color gamut, but which are also seldom seen in nature. As a result, differences in color perception among observers of such very saturated colors at or near the gamut boundary may be hard to describe or quantify. On the other hand, color perception differences among observers for gamut colors of typical devices, and particularly for memory colors, such as sky blue, skin tones, or grass greens, which occur minimally with broadband light sources, can occur more frequently and dramatically with narrow-band light sources like lasers.

In the case of digital cinema, significant differences in color perception among expert observers viewing content involving memory colors in a color suite or screening room, may lead to significant dissatisfaction. For example, one expert observer may state that a displayed skin tone looks too green, while another may state that it looks too red. In such settings, problems can also emerge when comparing the narrow-band or laser displays to a broadband display that is an accepted standard. Moreover, even if a group of expert observers are satisfied, some members of a broader audience may not be, and such experiences may lead to dissatisfaction that may ultimately affect marketplace success of a narrow-bandwidth display technology.

Some approaches to mitigate the problem of observer metameric failure have been previously suggested or demonstrated. As an example, Thornton and Hale, in the paper "Color-imaging primaries and gamut as prescribed by the human visual system" (Proc. SPIE, Vol. 3963, pp. 28-35, 2000), consider the problem of observer metameric failure reduction for an additive color display systems having three narrow-band primaries ($\Delta\lambda$~10 nm full-width-half-maximum (FWHM)). The authors proposed that to reduce the effects of observer metameric failure, the color primaries should preferentially be close to the so-called "prime wavelengths" (450, 540, and 610 nm) which are at or near the peaks of the three spectral sensitivities of the normal human visual system. Thornton et al. are not clear about how much improvement their method would be expected to yield. The Thornton prime wavelength primaries are overlaid on the color matching functions 300 in FIG. 1A as Thornton red laser primary 432, Thornton green laser primary 434 and Thornton blue laser primary 436. Also shown for comparison are a typical set of laser primaries for the exemplary laser projection system described in the aforementioned paper by Silverstein et al., including red laser primary 422, green laser primary 424 and blue laser primary 426.

In a more recent paper, "Minimizing observer metamerism in display systems," by Ramanath, (Color Research and Application, Vol. 34, pp. 391-398, 2009), observer metameric failure for different types of displays having three primaries is examined. In particular, Ramanath explores the comparative occurrence of observer metameric failure among different electronic display devices, including CRT displays, LCD, DLP and LED based displays, a CCFL (cold cathode fluorescent lamp) based display, and a laser display. Ramanath concludes that observer metameric failure can occur more frequently, and provide greater perceived color differences, as the display spectrum narrows (smaller FWHM) or the number of modes in the display spectrum increases. As a result, the laser display and CCFL display, which lack spectral color diversity due to narrow or multi-modal spectra, have a high propensity to cause observer metameric failure. By comparison, the CRT and lamp based DLP displays, which have broad primaries ($\Delta\lambda \approx 60$-70 nm FWHM), exhibit low potential for observer metameric failure. In the case of laser displays, where the spectral bandwidths can easily be 2 nm or less in width, a small expansion of the lasing bandwidths, at the cost of a small color gamut decrease, would provide a reasonable trade-off if observer metameric failure is significantly decreased. However, Ramanath found that spectral distributions with moderate FWHM bandwidths ($\Delta\lambda \sim 28$ nm), such as LED illuminated displays, can still produce significant perceptible observer metameric failure, suggesting that reductions in observer metameric failure may not come quickly with increases in spectral bandwidth.

Ramanath also builds on the work of Thornton, and provides a modeled "ideal" set of primary spectral power distributions (SPDs) for a three primary display having primaries with spectral peaks close to the Thornton primaries, that may reduce the difference between the colors seen by a reference observer and a non-reference observer. In particular, Ramanath proposes that three broadband color channels or primaries, a blue primary with peak power at 450 nm and a bandwidth of $\Delta\lambda \sim 49$ nm, a green primary with peak power at 537 nm and a bandwidth of $\Delta\lambda \sim 80$ nm, and a red primary with peak power at 615 nm and a bandwidth of $\Delta\lambda \sim 56$ nm, will provide the least susceptibility to observer metameric failure. However, taken together, these two papers suggest that a three primary display having color spectra with preferential locations per Thornton, but moderate bandwidths (e.g., $\Delta\lambda \sim 30$ nm) will still exhibit significant metameric failure among observers. Thus, the guidance for minimizing observer metameric failure in a system with three narrow-bandwidth primaries is even less clear.

Other researchers have suggested that observer metamerism can be reduced by using more than three color primaries or color channels. In the paper "A multiprimary display: discounting observer metamerism" (Proc. SPIE, Vol. 4421, pp. 898-901, 2002), Konig et al. describe an image display system having six primaries that is used to display metamers and reduce observer metameric failure. This paper states that imaging systems having only three color signals as input (e.g. RGB values or L*a*b* values) cannot produce color reproductions that are precise for all human observers, as information is not available on how different observers perceive the original color. That is, the color vision response of the human visual system for an observer cannot be directly measured to determine how the primaries can be optimized. By comparison, the authors propose that a multiprimary display having more than three primaries introduces additional degrees of freedom for displaying a given color, such that perceptual color differences can be reduced for each observer. In particular, Konig et al. find that a multispectral display having more than three broadband primaries can provide both a large color gamut and the spectral control to reproduce color for each pixel by spectral color reproduction, such that observer metameric failure is minimized. An exemplary multi-spectral display is described, using two LCD projectors that provided overlapped images to a screen, that together provide an extended color gamut. This display has six broad bandwidth ($\Delta\lambda \sim 40$-100 nm FWHM) primaries, where one projector provides RGB images, and the second provides CMY images.

Fairchild and Wyble, in their paper "Mean observer metamerism and the selection of display primaries", (Proc. 15th Color Imaging Conference, pp. 151-156, 2007), express concern about observer metameric failure occurring during the use of narrow-band primary displays, such as laser digital cinema projectors, causing consternation among filmmakers during "image proofing". This paper models and compares differences in color perception for a display having broad bandwidth RGB primaries approximated by Gaussians having FWHM bandwidths of $\Delta\lambda \sim 100$ nm, and a second display with narrow-band primaries having FWHM bandwidths of $\Delta\lambda \sim 5$ nm, where the peak wavelengths of the color primaries were selected to be close to Thornton's prime wavelengths (450, 540, and 610 nm). After modeling age- and field-dependent color perception differences in terms of color matching functions (CMFs) and $\Delta E^*$ color differences, Fairchild and Wyble conclude that color errors with displays having only three narrow-band primaries, such as laser projector, will be too large to be acceptable for critical color applications. The authors then suggest that display manufacturers, in developing displays capable of wider color gamut and greater luminance contrast, should abandon development of such narrow-band primary systems and redirect their efforts to systems that support spectral color reproduction. In particular, the authors suggest that emergent displays with large color gamut and enhanced luminance contrast should use multiple (N>3) wide-band primaries.

The paper "Display with arbitrary primary spectra" (SID Digest, Vol. 39, pp. 783-786, 2008), by Bergquist, provides an example of a multi-spectral display that attempts to reduce observer metameric failure. A field-sequential color display is described having a temporally-averaged, modulated array of N=20 Gaussian light sources (such as LEDs), each having FWHM bandwidths of $\Delta\lambda \sim 30$ nm, to approximate the spectrum of a color to be reproduced on the display. In this way, Bergquist provides a spectral reproduction system that synthesizes an approximation of the physical signal rather than emulating the sensation of color using superposition of a reduced set of narrowband primaries. Observer metameric failure is then reduced as compared to colorimetric matching, as a given observer would find the original scene and its reproduction to be identical (as the original and reproduced spectra are essentially identical). As a result, good agreement would be found among most observers, including many with color vision deficiencies, regardless of their interpretation of the sensation and the name they would give to a scene color. While the method is successful at reducing observer metameric failure, it requires many additional channels (N>>3) of color information at the capture stage (multispectral capture), and increased complexity in signal processing and display. None of this additional complexity is readily compatible with the image capture, processing, and display infrastructure of today or of the foreseeable future.

As another approach, Sarkar et al., in the paper "Toward reducing observer metamerism in industrial applications: colorimetric observer categories and observer classification" (Proc. 18th Color Imaging Conference, pp. 307-313, 2010), analyzed the Wyszecki and Stiles data and identified seven distinct groupings or categories of observers, for whom color vision, as measured by the respective CMFs, is statistically similar. With the goal of reducing observer metameric failure when using wide gamut displays, the authors suggest that a method for observer-dependent color imaging can be developed wherein the color workflow is tuned to match one of several observer classes. Of course, application of this method requires the classification of observers based on their color vision. While this approach might work for personalized color processing or small groups of people, it would not be extensible to helping the random assemblage of people present in a cinematic audience.

U.S. Pat. No. 6,816,284 to Hill et al., entitled "Multispectral color reproduction system with nonlinear coding," provides a system that alters the color data captured by a multispectral camera using an encoding method that reduces the large amount of data required to represent the spectral information without causing a noticeable loss of the color information visible to an observer. As such, this patent is enabling data friendly spectral color reproduction as a means for reducing observer metameric failure when using N≥4 multi-primary displays.

Commonly assigned U.S. Pat. No. 7,362,336 to Miller et al., entitled "Four color digital cinema system with extended color gamut and copy protection," discloses a multi-primary display having N≥4 narrow-band color channels that uses metameric matching to provide copy protection. In particular, it provides that selective rendering of portions of an image or image sequence can provide metameric matches by using the different combinations of primaries to provide the same color, but with varying spectral compositions, on a frame to frame basis. As such, the altered image portions can look similar to the human observers, but will look different to cameras that can be used to illicitly capture images from a projection or video screen. This approach exploits a special case of "observer" metameric failure that occurs between people and cameras to achieve the desired effect of copy protection, rather than reducing the occurrence of observer metameric failure among human observers.

In summary, while observer metameric failure has been identified as a problem that can affect display systems using narrow-band primaries, adequate solutions have not yet been suggested, particularly for displays having three primaries. The primaries used for the laser projection systems have narrow spectral bands. This leads to an increased color gamut and capacity to display highly saturated colors. At the same time, compared with existing reference displays, metameric mismatches are more frequent. Similarly, issues related to observer metameric failure in laser projection displays have also been documented.

The solutions offered to date are either incomplete, or require larger numbers of primaries (N>3) that preferentially have much wider spectra than lasers have, or require observer color matched displays. Thus, there remains a need for design approaches or operational methods that significantly reduce observer metameric failure for displays using narrow-band primaries without requiring observer-dependent color tuning or more than three primaries.

SUMMARY OF THE INVENTION

The present invention represents a method for color correcting a color image to account for color vision characteristics associated with a set of target observers in preparation for displaying the color image on a color display device having a plurality of device color primaries, at least one of the device color primaries being a narrow-band primary, comprising:

receiving an input color image in an input color space, the input color image having input color values and being adapted for display on a reference color display device having a plurality of input color primaries having associated input color primary spectra;

using a data processing system to apply a metamerism correction transform to the input color image to determine an output color image having output color values in an output color space appropriate for display on the color display device, the output color image having a plurality of output color channels, each of the output color channels being associated with one of the device color primaries, wherein the metamerism correction transform modifies colorimetry associated with the input colors to provide output color values such that an average observer metameric failure is reduced for a distribution of target observers; and storing the output color image in a processor accessible memory.

This invention has the advantage that observer metameric failure associated with color display devices using narrow-band primaries can be substantially reduced for a set of target observers.

It has the additional advantage that digital images adapted to be displayed on conventional display devices using wide-band primaries can be corrected for display on color display devices using narrow-band primaries to compensate for average perceived color shifts that result from observer metameric failure.

It has the further advantage that color dithering can be used to provide color diversity to further reduce observer metameric failure artifacts.

BRIEF DESCRIPTION OF THE DRAWINGS

FIGS. 7A, 7B, 7C and 7D, provide plots indicative of perceived color differences resulting from observer metameric failure for a set of observers viewing white, sky blue, grass green and skin tone image content, respectively;

FIG. 8A is a data flow diagram for a conventional color management method;

FIGS. 8B-8D are data flow diagram for color management methods providing observer metameric failure correction in accordance with embodiments of the present invention;

Figure 1A:
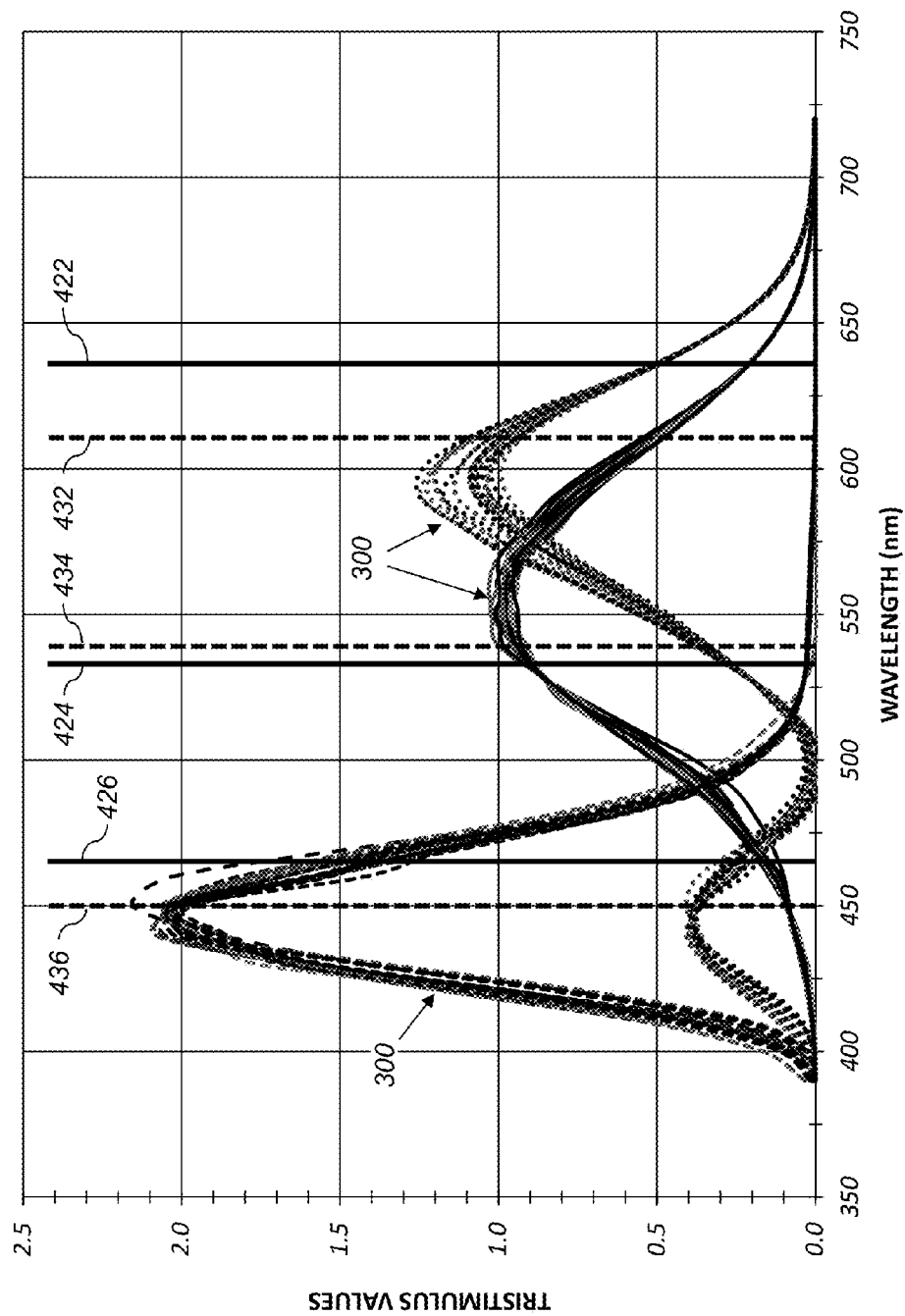
FIG. 1A depicts color matching function data for 20 observers.

It is to be understood that the attached drawings are for purposes of illustrating the concepts of the invention and may not be to scale.

DETAILED DESCRIPTION OF THE INVENTION

In the following description, some embodiments of the present invention will be described in terms that would ordinarily be implemented as software programs. Those skilled in the art will readily recognize that the equivalent of such software may also be constructed in hardware. Because image manipulation algorithms and systems are well known, the present description will be directed in particular to algorithms and systems forming part of, or cooperating more directly with, the method in accordance with the present invention. Other aspects of such algorithms and systems, together with hardware and software for producing and otherwise processing the image signals involved therewith, not specifically shown or described herein may be selected from such systems, algorithms, components, and elements known in the art. Given the system as described according to the invention in the following, software not specifically shown, suggested, or described herein that is useful for implementation of the invention is conventional and within the ordinary skill in such arts.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

For a variety of reasons, including improving light efficiency, expanding color gamut, increasing light source lifetime and reducing ongoing replacement costs, there is increasing impetus to replace the traditional lamps (such as xenon arc, tungsten halogen and UHP lamps) with solid state light sources (such as lasers or LEDs) in projectors and displays. Until recently, the desire for laser-based projection systems has been unfulfilled, in part as compact, robust, low-to-moderate cost, visible wavelength laser technologies had not emerged in a commercializable form, particularly for green and blue. However, with the recent emergence of blue diode lasers and compact green SHG lasers, low cost, laser based, pico-projectors from companies such as Microvision (Redmond, Wash.) are reaching the market place.

In parallel, similar obstacles for compact high power visible lasers capable of supporting digital cinema projection have also started to disappear, as companies such as Laser Light Engines (Salem, N.H.) and Necsel (Milpitas, Calif.) have demonstrated prototype or early product laser devices. For example, Necsel (previously known as Novalux) offers green (532 nm) and blue (465 nm) laser arrays, each of which provides 3-5 Watts of optical output power. At these power levels, and allowing for system efficiency losses, a modest sized projector (~1200 lumens output) for a large conference room or a home theatre, can be achieved using a single laser device per color. However, in the case of cinema, the on-screen luminance can require 10,000-40,000 lumens or 40-170 Watts or more of combined optical power (flux) incident to the screen, depending on screen size and screen gain. Presently, these power levels are achieved by optically combining the output of multiple laser arrays in each color channel.

In order to better understand the present invention, it is instructive to describe the overall context within which apparatus and methods of the present invention can be operable. As shown in FIG. 2, an audience of observers 60 in a theater 50 views an image 195 formed with image light 175 from projector 100 that is imaged onto a display surface 190. The projected image typically comprises a 2-D array of image pixels (not shown), each having a specified color and luminance for a frame time. As the color perception is variable among the observers 60, as for example described by the different sets of color matching functions 300 of FIG. 1A, then observer metameric failure can occur as the projected images are viewed. This is particularly true if projector 100 uses three narrow-bandwidth spectral primaries based on lasers, LEDs, or other narrow-band light sources. Within the context of the present invention, narrow-band light sources are considered to be light sources having full-width half-maximum (FWHM) spectral bandwidths of not more than ~30 nm. Likewise, wide-band light sources are considered to be light sources having full-width half-maximum (FWHM) spectral bandwidths of at least ~45 nm, where the spectral bandwidths of wide-band displays generally fall in a range ~45-90 nm. Displays with intermediate bandwidth light sources (with spectral bandwidths of ~25-50 nm) can still benefit from the methods of the present invention for reducing the impact of observer metameric failure, although to a lesser extent. The intermediate bandwidth range can partially overlap with either the narrow bandwidth or wide bandwidth spectral ranges, as the metameric failure susceptibility can depend on the details of the spectral structure (e.g., spectral mode structure).

Figure 3:
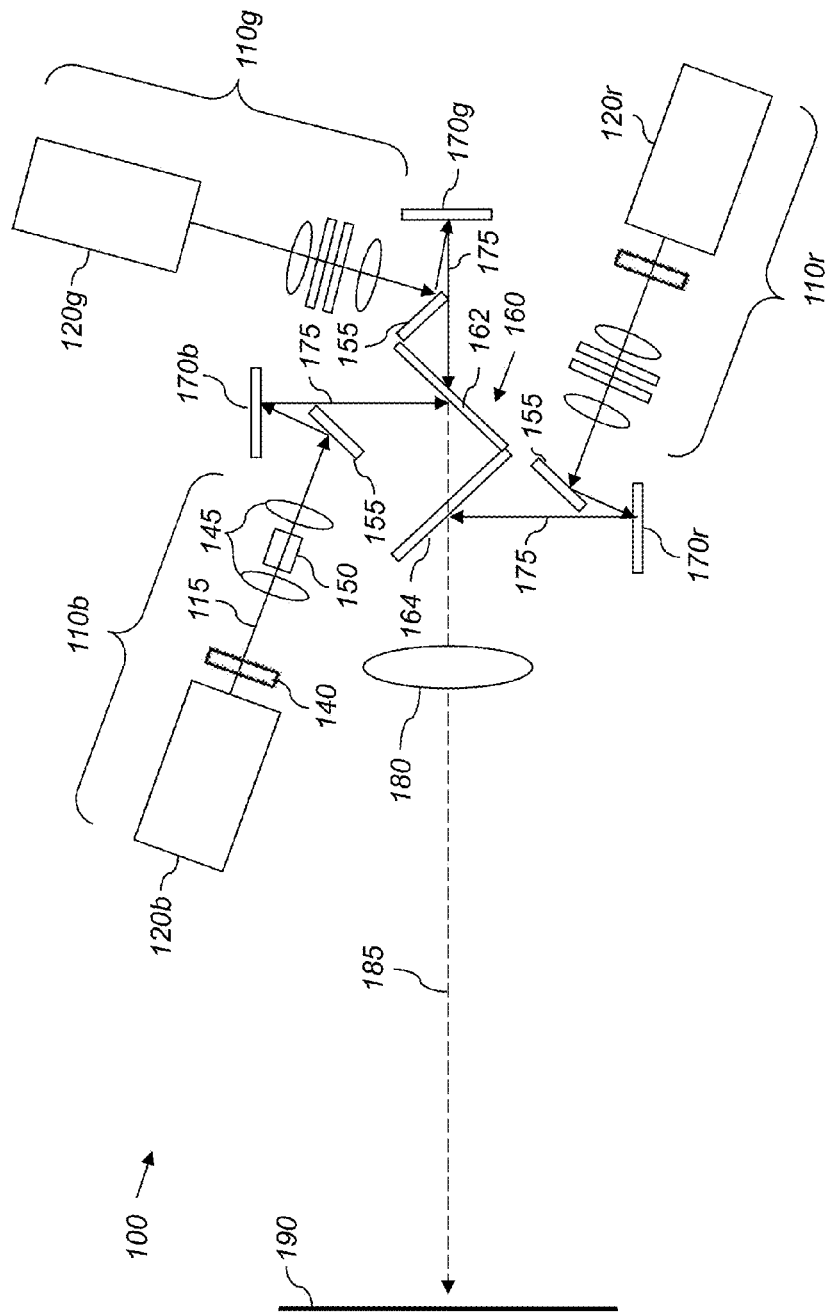
FIG. 3 depicts an exemplary optical system for a laser projector.

The schematic diagram of FIG. 3 shows an exemplary arrangement for a projector 100 in accordance with the present invention having three narrow-band primaries ($\lambda_b$, $\lambda_g$, $\lambda_r$). Red, green and blue illumination assemblies 110*r*, 110*g* and 110*b* are shown, providing red, green and blue (RGB) primary colors from respective red, green and blue laser light sources 120*r*, 120*g* and 120*b*. This system is similar to that described in the aforementioned Silverstein et al. paper. Each of the red, green and blue laser light sources 120*r*, 120*g* and 120*b* will include one or more light source devices, which are typically multi-emitter laser array devices. For example, the red laser light source 120*r* can comprise multiple (for example 12) semiconductor laser arrays, which are assembled to provide a narrow-band primary ($\lambda_r$) for a red color channel. In some embodiments, the red laser light source 120*r* can use multiple Mitsubishi ML5CP50 laser diodes, each emitting ~6 Watts of optical flux at ~638 nm from an array of 12 laser emitters. Similarly, the green laser light source 120g and the blue laser light source 120b can each comprise a plurality of laser devices. For example, in some embodiments, the green laser light source 120g can use a NECSEL-532-3000 green visible array package that nominally emits 3-4 Watts of 532 nm light in 48 beams, distributed as 24 beams from each of two rows of beams. Similarly, in some embodiments, the blue laser light source 120b can use a NECSEL-465-3000 blue visible array package that nominally emits 3-4 Watts of 465 nm light, also in 48 beams, distributed as 24 beams from each of two rows of beams. In each case, the respective laser light source assemblies can include lenses, mirrors, prisms, or other components (not shown) to provide laser beam shaping and directional control to fashion an array of emergent beams that exit an aperture of a housing, as input into the rest of the illumination system.

It should be understood that at present, the power levels needed for digital cinema can be accomplished cost effectively by optically combining the output of multiple laser arrays in each color channel, using free space optics or fiber coupling, to provide a system such as that of FIG. 3. Eventually, laser technology may advance such that a few, modest cost, compact laser devices can drive each color. Fiber lasers may also be developed that are appropriate for this application. Of course, each approach has its advantages and disadvantages, relative to trade-offs of simplicity, cost, and vulnerability to laser failure.

In a given color channel, the light beams emerging from a laser light source assembly encounter further portions of the respective red, green and blue illumination assemblies 110r, 110g and 110b, which can include various illumination lenses 145, a light integrator 150, one or more mirrors 155, and other illumination optics 140 such as filters, polarization analyzers, wave plates, apertures, or other elements as required. A polarization switching device (not shown), or other optics, to enable 3D projection, can also be included with the projector.

As then shown in FIG. 3, illumination light 115 from the light source assemblies is directed onto respective spatial light modulators 170 by redirection with one or more mirrors 155. Modulated image light 175, bearing image data imparted into the transiting light by the addressed pixels of the spatial light modulators 170 is combined using a combiner 160 (such as a dichroic combiner) to traverse a common optical axis 185 passing through imaging optics 180 and onto display surface 190 (such as a projection screen). The display surface 190 is typically a white matte screen that approximates a Lambertian diffuser, or a gain screen that back reflects light in a narrower cone (e.g., with a gain of g~2.4). Gained screens can be curved, fabricated with complex surface structures, can maintain polarization to aid 3-D projection, and have a white or neutral (slightly gray) spectral reflectance. In the illustrated embodiment, the combiner 160 comprises a first combiner 162 and a second combiner 164, each of which is a dichroic element or filter having appropriate thin film optical coatings that selectively transmits or reflects light according to its wavelength.

It should be understood that mirrors 155 need not lie in the plane of the optical system. Thus the mirror 155 in the optical path for the green channel can be out of plane, and not obstructing image light 175 passing to imaging optics 180, as might be otherwise implied by FIG. 3. Additionally, while combiner 160 is shown as a pair of tilted glass plates, other exemplary constructions can be used, including X-prisms, V-prisms, or Philips (or Plumbicon) type prisms. In other embodiments, mirrors 155 can also be provided in the form of prisms, such as the widely used TIR (total internal reflection) prism that is often used in combination with the Philips prism and DLP devices.

In FIG. 3, the imaging optics 180 are depicted symbolically by a single lens element. In practice, the imaging optics 180 are a multi-element assembly comprising multiple lens elements that directs and focuses image light 175 such that it images spatial light modulators 170 at their respective object planes along optical axis 185 to an image plane (display surface 190) at high magnification (typically 100×-400×). Imaging optics 180 can be fixed focus or zooming optics, and can wholly comprise transmissive elements (e.g., lenses) or reflective elements (e.g., imaging mirrors), or can be catadioptric, including both transmissive and reflective elements. The imaging optics 180 typically comprise projection optics (e.g., a projection lens including a plurality of lens elements) that form an image of the modulators onto the screen. In some embodiments, imaging optics 180 can also include relay optics (e.g., a relay lens including a plurality of lens elements) that creates a real aerial image at an intermediate image plane, which is then subsequently imaged to the screen by the projection optics. In some embodiments, a de-speckling device, to reduce the visibility of laser speckle, can be provided in the optical path. In some configurations, it is advantageous to locate the de-speckling device at or near the intermediate image plane.

In a preferred embodiment, the spatial light modulators 170 of projector 100 are Digital Light Processor (DLP) or Digital Micro-mirror Devices (DMDs), developed by Texas Instruments, Inc., Dallas, Tex. The DLP device uses pulse width modulation (PWM) control of the pixels or micromirrors to impart image data information to the transiting light. However, in other embodiments, other technologies can also be used for the spatial light modulators 170, including transmissive liquid crystal displays (LCDs) or reflective liquid crystal on silicon (LCOS) devices, which typically alter polarization states of the transiting light to impart the image data information therein.

Figure 4:
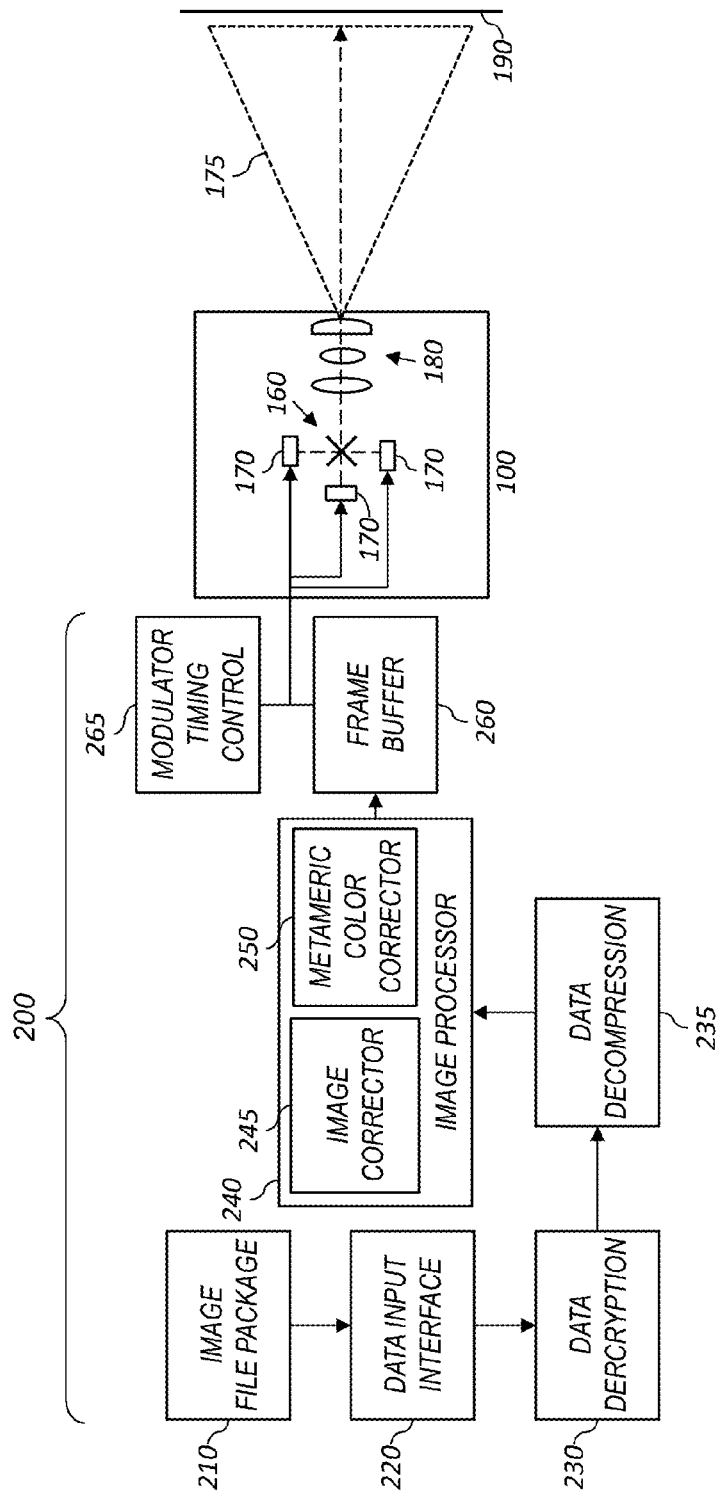
FIG. 4 depicts a data path for a laser projector system.

FIG. 4 shows an exemplary schematic of a data path 200 that provides image data to projector 100, and which enables the metameric failure reduction method of the present invention. An image file package 210 can be delivered in a memory to the theatre or other venue, as a set of data files that are compressed, encrypted and packaged for distribution. This image file package 210 can also include audio files and subtitle files, provided according to the Digital Cinema Distribution Master (DCDM) specifications, or in other formats. These files are accessed by data input interface 220, and subsequently decrypted and decompressed as appropriate, by data decryption 230 and data decompression 235 processors. Image processor 240 can prepare the image data files for display by applying various processing operations, including image corrections provided by image corrector 245 and metameric color corrections provided by metameric color corrector 250. The image corrections applied by the image corrector 245 can include operations such as uniformity corrections, and color/tone scale corrections. The image processor 240 will generally perform its processing operations in response to appropriate parameters and look-up tables (LUTs) that are provided as inputs.

The resulting processed images are stored in a frame buffer 260 or some other processor accessible memory, which then provides the image data to the projector 100 to be projected to the display surface 190. The projector 100 includes combiner 160 for combining imaging light from the different color channels and imaging optics 180 for projecting the imaging light onto the display surface 190, as well as other components such as light sources that are not shown in FIG. 4. (Refer to FIG. 3 for more details of other components typically included in projector 100.)

On a per frame or sub-frame basis, synchronized by modulator timing control 265, image data is fed from the frame buffer 260 to the spatial light modulators 170 to provide image modulation on a per pixel basis. In some embodiments, the data path 200 can reside in whole, or in part, within the housing of projector 100.

With respect to color perception, including color gamut and metameric failure, the center or peak wavelengths and the spectral bandwidths in each color channel are important parameters. In accordance with the presently available laser technology, the nominal projector wavelengths used in projector 100 are commonly 465 nm, 532 nm and 638 nm (see red laser primary 422, green laser primary 424 and blue laser primary 426 in FIG. 1A), which are significantly offset from the potentially optimal Thornton primaries of 450 nm, 540 nm and 610 nm (see Thornton red laser primary 432, Thornton green laser primary 434 and Thornton blue laser primary 436 in FIG. 1A) that were discussed earlier.

Depending on the technology, given laser devices have a device specific bandwidth ($\Delta\lambda_2$), and a collection of devices of that type will have in a larger bandwidth range ($\Delta\lambda_1$). Referring to the red laser light source 120r in FIG. 3, in some embodiments, individual red laser devices are used having peak emission wavelengths in the spectral range from $\lambda$~632-645 nm, or $\Delta\lambda_1$~13 nm, with 640 nm being the typical wavelength, while the typical spectral band width for a given laser is $\Delta\lambda_2$~2 nm FWHM. Similarly, in some embodiments the green laser light source 120g in FIG. 3 uses Novalux Extended Cavity Surface Emitting Laser (NECSEL™) green lasers, which have center wavelengths in the range of $\lambda$~527-537 nm (quoted $\Delta\lambda_1$~6 nm), with a given device having a typical peak wavelength of 532 nm and a typical FWHM spectral bandwidth of $\Delta\lambda_2$~0.2 nm. Likewise, in some embodiments the blue laser light source 120b in FIG. 3 uses NECSEL™ blue lasers having center wavelengths in the range of 460-470 nm (quoted $\Delta\lambda_1$~6 nm), with a typical peak wavelength of 465 nm and a typical FWHM spectral bandwidth of $\Delta\lambda_2$~0.2 nm.

Figure 5:
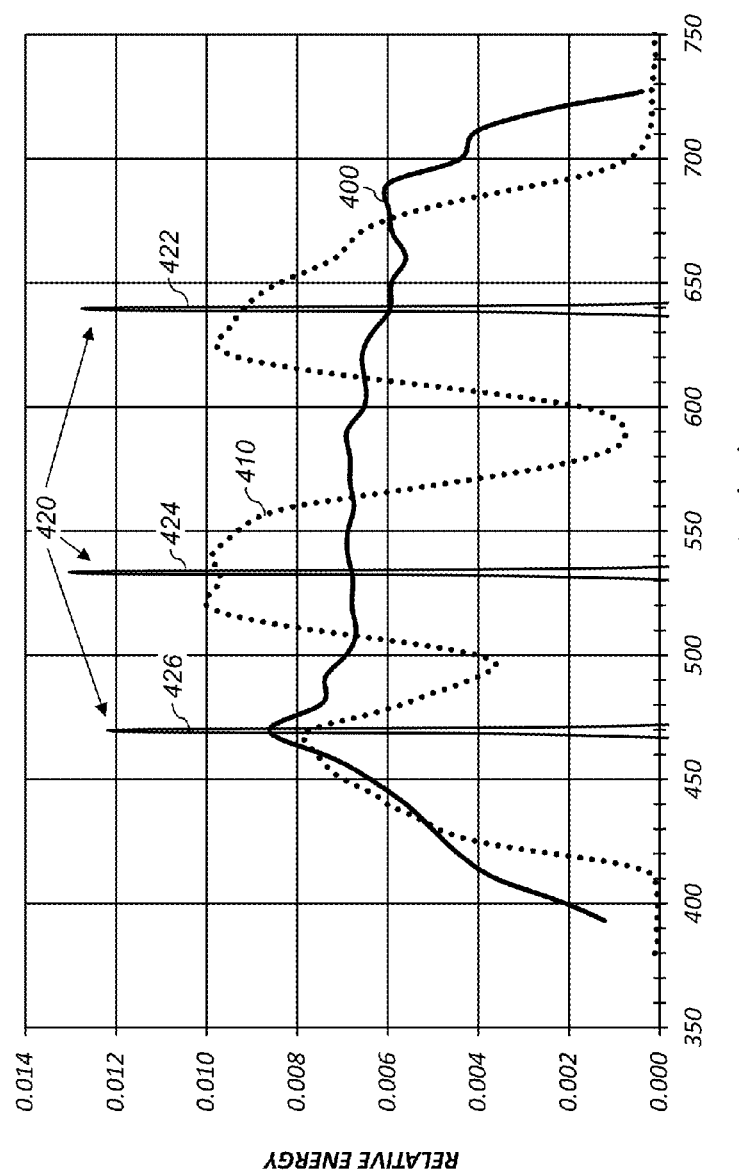
FIG. 5 depicts exemplary projection spectra.

FIG. 5 shows three spectral power distributions: an exemplary laser projection spectrum 420, an exemplary film projector spectrum 400, and an exemplary digital cinema projector spectrum 410. The laser projection spectrum 420 depicts a set of representative laser sources useful in projector 100 including spectra for the red laser primary 422 provided by the red laser light source 120r which corresponds to a red color channel, the green laser primary 424 provided by the green laser light source 120g which corresponds to a green color channel, and the blue laser primary 426 provided by the blue laser light source 120b which corresponds to a blue color channel. (The exemplary set of laser primary spectra in FIG. 5 is not necessarily intensity balanced to produce a particular color or white point, but rather primarily indicate spectral location.) For each color channel, the laser primary spectra associated with illumination assemblies including a plurality of individual laser devices will typically have a FWHM bandwidth within a range of $\Delta\lambda_1$~5-15 nm, with individual laser devices having much narrower emission bandwidths (e.g., $\Delta\lambda_2$~0.2-2 nm).

The larger bandwidth associated with use of multiple laser devices per color channel, can help to reduce both observer metameric failure and speckle perception. In exchange for these benefits, a modest color gamut loss results. However, in practice, the lasers can have a statistical distribution of center wavelengths that is appreciably narrower than this potential spectral range $\Delta\lambda_1$ (e.g., about 3-7 nm). Additionally, as noted previously, Ramanath has suggested that even the yet wider spectral bandwidths typical of LEDs ($\Delta\lambda$~30 nm FWHM) can still cause significant observer metameric failure. Thus, relying on using an ensemble of lasers having a distribution of peak emission wavelengths will likely not reduce the occurrence of observer metameric failure sufficiently to be satisfactory, particularly for projectors or displays with only three color primaries (i.e., three color channels). Moreover, methods for reducing the occurrence or magnitude of observer metameric failure for observers 60 can be valuable for displays having one or more color primaries having spectral bandwidths of $\Delta\lambda$~30 nm or less.

Also shown for comparison on FIG. 5 are an exemplary film projector spectrum 400 which represents the illumination to the print film from a xenon arc lamp that was filtered to remove both UV and IR light. In a film based projector, this spectrum is subsequently modulated on a localized image content basis by the transmission spectra of the red, green, and blue film dyes. The illustrated digital cinema projector spectrum 410 is associated with a conventional projector having a xenon arc lamp light source, which is dichroically split to form red, green, and blue color primaries, which together comprise spectrum 410. The digital cinema projector spectrum 410 is typical of that provided a Barco digital cinema projector, such as the model DP-1500 projector. Each color primary has a broadband spectrum (e.g., $\Delta\lambda$~68 nm FWHM, or $\Delta\lambda$~89 nm FW $1/e^2$). The light in each of these color primaries is directed to an associated spatial light modulator that imparts image data into the light associated with that color channel. It can be seen that the film projector spectrum 400 and the digital cinema projector spectrum 410 do not include the narrow spectral peaks associated with the laser projector spectrum 420, and will therefore not suffer from the high susceptibility to observer metameric failure.

Figure 6:
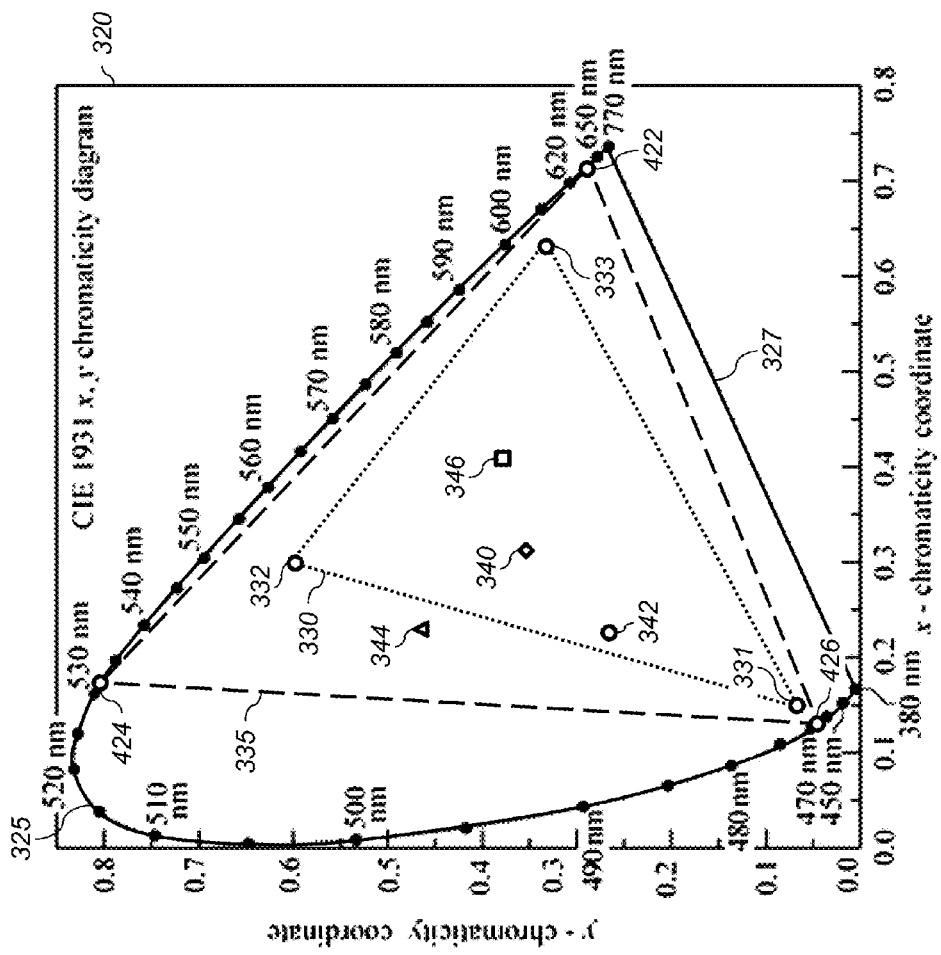
FIG. 6 depicts exemplary device color primaries and color gamuts.
Figure 7A:
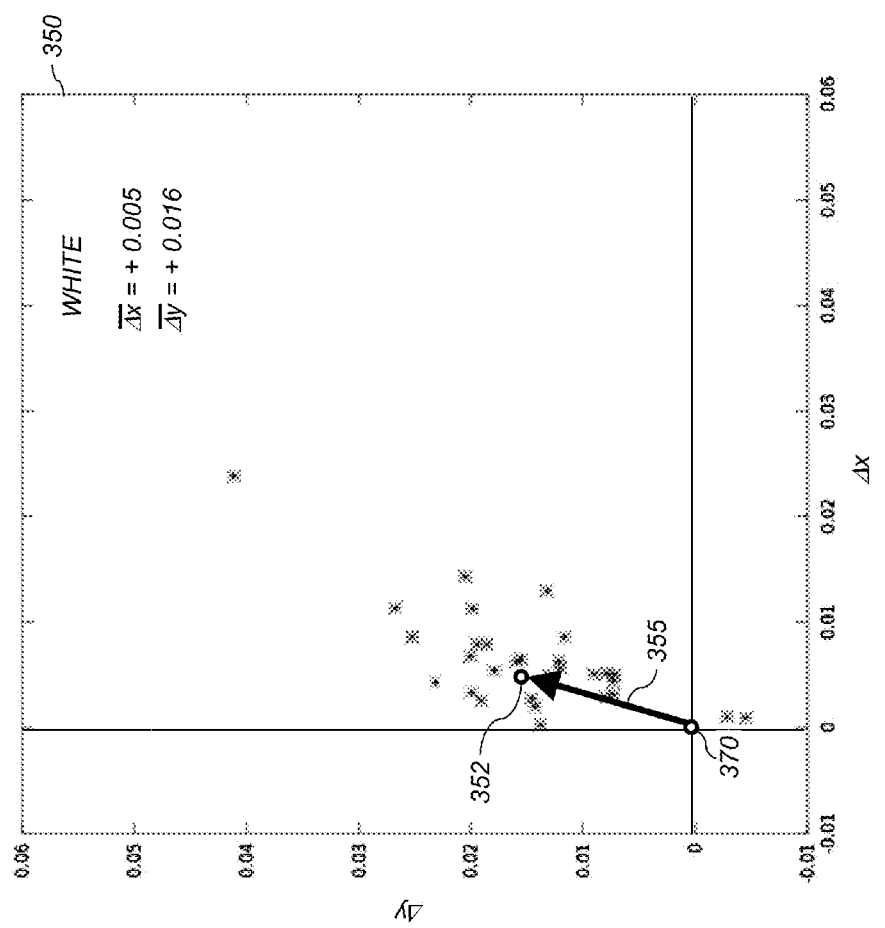
Figure 7B:
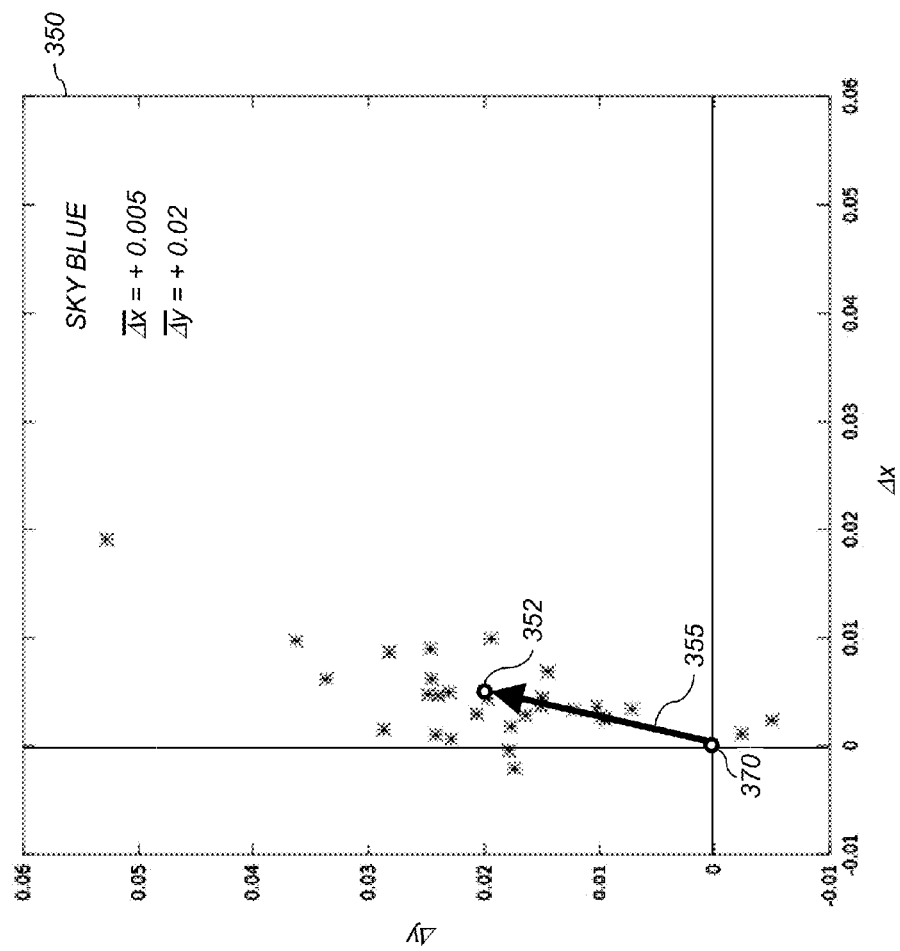
Figure 7C:
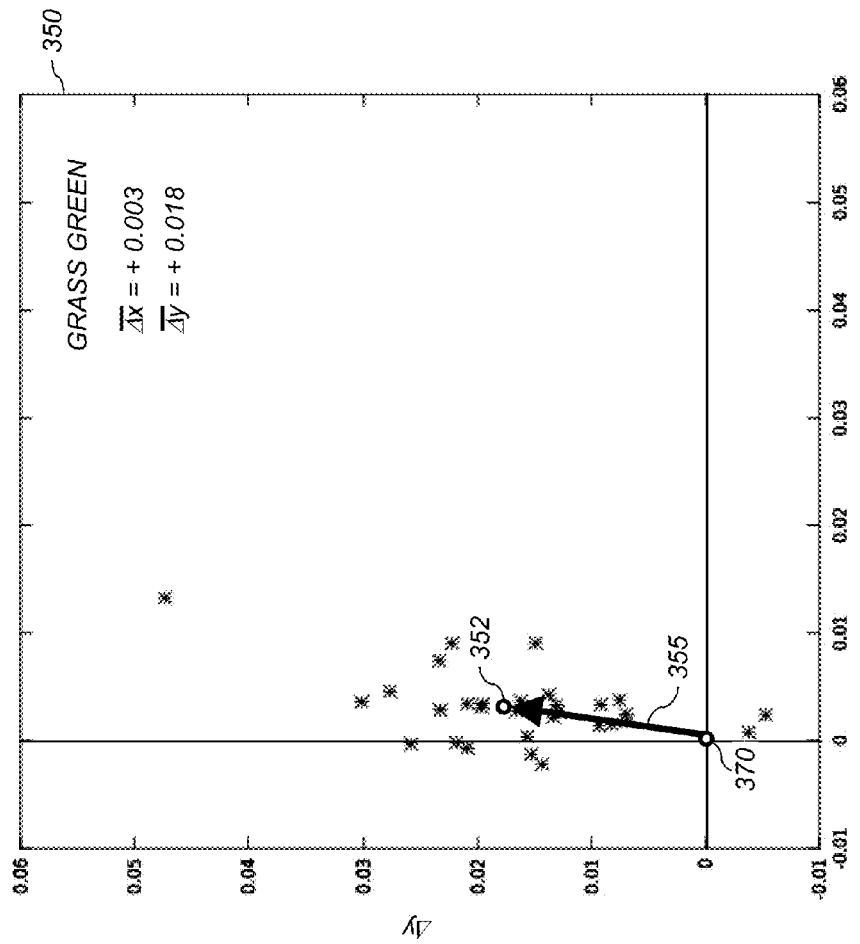

One common way to represent color is using a CIE x,y chromaticity diagram 320, as depicted in FIG. 6. In this diagram, colors are plotted using x,y chromaticity coordinates, which can be calculated from CIE XYZ tristimulus values using the following equations:

$$x = \frac{X}{X+Y+Z} \quad (1)$$
$$y = \frac{Y}{X+Y+Z}$$

The theory of the CIE XYZ system is that if two colors have the same XYZ values (and the same viewing conditions), the patches will visually match if the XYZ values match. Since the x,y chromaticity coordinates represent only two color dimensions, they are not capable of fully describing a color. In particular, while the x,y chromaticity coordinates can provide an indication of the hue and saturation of a color, they do not provide any indication of luminance. Typically, the Y tristimulus value, which represents perceived luminance, is used together with the x,y chromaticity coordinates to fully specify a color as a set of x,y,Y color coordinates. Other color spaces that are commonly used to represent color are the well-known CIELAB and CIELUV color spaces.

In FIG. 6, the outer curved boundary is the "horseshoe-shaped" spectrum locus 325, which corresponds to the pure monochromatic colors of the visible spectrum. As shown by the labeled wavelengths, the spectrum locus 325, proceeds from blue colors at the lower left corner through green colors at the top to red colors at the lower right corner. The spectrum locus 325 represents the boundary of the color gamut of the human visual system, and encompasses the entire range of colors that are visible to a human observer. The straight edge on the lower part of the gamut boundary is called the line of purples 327 or the purple boundary. (These colors are not part of the spectrum locus 325 and are not provided by monochromatic emitters.)

One characteristic of the CIE x,y chromaticity diagram 320 is that a color that is formed by a mixture of two colors will have chromaticity coordinates that fall along the straight line that connects the chromaticity coordinates for the two colors that are being mixed. Since additive color imaging devices, such as CRTs and laser projectors, produce images by forming mixtures of a set of color primaries, the color gamuts of these devices will be given by a triangle on the CIE x,y chromaticity diagram 320, with the color primaries being located at the corners of the triangle. A wide-band color gamut 330 is shown on FIG. 6, corresponding to a set of wide-band color primaries (i.e., red primary 331, green primary 332 and blue primary 333). These primaries and their associated color gamut are typical of those provided by the phosphors used in a typical CRT monitor or television. Similarly, a laser primary color gamut 335 is also shown in FIG. 6, which corresponds to the set of typical laser projector color primaries that were discussed earlier (i.e., red laser primary 422, green laser primary 424 and blue laser primary 426).

As expected, both the laser primary color gamut 335, and the smaller conventional wide-band color gamut 330 are contained within spectrum locus 325. As accustomed as people are to using CRT displays, few are aware of the limited color gamut they have. For example, while important memory colors like neutrals (e.g., white color coordinate 340), sky blues (e.g., sky blue color coordinate 342) and skin tones (e.g., skin tone color coordinate 346) can be rendered, greens are limited, and many grass green colors (e.g., grass green color coordinate 344) cannot be reproduced. (With modern LCD displays, the available color gamut can be of comparable size to the wide-band color gamut 330, or a bit larger, but may be somewhat shifted, allowing grass green type colors to be rendered.)

It has been estimated that the gamut of colors present in natural scenes is about 30% of the theoretical maximum of ~2.3 million discernible colors for all of color space. However, when the lightness (Y) dimension is ignored, there are only about 26,000 naturally-occurring perceptually-different colors. The number of memory colors is much smaller. They are colors, like the colors of grass, sky and autumn leaves, which are processed by the human visual system (HVS) and stored as memories.

By comparison, the spectrum locus 325 comprises monochromatic colors, which can only be produced by lasers, or an arc lamp, such as a mercury-vapor lamp with selected narrow emission spectra, or a light source filtered with narrow spectral bandpass filters. In the case of the representative laser primary color gamut 335, these monochromatic colors occur at the corners, where the laser primaries (e.g., 465 nm, 532 nm, and 638 nm) intersect the spectrum locus 325. The perceived colors along the spectrum locus 325, including those corresponding to the red, green, and blue laser primaries 422, 424 and 436, are seldom seen in nature and are not memory colors. The most prominent exception is in the yellows, where some naturally occurring yellow colors are very close to the spectrum locus 325. However, in general, differences in perception of these highly saturated monochromatic colors along the spectrum locus 325 are less likely to cause angst among observers 60, in part because a language to precisely describe or compare these colors is lacking. Other colors that are near the spectrum locus 325, though not actually on it, such as a green near the 520 nm spectrum locus point, but having a very small blue or red additive color contribution, are spectrally impure or polychromatic, but can still be very saturated wide gamut colors that are also not memory colors. However, as the additive contributions of the three primaries tend to equalize, the colors tend to move towards center, and critical or widely recognized colors (such as turquoise, cranberry red or pumpkin orange), including memory colors such as sky blue, grass green, and skin tones are produced. So while a group of observers 60 (FIG. 2) viewing a display that can produce a wide color gamut (e.g., laser primary color gamut 335) can experience significant observer metameric failure when viewing colors at or near the spectrum locus 325, high levels of dissatisfaction are most likely to occur when the observers 60 view commonly experienced colors or memory colors.

As discussed previously, prior approaches for reducing observer metameric failure in displays with narrow-bandwidth primaries feature preferential spectral locations for the primaries, or the use of a multi-primary (N>3) display, preferentially having at least moderately broad bandwidths (≥30 nm) in the N color channels. As the multi-primary display infrastructure for capturing image content, transmitting the resulting data, and displaying it is not well-established, and as three-primary laser-based projectors and displays are developing rapidly, there is a need for solutions for reducing observer metameric failure for such N=3 primary displays.

A comparative analysis of color perception for observers viewing a conventional digital cinema projector and a laser projector 100 further illustrates the problem of observer metameric failure. A set of target colors, including sky blue, grass green, skin tone, gray and white, was defined having specified CIE x,y chromaticity coordinates which are shown in Table 1, together with corresponding Digital Cinema Initiative Distribution Master (DCDM) code values.

TABLE 1

Target color values.

| Patch | x | y | Y | DCDM X' | DCDM Y' | DCDM Z' |
|---|---|---|---|---|---|---|
| White | 0.314 | 0.351 | 0.880 | 3612 | 3770 | 3803 |
| Gray | 0.314 | 0.351 | 0.113 | 1637 | 1709 | 1679 |
| Sky Blue | 0.225 | 0.265 | 0.184 | 1939 | 2066 | 2658 |
| Skin | 0.403 | 0.377 | 0.281 | 2494 | 2431 | 1973 |
| Grass Green | 0.227 | 0.464 | 0.085 | 1166 | 1534 | 1311 |

The projectors were modeled using both the wide-bandwidth digital cinema projector spectrum 410 and the narrow-bandwidth laser projector spectrum 420 shown in FIG. 5. The color values associated with each of the target colors were translated into corresponding light intensities that would produce the desired color values for a standard observer for the respective color primaries for the conventional digital cinema projector and the laser projector. The resulting intensity modulated spectra for both projectors were then analyzed for individual color perception using a set of observer-specific color matching functions 300 to determine corresponding perceived XYZ tristimulus values for each individual observer.

Color difference values between the perceived colors for the two projectors were calculated for each individual observer in terms of chromaticity differences:

$$\Delta x_i = x_{i,n} - x_{i,b}$$

$$\Delta y_i = y_{i,n} - y_{i,b} \qquad (2)$$

where $(x_{i,n}, y_{i,n})$ are chromaticity values for the narrow-bandwidth laser projector for the $i^{th}$ observer, $(x_{i,b}, y_{i,b})$ are chromaticity values for the conventional wide-bandwidth digital cinema projector for the $i^{th}$ observer, and $(\Delta x_i, \Delta y_i)$ are the chromaticity differences for the $i^{th}$ observer. (In some embodiments, a luminance difference $\Delta Y_i = Y_{i,n} - Y_{i,b}$ can also be defined to account for any differences in the luminance perception.) By definition, the CIE standard observer should perceive colors having the same CIE colorimetry XYZ input color values, no matter whether the spectral source providing the colors has a broadband spectrum (e.g., 410) or a narrow band spectrum (e.g., 420). Thus, if a particular observer perceived the colors in the same way as the standard observer, then the resulting color differences would be zero. A non-zero color difference value for a particular observer provides an indication of the magnitude and direction of the perceived color shift, resulting from observer metameric failure that occurs when the particular observer views the nominally identical color pair provided by wide-bandwidth and narrow-bandwidth projectors.

FIGS. 7A-7D show chromaticity difference plots 350 for the white, sky blue, grass green and skin target colors from Table 1, respectively. The set of observer-specific color matching functions used in this analysis included the 10° color matching functions 300 from the Wyszecki and Stiles data shown in FIG. 1A, as well as a set of 2° color matching function data from Stiles and Burch, published in detail by Trezona in the article "Individual observer data for the 1955 Stiles-Burch 2° pilot investigation" (J. Opt. Soc. Am. A., Vol. 4, pp. 769-782, 1987). The aim chromaticity difference 370 would be $\Delta x=0$, $\Delta y=0$, corresponding to the case where there is no observer metamerism failure, and therefore the colors produced by the two projectors would appear to have the identical chromaticities to the observers. Each of the plotted data points corresponds to the chromaticity difference for a particular observer. An average chromaticity difference 352 is shown on each of the chromaticity difference plots 350, corresponding to an average color shift 355 of the perceived laser projector color relative to the perceived conventional digital cinema projector color. In general, the 2° observer data points cluster closer to the origin (the aim chromaticity difference 370) than do the 10° observer data points.

Considering the results shown in FIGS. 7A-7D, it can be seen that there is a significant amount of variation in the observer metamerism failure characteristics for each of the different observers. However, in each case, there is a systematic bias to the cloud of data points, suggesting that most observers would tend to view the laser projector colors as being more yellow-green than the corresponding conventional digital cinema projector color having the identical colorimetry (e.g., identical CIE XYZ values) if they were viewed side by side. This is consistent with experimental observations made by the inventors using the projector described in the aforementioned article by Silverstein et al. This suggests that the average amount of observer metameric failure can be significantly reduced by introducing color corrections (i.e., color shifts in the blue-magenta direction) to the displayed colors on the laser projector to compensate for the average color shift 355. While this will not reduce the size of the differences between the responses of the different observers, it can eliminate the systematic bias that has been observed between the perceived colors on a laser projector and a conventional digital cinema projector.

FIGS. 8A-8D illustrate a framework within which color corrections can be applied to image data originally prepared for use with a wide-band display device to adapt it for use with a narrow-band display device such that an average observer metameric failure is reduced for a distribution of target observers.

FIG. 8A shows a conventional color management method 440 to transform input color values 450 ($R_W$, $G_W$, $B_W$) adapted for display on a wide-band display device to provide output color values 454 ($R_W$, $G_W$, $B_W$) adapted for display on a narrow-band display device.

An input device model 451 ($D_W$) for the wide-band display device is used to transform the input color values 450 to corresponding device-independent color values 452. Methods for forming such device models are well-known in the color management art. Typically the device-independent color values 452 will be in a standard CIE color space such as the well-known CIE XYZ or CIELAB color spaces. In some embodiments, the input device model 451 includes a set of one-dimensional nonlinear functions (e.g., "gamma functions") that are applied to the input color values 450, and a 3×3 phosphor matrix transformation that is used account for the colors of the input device color primaries. Such models generally work well for additive display devices such as conventional wide-band digital projection systems. In some embodiments, the input device model 451 may include other types of transform elements such as a multi-dimensional look-up table (LUT) or a parametric model such as a polynomial function.

An inverse output device model 453 ($D_N^{-1}$) for the narrow-band display device is used to determine the output color values 454 needed to produce the device-independent color values 452 on the narrow-band display device. In some embodiments, the inverse output device model 453 includes a 3×3 inverse phosphor matrix transformation that is used account for the colors of the output device color primaries, and a set of one-dimensional nonlinear functions (e.g., "inverse gamma functions"). Such models generally work well for additive display devices such narrow-band laser projection systems. In some embodiments, the inverse output device model 453 may include other types of transform elements such as a multi-dimensional look-up table (LUT) or a parametric model such as a polynomial function. In some embodiments, the input device model 451 and the inverse output device model 453 are embodied using the well-known ICC color management profile format for use in an ICC color management system.

In some embodiments, the input device model 451 and the inverse output device model 453 can be combined to form a composite color transform 455. In some embodiments, the composite color transform 455 can be embodied as an ICC device link profile.

FIG. 8B shows a color correction method 442 in accordance with an embodiment of the present invention that incorporates a metamerism correction transform 460. The metamerism correction transform 460 is used to transform the device-independent color values 452 to determine corrected device-independent color values 461 ($X_C$, $Y_C$, $Z_C$). As will be described later, the metamerism correction transform 460 is adapted to provide a reduced average observer metameric failure for a distribution of target observers (for example by applying inverse color shifts to compensate for the average color shifts 355 shown in FIGS. 7A-7D).

The corrected device-independent color values 461 are transformed using the inverse output device model 453 to determine corrected output color values 462 ($R_{NC}$, $G_{NC}$, $B_{NC}$). In some embodiments, the input device model 451, the metamerism correction transform 460 and the inverse output device model 453 can be combined to form a composite metamerism correction transform 463.

FIG. 8C shows a color correction method 444 in accordance with an alternate embodiment of the present invention that incorporates a metamerism correction transform 465. In this case, a conventional color management process (e.g., the color management method 440 shown in FIG. 8A) is used to determine output color values 454. The metamerism correction transform 465 is then used to make appropriate adjustments to the output color values 454 to determine the corrected output color values 462. In some embodiments, the input device model 451, the inverse output device model 453 and the metamerism correction transform 465 can be combined to form a composite metamerism correction transform 466.

In some embodiments, images may be provided to the display system (e.g., projector 100 in FIG. 2) in a device-independent color encoding rather than a color encoding associated with a particular display device. For example, digital motion pictures are commonly distributed in the form of digitally encoded tristimulus values as specified by the DCDM digital cinema specification. In this case, color transforms are used to transform the input digital image data to the form that is appropriate for the particular projector. FIG. 8D illustrates an embodiment of the present invention where the input image data is received as device-independent color values 452 (XYZ). When the image is projected using a conventional wide-band display device, a conventional color management method 446 applies an inverse output device model 456 ($D_W^{-1}$) for the wide-band display device is used to determine the output color values 457 needed to produce the device-independent color values 452 on the wide-band display device. When the image is projected using a narrow-band display device, a color correction method 448 is applied in accordance with the present invention where the metamerism correction transform 460 and the inverse output device model 453 are used to determine the appropriate corrected output color values 462 as was discussed earlier with respect to FIG. 8B.

Figure 9A:
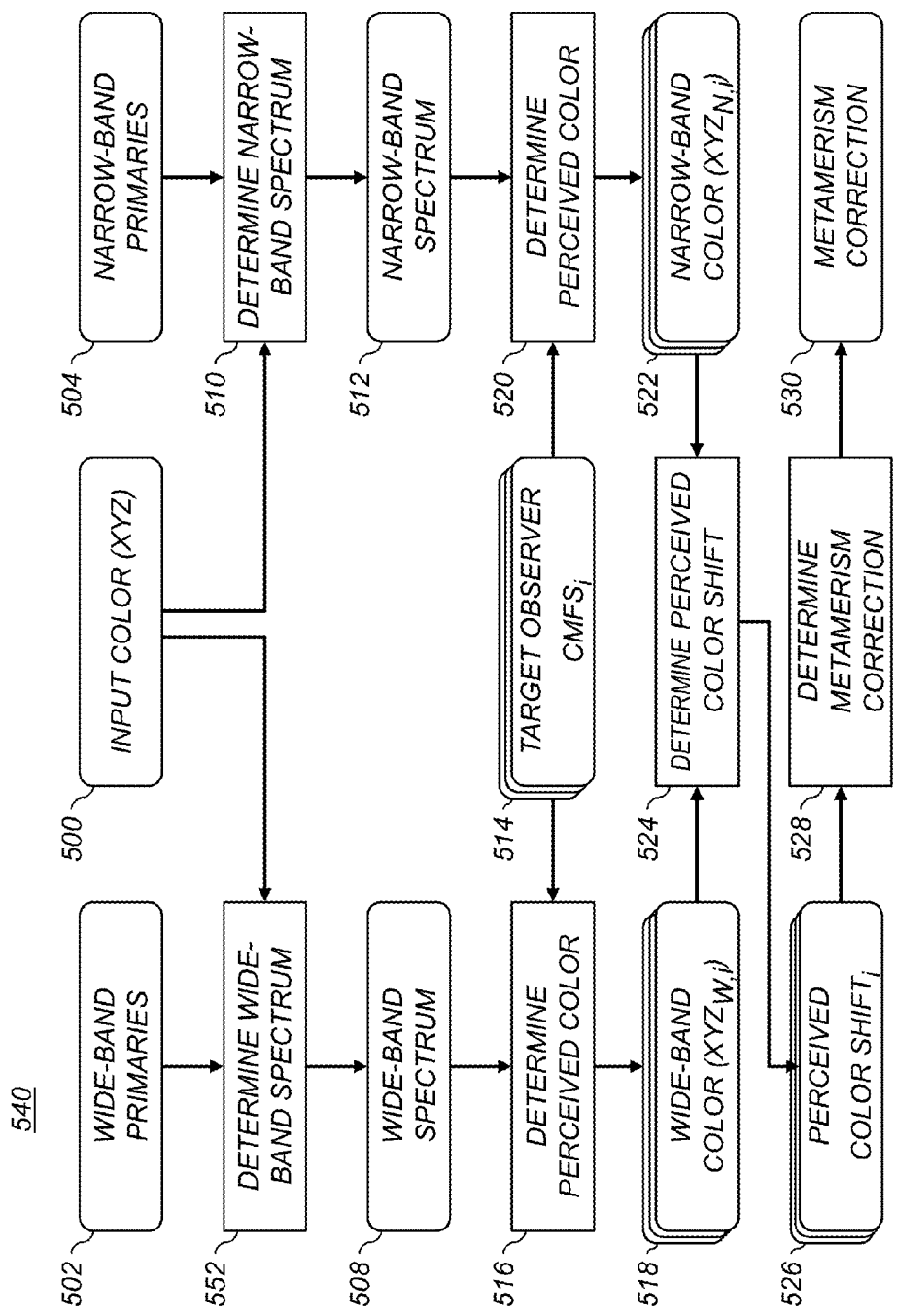
FIG. 9A depicts a method for determining a metamerism correction in accordance with an embodiment of the present invention based on a distribution of perceived color shifts associated with metamerism correction for a set of target observes.

FIG. 9A illustrates an exemplary perceived color shift determination method 540 for determining a metamerism correction 530 for an input color 500 (e.g., a pixel color for an image pixel) that reduces average observer metameric failure for a set of target observers. The metamerism correction 530 corrects for observer metamerism failure between images displayed on a conventional wide-band display system using a set of wide-band primaries 502 (e.g., the primaries shown in the digital cinema projector spectrum 410 of FIG. 5) and. images displayed on a narrow-band display system using a set of narrow-band primaries 504 (e.g., the red laser primary 422, the green laser primary 424 and the blue laser primary 426 in the laser projector spectrum 420 of FIG. 5). This method can be used in the process of defining the metamerism correction transform 460 in FIG. 8B or the metamerism correction transform 465 in FIG. 8C.

In the exemplary embodiment, the input color 500 is represented by a set of CIE XYZ tristimulus values. However, in other embodiments the input color 500 can be represented in any appropriate color space, including a device dependent color space (e.g., device dependent input color values 450 in FIGS. 8A-8C).

A determine wide-band spectrum step 552 is used to determine a wide-band spectrum 508 corresponding to the input color 500. In embodiments where the input color is specified in a device-independent color space such as CIE XYZ, the determine wide-band spectrum step 552 determines the magnitudes of each of the wide-band primaries 502 that are required to provide the specified input color 500. Likewise, a determine narrow-band spectrum step 510 is used to determine a narrow-band spectrum 512 corresponding to the input color 500. The wide-band spectrum 508 and the narrow-band spectrum 512 will have matching CIE colorimetry, and would therefore match for an observer having color matching functions (CMFs) that exactly match those of the CIE standard observer. However, as was discussed relative to FIGS. 7A-7D, it has been found that populations of real observers then to perceive the wide-band spectrum 508 as having a shifted color relative to the narrow-band spectrum 512 as a result of observer metameric failure.

To determine an appropriate metamerism correction 530, a set of target observers is defined for which the average observer metameric failure is to be reduced. In a preferred embodiment, a set of target observer color matching functions 514 is specified to characterize the visual response of the set of target observers, where $CMFs_i$ is the set of color matching functions for the $i^{th}$ target observer. In some embodiments, one or both of the aforementioned set of 10° color matching functions 300 from Wyszecki and Stiles or the aforementioned set of 2° color matching functions from Stiles and Burch that were discussed earlier can be used to define the set of target observers. In other embodiments, a particular set of persons that is representative of a target audience can be specified for use as the set of target observers. In the limiting case, the set of target observers can be one particular person so that the system performance can be personalized to reduce observer metamerism effects for that particular person. For example, if the display system is used in a home environment, the system performance can be personalized for the homeowner, or for the set of family members in the home. In some embodiments, the color matching functions for a plurality of target observers can be averaged to determine a single set of color matching functions corresponding to an "average observer" that is representative of the set of target observers. In this case the set of target observer color matching functions 514 can include only the averaged color matching functions.

A determine perceived color step 516 is used to determine a target observer perceived wide-band color 518 ($XYZ_{W,i}$) corresponding to the wide-band spectrum 508 for each of the target observers. In a preferred embodiment, the determine perceived color step 516 determines tristimulus values ($XYZ_{W,i}$) using the following equations:

$$X_{W,i} = \int S_W(\lambda) \bar{x}_i(\lambda) d\lambda$$

$$Y_{W,i} = \int S_W(\lambda) \bar{y}_i(\lambda) d\lambda$$

$$Z_{W,i} = \int S_W(\lambda) \bar{z}_i(\lambda) d\lambda \qquad (3)$$

where $S_W(\lambda)$ is the wide-band spectrum 508, ($\bar{x}_i(\lambda)$, $\bar{y}_i(\lambda)$, $\bar{z}_i(\lambda)$) are the target observer color matching functions for the $i^{th}$ target observer, and ($X_{W,i}, Y_{W,i}, Z_{W,i}$) are tristimulus values for the target observer perceived wide-band color 518. Similarly, a determine perceived color step 520 is used to determine a target observer perceived narrow-band color 522 ($XYZ_{N,i}$) corresponding to the narrow-band spectrum 512 for each of the target observers.

In general, due to observer metameric failure, the target observer perceived wide-band colors 518 will not match the target observer perceived narrow-band colors 522 for any particular target observer. A determine perceived color shift step 524 is used to determine a target observer perceived color shift 526 for each of the target observers. In some embodiments, the target observer perceived color shift 526 is represented as a difference between tristimulus values for the target observer perceived wide-band colors 518 and the target observer perceived narrow-band colors 522:

$$\Delta X_i = X_{N,i} - X_{W,i}$$

$$\Delta Y_i = Z_{N,i} - Z_{W,i}$$

$$\Delta Z_i = Z_{N,i} - Z_{W,i} \qquad (4)$$

where $(X_{N,i}, Y_{N,i}, Z_{N,i})$ are tristimulus values for the target observer perceived narrow-band color 522 and $(\Delta X_i, \Delta Y_i, \Delta Z_i)$ is the target observer perceived color shift 526 for the $i^{th}$ target observer.

In other embodiments, the target observer perceived color shifts 526 can be represented using some other color space besides differences of tristimulus values. For example, the tristimulus values can be converted to chromaticity values (x, y, Y), L*a*b* values or L*u*v* values using well-known equations, and the target observer perceived color shift 526 can be determined relative to that color space (e.g., $\Delta E^*$). For embodiments where color spaces that determine color values relative to a reference white point (e.g., L*a*b* or L*u*v*), an appropriate white point can be defined corresponding to a particular white spectrum (e.g., a white spectrum associated with a specified white point associated with the wide-band primaries 502).

The determine metamerism correction step 528 determines an appropriate metamerism correction 530 responsive to the target observer perceived color shifts 526. In a preferred embodiment, the metamerism correction 530 is determined to counteract an average of the target observer perceived color shifts 526:

$$C_X = -\overline{\Delta X_i} = -\frac{1}{N}\sum_{i=1}^{N}\Delta X_i \qquad (5)$$

$$C_Y = -\overline{\Delta Y_i} = -\frac{1}{N}\sum_{i=1}^{N}\Delta Y_i$$

$$C_Z = -\overline{\Delta Z_i} = -\frac{1}{N}\sum_{i=1}^{N}\Delta Z_i$$

where N is the number of target observers, and $(C_X, C_Y, C_Z)$ is the metamerism correction 530.

Figure 9B:
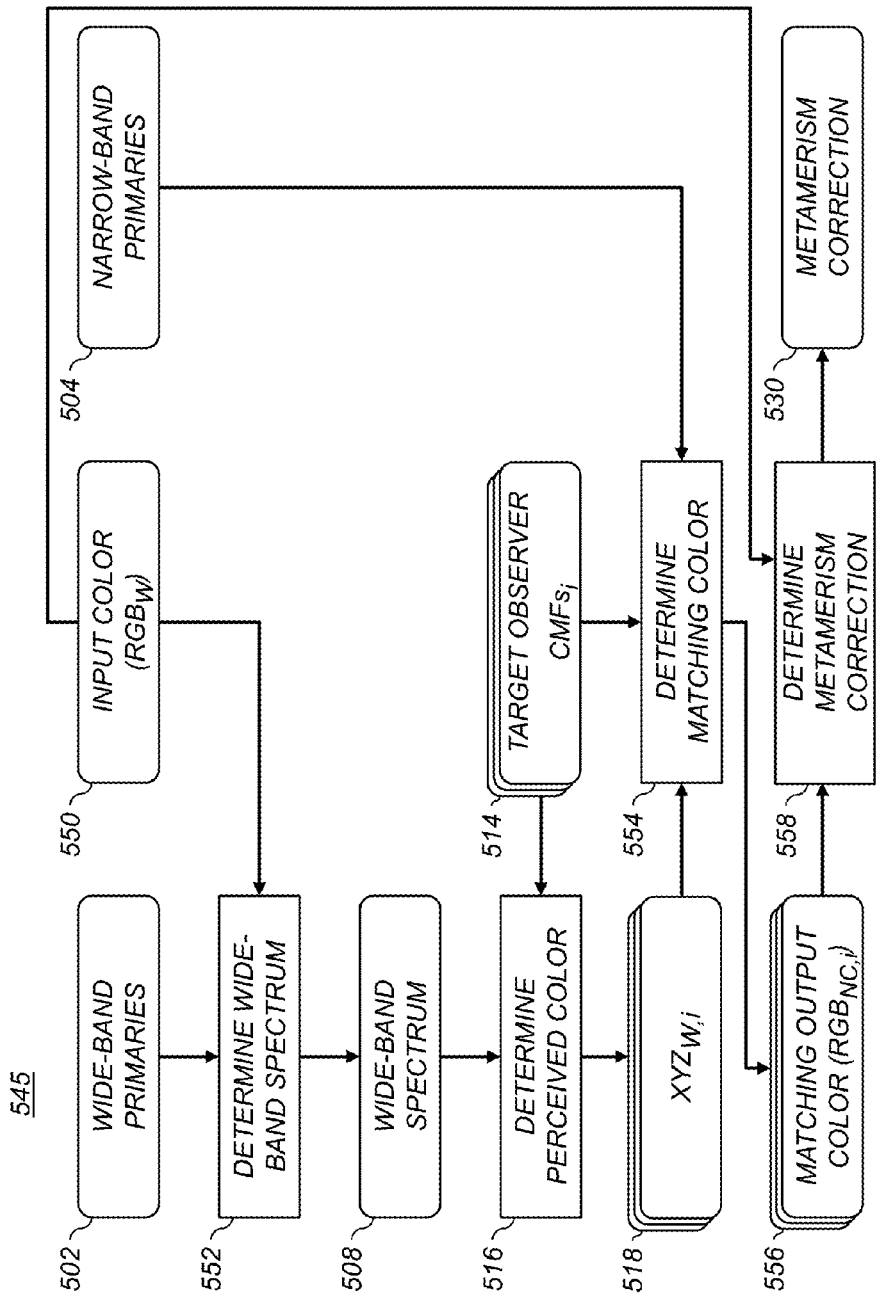
FIG. 9B depicts a method for determining a metamerism correction in accordance with an embodiment of the present invention based on a distribution of matching colors for a set of target observes.

FIG. 9B is a flowchart showing a matching color determination method 545, which represents an alternate method for determining an appropriate metamerism correction 530 for the narrow-band primaries 504 according to another embodiment. In this example, input color 550 is specified in terms of control values ($RGB_W$) for the wide-band display device, where the control values are used to control the amplitudes of the corresponding wide-band primaries 502.

A determine wide-band spectrum step 552 determines a wide-band spectrum 508 corresponding to the input color 550. Generally the determine wide-band spectrum step 552 determines the wide-band spectrum by forming a weighted combination of the spectra for the wide-band primaries 502, where the weights are specified by the control values for the input color 550.

As was discussed relative to FIG. 9A, the determine perceived color step 516 determines target observer perceived wide-band colors 518 for the set of target observers responsive to the corresponding target observer color matching functions 514.

A determine matching color step 554 determines a matching output color 556 for each of the target observers. In a preferred embodiment, the matching output color 556 is specified by a set of corrected narrow-band control values ($RGB_{NC,i}$) for the narrow-band display device which will produce a narrow-band spectrum that the target observer will perceive to be a match to the corresponding target observer perceived wide-band color 518. The narrow-band spectrum is determined by forming a weighted combination of the spectra for the narrow-band primaries 504, where the weights are specified by the narrow-band control values. The CIE colorimetry associated with the input color 540 and the matching output color 556 will generally be different from each other, reflecting the fact that the target observers will generally have different color matching functions than the CIE standard observer. The magnitude of the differences in the CIE colorimetry will typically be color dependent, and will be closely related to the target observer perceived color shifts 526 discussed with reference to the perceived color shift determination method 540 of FIG. 9A.

In a preferred embodiment, the determine matching color step 554 determines the matching output color 556 responsive to the target observer color matching functions 514. In some implementations, a nonlinear optimization technique can be used to iteratively adjust the amounts of the narrow-band primaries 504 until corresponding target observer perceived narrow-band colors ($XYZ_{N,i}$) are equal to the target observer perceived wide-band colors 518 ($XYZ_{W,i}$) to within a pre-defined tolerance (e.g., 0.00001). In other implementations, a phosphor matrix can be determined for the narrow-band primaries 504 for each set of target observer color matching functions 514. Methods for determining a phosphor matrix given a set of color matching functions and a set of color primary spectra are well-known in the art. Once determined, the phosphor matrixes can be used to directly determine the matching output color 556 that will match the target observer perceived wide-band colors 518.

In an alternate embodiment, the determine matching color step 554 can be performed by performing a visual matching experiment using the set of target observers. A first color patch having the input color 550 can be displayed on a screen using the wide-band primaries 502. A second color patch can be displayed on the screen using the narrow-band primaries 504. User controls can be provided that enable a target observer to adjust the amounts of the narrow-band primaries 504 until the target observer perceives the second color patch to visually match the first color patch. The resulting amounts of the narrow-band primaries 504 are used to define the matching output color 556. This method, for example, might be practiced by a colorist or cinematographer in preparing content for distribution.

A determine metamerism correction step 558 is then used to determine the metamerism correction 530. The metamerism correction 530 can be represented in many different forms. For example, if the color correction method 444 of FIG. 8C is used to provide the observer metamerism failure correction by adding offsets ($R_N=R_{NC}+C_R$, $G_N=G_{NC}+C_G$, $B_{NC}=B_N+C_B$) to the output color values 454, then the offsets ($\Delta R$, $\Delta G$, $\Delta B$) for a particular input color 550 can be determined by determining averaging observer-specific offsets:

$$\Delta R = -\overline{\Delta R_i} = -\frac{1}{N}\sum_{i=1}^{N}\Delta R_i \qquad (6)$$

$$\Delta G = -\overline{\Delta G_i} = -\frac{1}{N}\sum_{i=1}^{N}\Delta G_i$$

$$\Delta B = -\overline{\Delta B_i} = -\frac{1}{N}\sum_{i=1}^{N}\Delta B_i$$

where $(\Delta R_i, \Delta G_i, \Delta B_i)$ are the observer-specific offsets for the $i^{th}$ target observer given by:

$$\Delta R_i = R_{NC,i} - R_N$$

$$\Delta G_i = G_{NC,i} - G_N$$

$$\Delta B_i = B_{NC,i} - B_N \qquad (7)$$

and ($\overline{\Delta R_i}$, $\overline{\Delta G_i}$, $\overline{\Delta B_i}$) are the average offsets. The offsets determined in this manner correspond to the centroid of the observer-specific offsets. In some embodiments, a different type of central tendency measure can be used to combine the observer-specific offsets. For example, a geometric mean of the observer-specific offsets can be determined, a median offset can be determined, or a weighted averaging process can be used to weight some target observers more highly than others.

The metamerism correction 530 can be converted to any other appropriate form depending on the method used to implement the observer metamerism failure correction in a particular embodiment (e.g., the methods described with respect to FIGS. 8B-8D). The methods shown in FIGS. 9A-9B describe how an appropriate metamerism correction 530 can be determined for a particular input color 500, 550. These methods can be repeated for a plurality of different input colors 500, 550 to form the metamerism correction transform 460, 465 (FIGS. 8B-8D).

The set of input colors used in the formation of the metamerism correction transform 460, 465 are preferably a set of colors spanning the range of colors that are important to a particular application. In some cases, the set of input colors includes important memory colors, such as those shown in Table 1. In some cases, the set of input colors can include a set of colors representing the 11 basic color names that are present in most human languages: white, black, grey, red, green, blue, yellow, brown, purple, orange, and pink. Additionally, a collection of multimedia content can be analyzed to determine frequently occurring color categories using image analysis algorithms, such as for example, a k-means clustering algorithm, the identified clusters can be included in the set of input colors. In yet another embodiment, a list of colors can be chosen based on audience preferences, or other criteria useful in particular circumstances, such as proofing or calibration with standardized color targets. By such methods, the collection of corrected colors can be expanded.

In some cases the set of input colors can include a lattice of input colors that systematically samples the wide-band color gamut 330 of the wide-band primary display device. It can also be useful to provide project specific input colors, including specific wide gamut colors, for particular image content that are important for realizing the intended "look" of that content.

In some embodiments, the metamerism correction transform 460, 465 is a parametric function having a plurality of parameters (e.g., a multi-dimensional polynomial, or parameters defining a series of matrices and 1-D LUTs). In this case, metamerism corrections can be determined for a set of different input colors, and a mathematical fitting process (e.g., a well-known least-squares regression process) can be used to determine the parameters for the parametric function by fitting the set of input color 500, 550 and the corresponding set of metamerism corrections 530 or output colors 556.

In other embodiments, the metamerism correction transform 460, 465 is a multi-dimensional LUT that stores output color values (or metamerism correction values) corresponding to a lattice of input color values. In this case, the lattice of input color values can be used for the input colors 500, 550 and the stored output color values can be determined in accordance with the present invention (for example, using one of the methods shown in FIGS. 9A-9B). Alternately, the values stored in the multi-dimensional LUT can be determined by applying a fitting process to fit a smooth function to the set of input color 500, 550 and the corresponding set of metamerism corrections 530 or output colors 556. For example, commonly assigned U.S. Pat. No. 4,941,039 to D'Errico, entitled "Color image reproduction apparatus having a least squares look-up table augmented by smoothing" teaches a method for using a least-squares fitting process to provide a smooth multi-dimensional LUT.

Figure 10A:
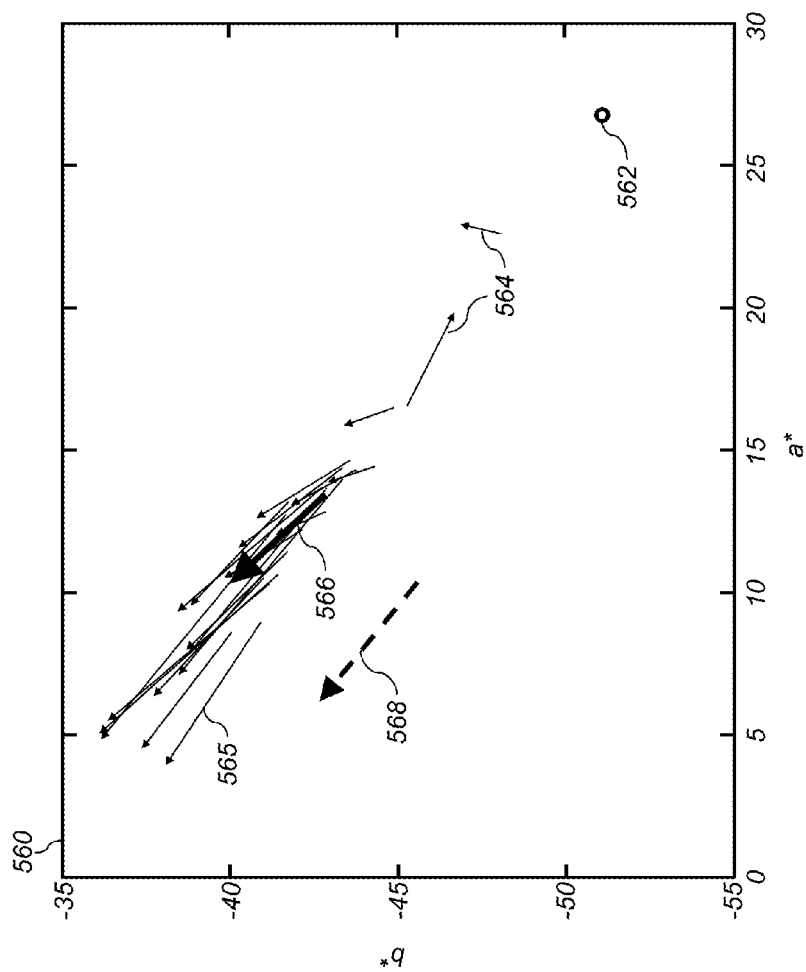
FIG. 10A shows an exemplary distribution of perceived color shifts determined relative to the CIE 2° color matching functions for a magenta input color.

Consider the case where the perceived color shift determination method 540 of FIG. 9A is used to determine the metamerism correction 530. A set of input colors 500 can be evaluated corresponding to a lattice of input color values for the wide-band primaries 502. FIG. 10A shows perceived color shift plot 560 including a set of target observer color vectors 565 corresponding to the target observer perceived color shifts 526 (FIG. 9A) for an input color 500 (FIG. 9A) in the magenta region of color space. An input color coordinate 562 is shown corresponding to the L*a*b* color of the input color 500 determined using the 1931 CIE 2° color matching functions 300a (FIG. 1B), indicating how the CIE standard observer would see this color. The tails of the target observer color vectors 565 correspond to the target observer perceived wide-band colors 518 (FIG. 9A) determined using the target observer color matching functions 514 (FIG. 9A). (The target observer color matching functions 514 used in the calculations were the aforementioned set of 10° color matching functions 300 (FIG. 1A) from Wyszecki and Stiles.) The heads of the target observer color vectors 565 (shown using diamond symbols) correspond to the target observer perceived narrow-band colors 522 (FIG. 9A) determined using the target observer color matching functions 514.

From FIG. 10A, it can be seen that there is a substantial amount of variability in the way that the target observers perceive the colors produced using the wide-band and narrow-band primaries, but that, with only a few exceptions, there is a general agreement that perception of the narrow-band colors are shifted in the yellow-green direction (i.e., in a negative a* and positive b* direction). It is noted that there are several outlier color vectors 564 having color shifts that are significantly different from the majority of the target observers. In some embodiments, it may be desirable to remove any outlier target observers from the set of target observers in order to avoid biasing the determined metamerism corrections 530. An average color vector 568 is shown corresponding to the average magnitude and direction of the target observer color vectors 565. (The position of average color vector 568 is offset from the set of target observer color vectors 565 for clarity.) It can be seen that both the tails and heads of the target observer color vectors 565 are shifted relative to the input color coordinate 562, indicating that none of the target observer color matching functions 514 are very close to the standard 1931 CIE 2° color matching functions 300a (FIG. 1B).

As mentioned earlier, in some embodiments, the metamerism correction 530 can be determined with respect to an average of the color shifts determined for the set of target observers, while in other embodiments it can be determined for an "average observer" having a set of combined color matching functions corresponding to an average of the target observer color matching functions 514. An average observer color vector 566 is shown corresponding to the color shift determined for this average observer. It can be seen that the magnitude and direction of the average observer color vector 566 is consistent with the general trend observed for the target observer color vectors 565. In many cases, it has been found that similar results can be obtained by either averaging the color shifts determined for the set of target observers to determine the average color vector 568, or by determining the average observer color vector 566 using the combined "average observer" color matching functions.

Figure 10B:
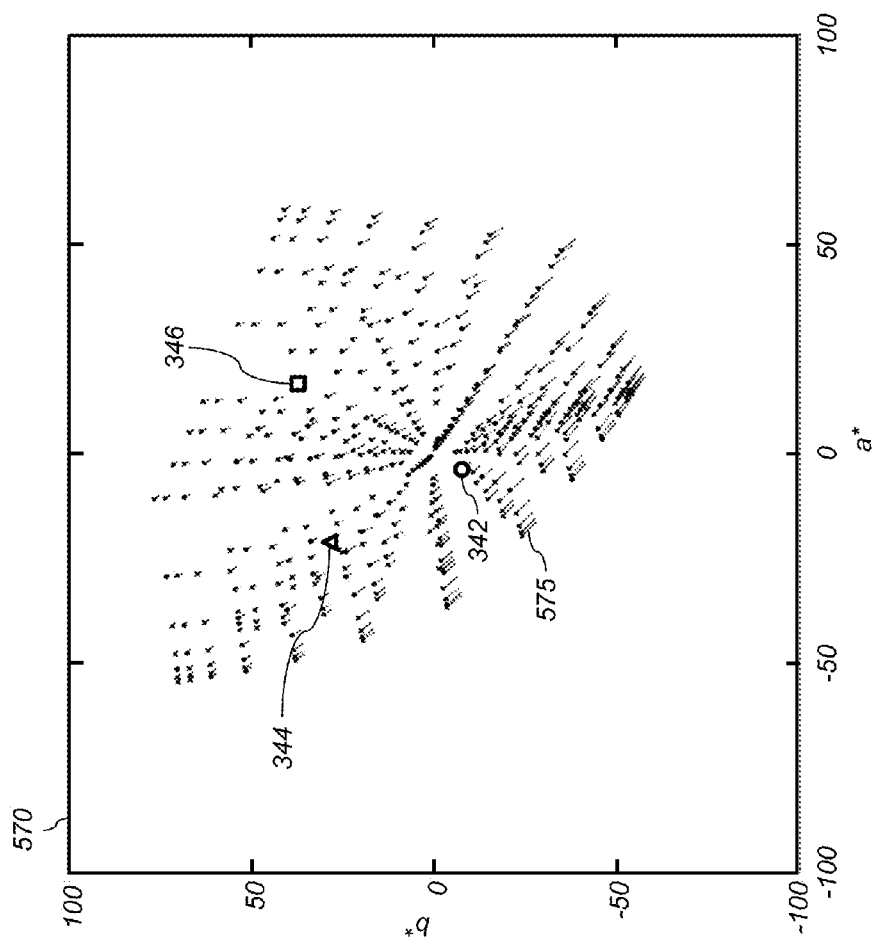
FIG. 10B shows average perceived color shifts determined for a set of different input colors relative to the CIE 2° color matching functions.

FIG. 10B shows an example of a perceived color shift plot 570 in CIELAB color space that includes a set of color vectors 575 representing average perceived color shifts determined in this manner, where the heads of the vectors are shown using diamond symbols. The tails of the color vectors 575 correspond to the input colors 500, and the magnitude and direction of the color vectors 575 correspond to the average of the target observer perceived color shifts 526 (FIG. 9A). The wide-band primaries 502 used in this example were those associated with the Barco model DP-1500 digital cinema projector, and the narrow-band primaries 504 were laser primaries having wavelengths of 465, 532, and 637 nm.

Also shown for reference are several memory colors represented by sky blue color coordinate 342, grass green color coordinate 344 and skin tone color coordinate 346. Significant perceived color shifts were observed for these memory colors were observed (i.e., sky blue≈4.4 $\Delta E^*$, grass green≈2.1 $\Delta E^*$ and skin≈2.0 $\Delta E^*$). Even more dramatic color shifts were observed for many saturated colors including saturated greens (≈3-4 $\Delta E^*$), saturated blues (≈4-6 $\Delta E^*$), and saturated magentas/violets (≈4-9 $\Delta E^*$). Color differences determined for many other colors were more modest (≈1-1.5 $\Delta E^*$), including many low saturations reds, yellows and greens.

It is seen that the color shifts indicated by color vectors 575 are generally directed to the upper left, indicating a shift in the perceived color towards a yellow-green direction. The magnitude of the color vectors 575 is generally larger in the negative $b^*$ portion of color space, indicating that the perceived color shifts are color dependent and are larger in the cyan-blue-magenta color regions than elsewhere. To compensate for these perceived color shifts, thereby reducing the average amount observer metameric failure, color-dependent compensating color shifts can be defined for the metamerism correction 530. In a preferred embodiment, the color-dependent compensating color shifts will have the same magnitude as the color vectors 575, but will be directed in the opposite direction (i.e., in a generally blue-magenta direction).

Figure 10C:
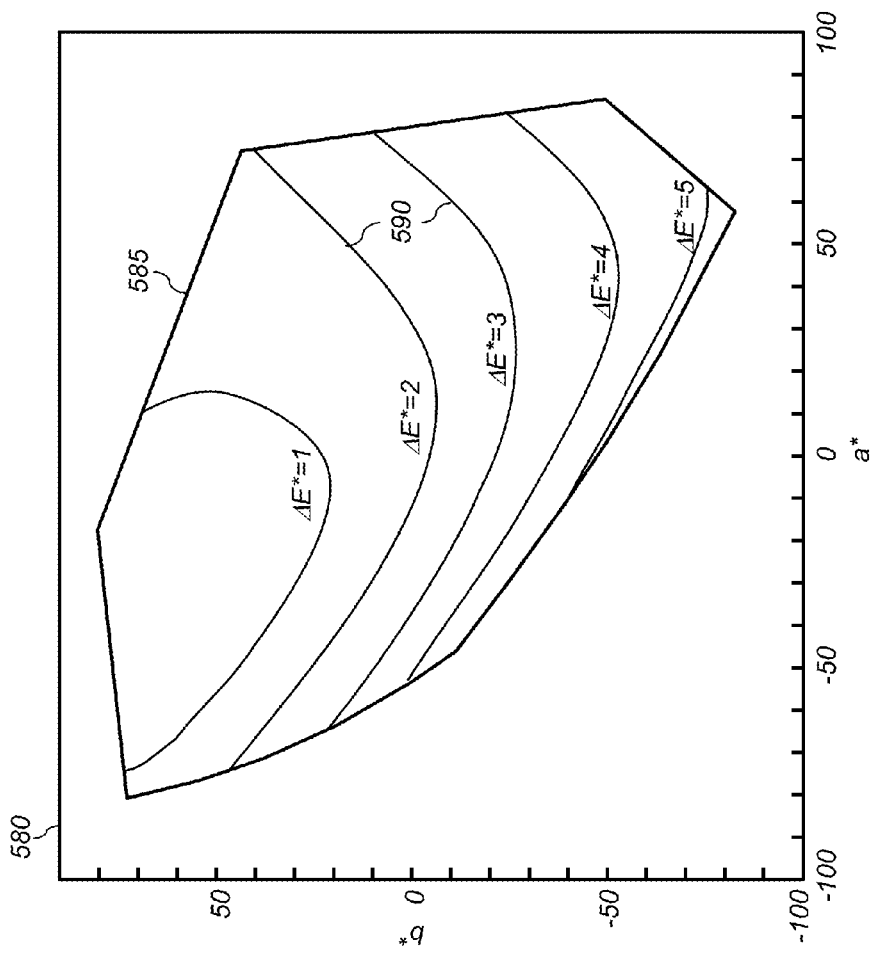
FIG. 10C shows a contour plot for color differences corresponding to the average magnitudes of the perceived color shifts in FIG. 10B.

FIG. 10C shows a perceived color difference plot 580 corresponding to the perceived color shift plot 570 of FIG. 10A. A target color gamut 585 is shown which is preferably slightly smaller than the range of colors that can be produced using the wide-band primaries 502 (FIG. 9A) to insure that all of the enclosed colors can be produced using both the wide-band primaries 502 and the narrow-band primaries 504. Within the target color gamut 585, a series of color difference contour lines 590 are shown indicating the average magnitudes of the color vectors 575 for the perceived color shifts in FIG. 10A as a function of $a^*$ and $b^*$. It can be seen that the magnitude of the perceived color shifts are color-dependent and range from about 1 $\Delta E^*$ to 5 $\Delta E^*$.

Taken together, FIGS. 10A-10C show that color dependent differences in color perception resulting from observer metameric failure can be reduced on average for an audience of observers 60, by applying metamerism corrections 530 (FIG. 9A) comprising color-dependent compensating color shifts to the input image colors that are to be displayed by projectors 100 that include one or more narrow-band primaries 504. These compensating color shifts would be greatest for blue, violet and magenta colors, and still significant for many green colors, but less significant (and perhaps unnecessary) for many red, yellow, and orange colors. These compensating color shifts can then be applied using many different arrangements, including those discussed with respect to FIGS. 8B-8D.

As noted earlier, neither both the tails and heads of the target observer color vectors 565 in FIG. 10A are shifted relative to the input color coordinate 562, reflecting the fact that none of the target observer color matching functions 514 (which in this example were the set of 10° color matching functions 300 (FIG. 1A) from Wyszecki and Stiles) are very close to the standard 1931 CIE 2° color matching functions 300a (FIG. 1B). This is not totally surprising because of the difference in the fields of view (2° vs. 10°). While the 1931 CIE 2° color matching functions 300a are generally used for digital cinema applications since the DCI digital cinema specification is based upon the 1931 CIE system of colorimetry, in some cases it may be appropriate to consider basing the metamerism correction calculations on the 1964 CIE 10° color matching functions 300b (FIG. 1B). For example, depending on the distance from the viewer to the screen, the contrast of the content being viewed, and the angular size of that content, often times a viewer's attention will perceive a field much larger than a 2° field. Therefore, the 1964 CIE 10° color matching functions 300b may represent an appropriate metric in some cases.

Considering the 1931 CIE 2° color matching functions 300a and 1964 CIE 10° color matching functions 300b, in greater detail, as shown in FIG. 1B, important differences emerge. It is noted that the CIE 10° color matching functions 300b deviate from the CIE 2° color matching functions 300a in the red, green, and blue regions of the wavelength spectrum, but the largest differences occur in blue region. In particular, it can be seen that the short wavelength color matching function peaks ~10% higher for the CIE 10° color matching functions 300b compared to the CIE 2° color matching functions 300a. Additionally, it can be seen that the location of the left edges of the main lobe of the long wavelength color matching functions are shifted between the respective CIE 2° color matching functions 300a and the CIE 10° color matching functions 300b. These differences in the color matching functions will result in different metameric characteristics.

Further, it is observed that the short wavelength color matching function is both spectrally narrower by ~2× (55 nm FWHM for blue, vs. 110 nm for green, and 90 nm for red) and higher gained (≈1.68× greater for 1931 color matching functions; ≈2× greater sensitivity with 1964 color matching functions) compared to the medium and long wavelength color matching functions. Alternately stated, the short wavelength (blue) color matching function slope sensitivity is much higher, and therefore small variations in the spectra of a narrow-band blue primary, or in an observer color matching function, in the short wavelength region can cause larger perceptual differences than in other regions. Indeed, the modeling indicates that small changes in the short wavelength color matching functions have ~2× the contribution to the perceived color shifts relative to changes in the medium or long wavelength color matching functions. The comparatively high gain for the short wavelength (blue) cones likely compensates for their scarcity, as red and green cones predominate, with only ~5% of retinal cones being of the short wavelength (blue) variety. In general, human perception of blue is inferior to that for red and green image content, relative to resolution, flicker sensitivity, and many other criteria.

Figure 1B:
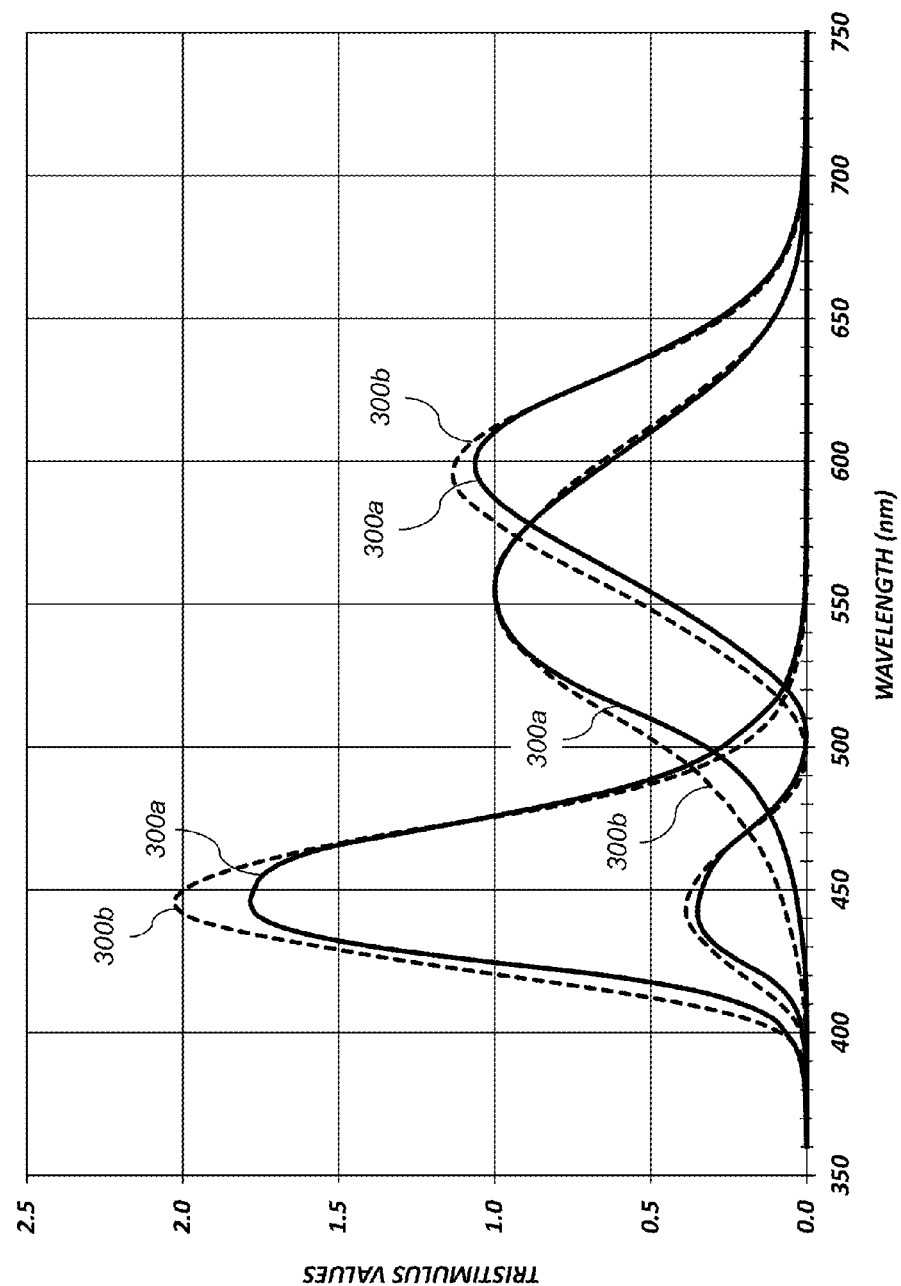
FIG. 1B depicts the 1931 CIE 2° color matching functions and the 1964 CIE 10° color matching functions.
Figure 2:
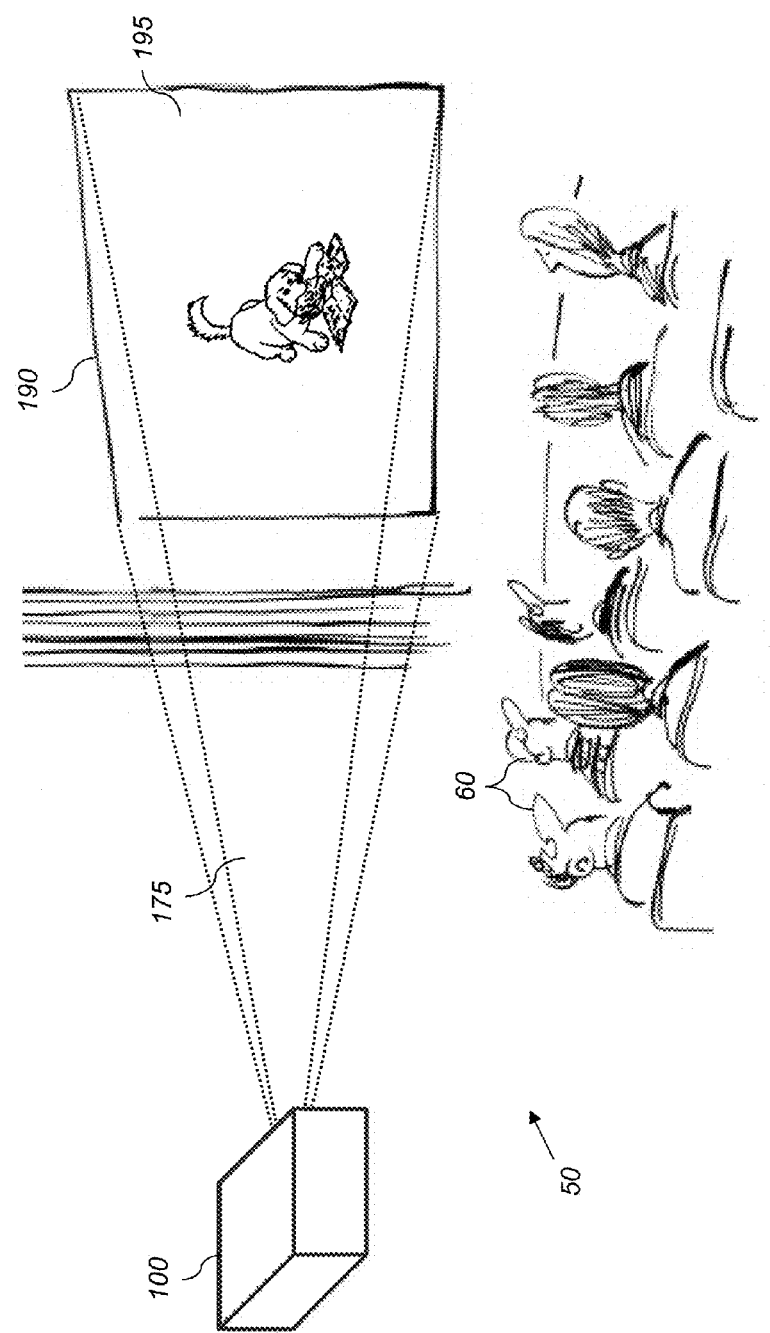
FIG. 2 depicts an audience of observers viewing a projected image.

In further considering the color matching functions 300 shown in FIG. 1A, it is also notable that perception of many bluish colors depends on responses of all the three color matching functions, whereas for the perception of many green and red colors, the response of the short wavelength color matching function is a non-factor. Color perception can be thought of as a differencing mechanism, as represented by opponent models of color vision. In particular, the sensation of "blueness" can be described as the contribution of the short (S) wavelength cones exceeding the sum of the middle (M) and long (L) wavelength cones [S>L+M]. In this context, the color matching functions 300 suggest that differential blue light perception can occur because of significant cone response variations among observers for all three cones, whereas for red and green light color perception above 540 nm, essentially only two cone responses are involved, and they may therefore exhibit smaller perceived color difference variations.

Figure 11A:
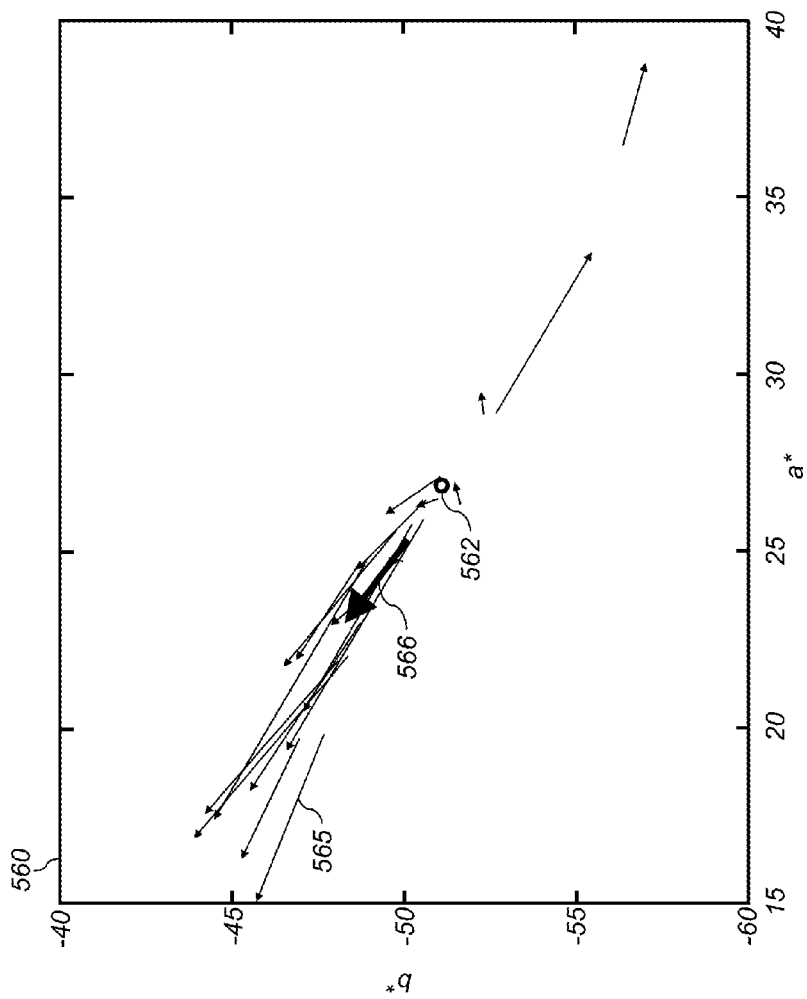
FIG. 11A shows an exemplary distribution of perceived color shifts determined relative to the CIE 10° color matching functions for a magenta input color.
Figure 11B:
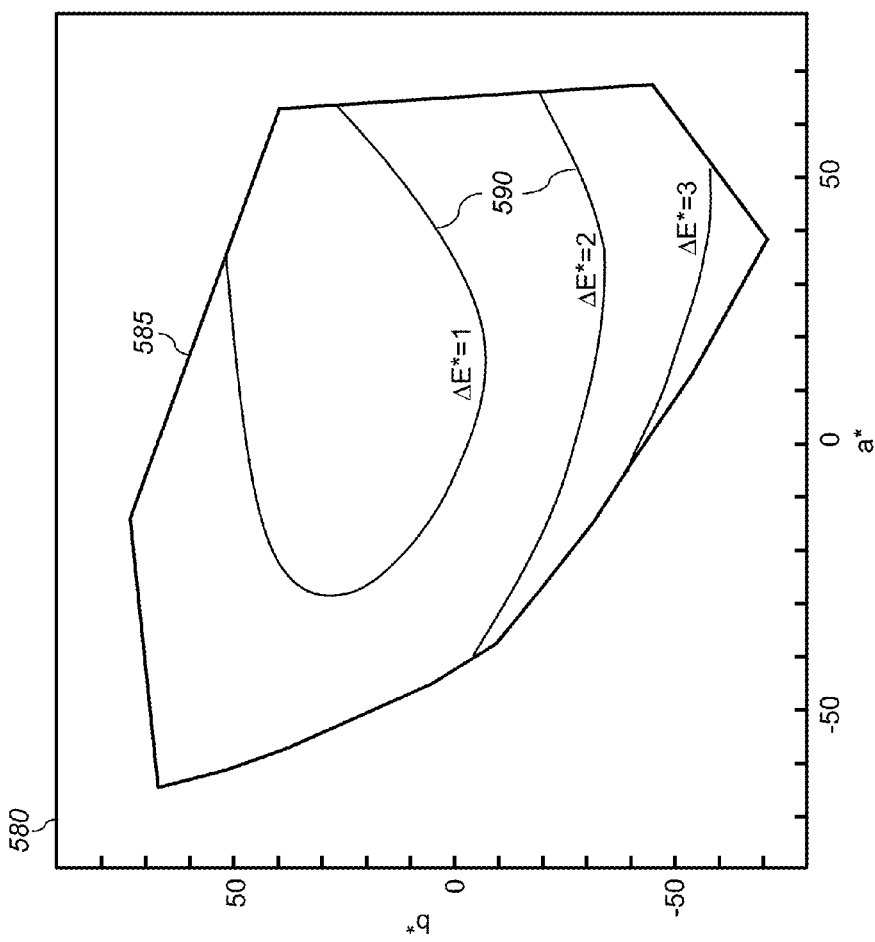
FIG. 11B shows a contour plot for color differences corresponding to the average magnitudes of the perceived color shifts determined relative to the CIE 10° color matching functions.

FIG. 11A shows a target observer color vectors 565 analogous to that shown in FIG. 10A, where in this case the wideband spectrum 508 (FIG. 9A) and the narrow-band spectrum 512 (FIG. 9A) were determined to provide the input color 500 (FIG. 9A) relative to the 1964 CIE 10° color matching functions 300b (FIG. 1B). As with FIG. 10A, the target observer color matching functions 514 used in the calculations were the aforementioned set of 10° color matching functions 300 (FIG. 1A) from Wyszecki and Stiles.

Comparing FIG. 10A to FIG. 11A, it can be seen that the tails and heads of the target observer color vectors 565 are shifted closer to the input color coordinate 562, reflecting the fact that the target observer color matching functions 514 are closer to the standard 1964 CIE 10° color matching functions 300b. However, it can be seen that most of the target observers still observe a similar color shift in the yellow-green for the narrow-band colors relative to the wide-band colors that have the same CIE colorimetry. Therefore the metamerism corrections 530 (FIG. 9A) determined in this case would be similar to those determined using the data in FIG. 10A. FIG. 11B shows a perceived color difference plot 580 analogous to that shown in FIG. 10C, where the color perception differences were calculated for input colors that match relative to the 1964 CIE 10° color matching functions 300b. It can be seen that the average size of the perceived color differences is somewhat smaller, but that there is still a substantial amount of average perceived color difference due to the observer metameric failure. The largest color perception differences are again present for magenta colors. Thus, it has been established that observer metameric failure, as characterized by color-dependent color perception differences, exists regardless of the CIE standard observers is used as reference.

The particular set of standard observer color matching functions (300a or 300b) and the particular set of target observer color matching functions 514 that are used to determine the metamerism correction 530 can be application dependent. In cases where the input colors are specified with respect to the 1931 CIE system of colorimetry, it will generally be appropriate to use the 1931 CIE 2° color matching functions 300a to determine the colorimetrically matching colors. The most appropriate set of target observer color matching functions 514 can be dependent on the target audience. In some embodiments, several different metamerism corrections can be determined using different combinations of standard and target observers, and the results can be evaluated using a set of observers to select the preferred amount of correction. For example, as human color matching functions can with observer age (e.g., due to yellowing of the eye lenses), having sets of target-observer color matching functions 514 that are demographically broad and others that are filtered by age (e.g., ≤28 years old, ≥55 years old) may be relevant. Thus, for example, sets of target-observer color matching functions 514 can be developed for demographic sub-groups of target observers, such as youth, and then used when displaying content that is predominately watched by such as an audience. As another example, measurement or assembly of a set of target-observer color matching functions 514 optimized for cinema equivalent viewing conditions can also account for characteristics such as viewing distances and field size.

The above calculations were performed using the nominal laser primaries (i.e., red laser primary 422 at 637 nm, green laser primary 424 at 532 nm and blue laser primary 426 at 465 nm) shown in FIG. 1A. It is noted that these analyses were also repeated using the alternate Thornton primaries shown in FIG. 1A (i.e., Thornton red laser primary 432 at 610 nm, Thornton green laser primary 434 at 530 nm and Thornton blue laser primary 436 at 450 nm). From FIG. 1A, it is seen that the Thornton green laser primary 434 and the nominal green laser primary 424 are quite similar, (530 nm vs. 532 nm), but that both the Thornton blue laser primary 436 and the Thornton red laser primary 432 are shifted to lower wavelengths compared to the exemplary blue laser primary 426 and red laser primary 422 (450 nm vs. 465 nm, and 610 nm vs. 637 nm, respectively). Although the Thornton primaries align more closely with the peaks of the three spectral sensitivities of the normal human visual system, they also line up comparatively at or near the peaks or maximum difference in observer variation in color matching functions, compared to the nominal primaries. As a result, for the analysis using the Thornton primaries for the narrow-band primaries 504, it was found that color perception differences followed the same general trends as those of FIG. 10B, but the magnitudes were about 2-3× larger. This suggests that the use of the Thornton primaries would actually provide greater observer metameric failure.

The metamerism corrections 530 determined using the methods discussed above are based on determining target observer perceived color shifts 526 (FIG. 9A) between colorimetrically matching colors displayed using the different sets of primaries, or determining narrow-band matching output colors 556 (FIG. 9B) that match wide-band input colors 550. These processes can only be applied to input colors 500 and 550 that are within the color gamuts of both the wide-band primaries 502 and the narrow-band primaries 504.

There are many colors that are within the narrow-band color gamut (e.g., the laser primary color gamut 335 of FIG. 6) that are outside of the wide-band color gamut. Therefore, projectors 100 that employ narrow-band primaries may be called on to display input colors that cannot be reproduced with conventional systems using wide-band primaries. As a result, the metamerism correction transform 460 (FIG. 8D) should be adapted to process colors both inside and outside of the color gamut associated with the wide-band primaries.

The color shifts applied for input colors that are outside of the wide-band primary color gamut can be determined in a variety of ways. It will generally be preferable that there be no abrupt changes in the applied color shifts to avoid contouring artifacts where small differences in the input color produce large perceived differences in the displayed color. In some embodiments, the metamerism corrections 530 determined for colors inside of the wide-band primary color gamut can be extrapolated to those colors that are outside of the wide-band primary color gamut. Methods for extrapolating a function are well-known in the art.

Figure 12:
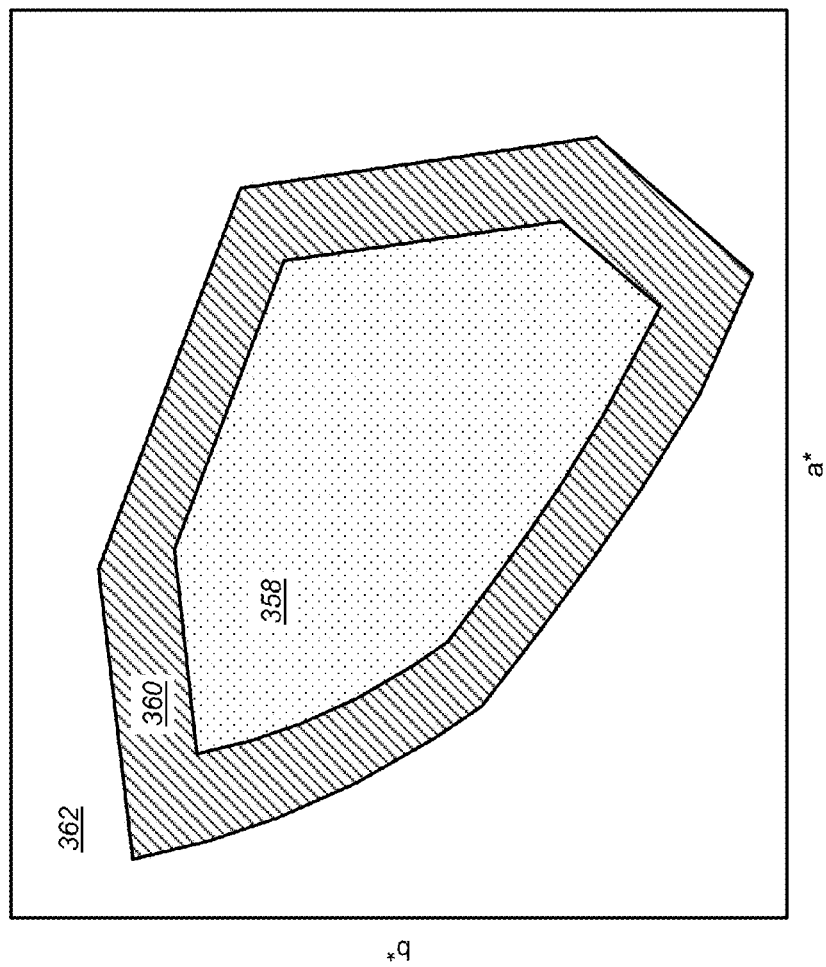
FIG. 12 shows a transition zone between an inner color gamut and an extended color gamut zone.

FIG. 12 shows a cross-section through CIELAB color space, including an inner color gamut 358, an extended color gamut zone 362 and a transition zone 360. Preferably, the inner color gamut 358 is a conventional color gamut corresponding to a particular set of wide-band primaries 502 (FIG. 9A). For example, the inner color gamut 358 can correspond to the wide-band color gamut 330 of FIG. 6 (translated to CIELAB). In other cases, inner color gamut 358 can be smaller or larger than the conventional color gamut. In a preferred embodiment, color shifts to be applied for colors inside the inner color gamut 358 are determined using a method such as those discussed with respect to FIGS. 9A-9B to determine appropriate metamerism corrections 530.

For highly saturated colors in the extended color gamut zone 362, no color shifts are applied. Such colors are not generally seen in nature, and therefore people typically lack expectations of their color appearance, or even language or metrics to describe their differential color perceptions. As such, differences in color perception of such colors among observers 60 can be acceptable. Furthermore, since these colors cannot be produced by the conventional systems, there will be no need to correct for color perception differences.

Transition zone 360 is preferably provided between the inner color gamut 358 and the extended color gamut zone 362 to provide continuity between the color regions. Within the transition zone 360, the color shifts are smoothly transitioned from the metamerism corrections 530 determined for the colors within the inner color gamut 358 down to no color shifts in the extended color gamut zone. The use of the smooth transition avoids introducing contouring artifacts where colors that are very close to each other in an input image are mapped to colors that are far apart in the displayed image, resulting in a visual discontinuity. Such artifacts would be particularly objectionable for pixels contiguously describing an object (e.g., a ball) locally within the image content. Such artifacts would be more likely for colors in the blue/magenta/violet portions of color space, where large color dependent color perception difference values ($\Delta E^*$) have been found (see FIGS. 10C, 11B).

In some embodiments, the transition zone 360 can extend out a fixed distance (e.g., 10 $\Delta E^*$) from the surface of the inner color gamut 358. In other embodiments, the width of the transition zone 360 can be adjusted according to the characteristics of the metamerism corrections 530 applied near the surface of the inner color gamut 358. In some embodiments, the width of the transition zone can be set to be a multiple (M) of the magnitudes of the color shifts being applied at the corresponding location on the surface of the inner color gamut 358. For example, the width of the transition zone 360 can be M×($\Delta E^*$), where M=4. Accordingly, if the color shift at the surface of the inner color gamut 358 in a blue hue direction is 5 $\Delta E^*$, then the width of the transition zone can be set to 4×5 $\Delta E^* = 20\ \Delta E^*$.

Figure 13:
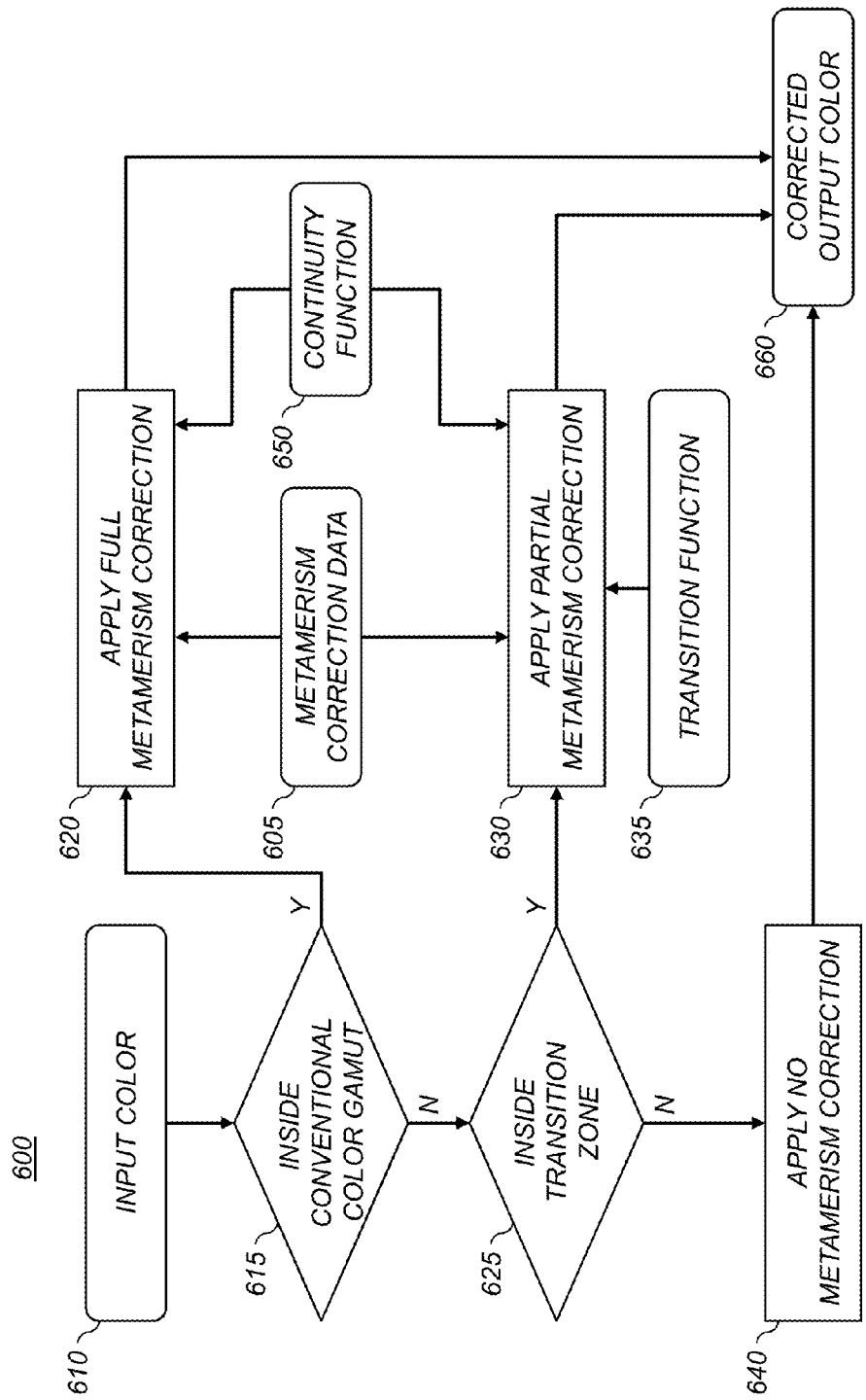
FIG. 13 is a flow chart of a method for determining a corrected output color in accordance with the present invention.

FIG. 13 provides an exemplary metameric failure compensation method 600 for determining a corrected output color 660 by providing compensating color shifts to an input color 610. The input color 610 is typically a color value associated with an image pixel an image which is to be displayed by the projector 100 (FIG. 3). In a preferred embodiment, the input color 610 is specified such that it has the desired color appearance on a display having conventional wide-band primaries 502 (FIG. 9A).

In some embodiments, the metameric failure compensation method 600 of FIG. 13 can be performed by a data processing system within the projector data path 200 (FIG. 4) of projector 100 (e.g., by the metameric color corrector 250). In other embodiments, the method is performed ahead of time during the formation of a color transform (e.g., metamerism correction transform 460 in FIG. 8B), which is stored for application to the image data at a later time.

Metamerism correction data 605 provides an indication of appropriate metamerism corrections 530 (FIG. 9A) determined for colors inside the conventional color gamut test 615 in accordance with the present invention using methods such as those described in FIGS. 9A-9B. An inside conventional color gamut test 615 determines whether the input color 610 is inside the inner color gamut 358 (FIG. 12). If so an apply full metamerism correction step 620 applies the appropriate metamerism correction color shift from the metamerism correction data 605 and applies it to the input color 610 to determine the corrected output color 660.

The apply full metamerism correction step 620 can apply the metameric corrections by various mathematical and processing approaches. For example, in Section 3.5, of the book *Computational Color Technology* (Society of Photo-Optical Engineers, Bellingham, Wash., 2006) by H. R. Kang, several methods for applying metameric correction functions are mathematically described. Although Kang does not provide a theory or model for determining appropriate metameric corrections, as compared to the present invention which provides methods for determining such metameric corrections, Kang does provide an architecture for applying color corrections to input color data. One of the methods is additive correction. In accordance with Kang, the additive correction is performed in L*a*b* space, where the correction in each color channel is specified as a color difference vector ($\Delta L^*, \Delta a^*, \Delta b^*$). Alternately, Kang provides that a multiplicative correction that can be performed in CIE XYZ tristimulus space. In that case, tristimulus values of the input colors are multiplied by a set of ratios. Any of these methods can be used to apply the metamerism corrections of the present invention.

If the image content only includes input colors 610 within the inner color gamut 358, the corrected image data would consist of pixel data solely determined using the apply full metamerism correction step 620. If however, the image content includes input colors 610 outside the inner color gamut 358, then image pixels having such colors can be subjected to further analysis. If the inside conventional color gamut test 615 determines that a particular input color 610 is not inside the inner color gamut 358, an inside transition zone test 625 determines whether the input color 610 is in the transition zone 360 (FIG. 12). If not, it can be assumed that the input color 610 is in the extended color gamut zone 362 (FIG. 12). In this case, an apply no metamerism correction step 640 sets the corrected output color 660 to be equal to the input color 610.

If the inside transition zone test 625 determines that the input color 610 is in the transition zone 360, an apply partial metamerism correction step 630 is used to apply a fraction of the metamerism correction at a corresponding point in the surface of the inner color gamut 358. The partial metamerism correction is then applied to the input color 610 to determine the corrected output color 660. A transition function 635 is used to specify an appropriate fraction of the metamerism function that should be applied as a function of the relative position of the input color 610 within the transition zone 360. In a preferred embodiment, the transition function 635 linearly tapers the amount of metamerism correction from 100% at the surface of the inner color gamut 358 down to 0% at the outer surface of the transition zone 360, where the outer edge is given by the previously defined transition zone width. In this way, continuity is preserved so that there are no abrupt changes in the corrected output color 600.

Figure 14:
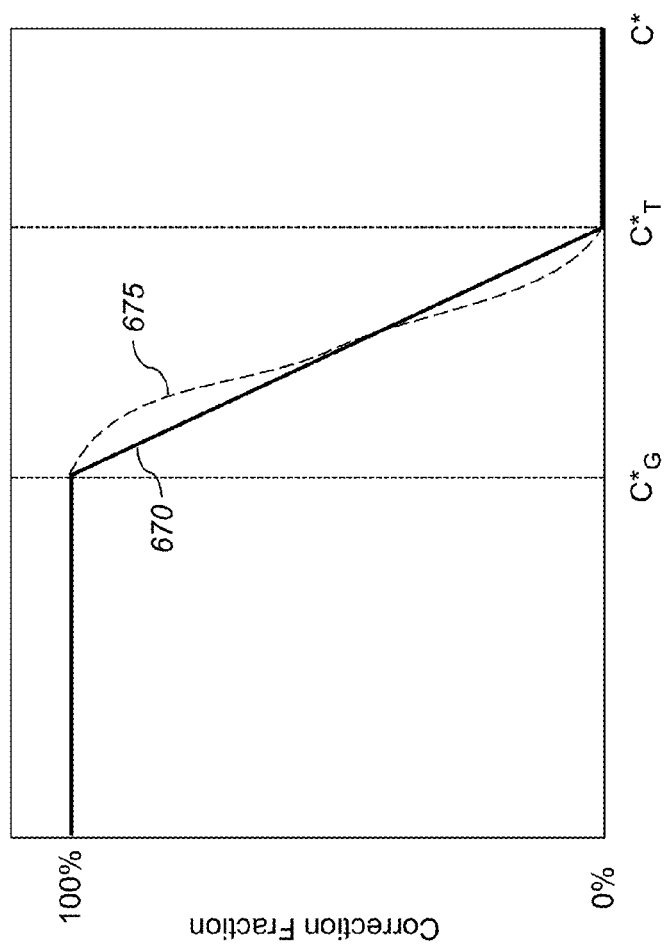
FIG. 14 illustrates exemplary transition functions useful for the method of FIG. 13.

FIG. 14 shows an example of a linear transition function 670 than can be used for the transition function 635 (FIG. 13). The input to the transition function 635 is the distance of the input color from the neutral axis of the color space. If the input color is expressed in terms of L*a*b* values, the radius is given by the C* value where ($C^* = (a^{*2} + b^{*2})^{0.5}$). The radius of the inner color gamut 358 at the corresponding hue and lightness is given by $C^*_G$, and the outer radius of the transition zone 360 is given by $C^*_T$. The output of the transition function 635 is the correction fraction, which ranges from 0% to 100%.

In other embodiments, the transition function 635 can apply other types of transition functions, such as a sigmoid transition function 675.

In some embodiments, a continuity function 650 can help maintain visual color continuity within discrete objects provided locally within the image content. For example, image content analysis can analyze the pixel values of the digital image to identify object areas having similar colors (e.g., a red ball, for example). Care can then be taken to apply consistent metameric shifts within each object area. In some embodiments, the continuity function 650 can specify that the same metamerism correction be applied to all image pixels within an object area. In some embodiments, the continuity function can apply a constraint that avoids applying metamerism corrections that cause a hue shift out of a colors range that is generally recognized by a given color name. Such hue shifts are most likely to occur at hue boundaries or for hues that occupy small portions of color space (e.g., yellow).

In some embodiments, rather than applying no metamerism correction to colors in the extended color gamut zone 362, it may be found to be desirable to define metameric corrections based on some other criterion besides that is not based on reducing color appearance differences between specified sets of wide-band primaries 502 and narrow-band primaries 504. In this case, the apply no metamerism correction step 640 can be replaced with a step that applies the desired metamerism correction. The apply partial metamerism correction step 630 can then be used to transition between the metamerism corrections applied inside the inner color gamut 358 and the extended color gamut zone 362.

In an alternate embodiment, the method described in commonly-assigned U.S. Pat. No. 5,583,666 to Ellson et al., entitled "Method for cross-device color calibration and enhancement using explicit constraints," can be used to provide the smooth transition within the transition zone 360. Accordingly, a first subset of input colors is defined including input colors within the inner color gamut 358, and a second subset of input colors is defined including input colors within the extended color gamut zone 362. A first color transform in accordance with the metamerism corrections 530 is assigned to the first subset of input colors, and a second transform that preserves the input colors is assigned to the second subset of input colors. A third subset of input colors is formed including the input colors that are not included in the first and second subsets. The third subset of input colors will contain the input colors in the transition zone 360. A color transform for the input colors in the third subset is defined which preserves continuity with the transforms assigned to the first and second subsets. In some embodiments, the color transform for the input colors in the third subset is determined using an appropriate interpolation method.

In some embodiments, rather than applying the full metamerism corrections throughout the entire inner color gamut 358, the metameric corrections can be applied selectively to localized color regions, such as for memory colors like sky blue, skin tones, grass green, white, grays, and other critical or widely recognized colors. Selective metameric color corrections may also be applied to certain target colors that are particularly important for a given production or film. Transition zones 360 can then be defined around each of the localized color regions to provide for smooth transitions of the metameric corrections.

In some embodiments, rather than applying no metamerism correction to colors in the extended color gamut zone 362, it may be desirable to define metameric corrections based on some other criterion than on reducing color appearance differences between specified sets of wide-band primaries 502 and narrow-band primaries 504. In this case, the apply no metamerism correction step 640 can be replaced with a step that applies the desired metamerism correction. The apply partial metamerism correction step 630 can then be used to transition between the metamerism corrections applied inside the inner color gamut 358 and the extended color gamut zone 362.

The method of the present invention has been described with the reference to correcting observer metameric failure artifacts between a first display having wide-band primaries 502 and a second display using narrow-band primaries 504. However, the described method can also be applied to correcting observer metameric failure artifacts between two displays both of which use narrow-band primaries. For example, a first narrow-band display system using a first set of narrow-band primaries can be a studio or screening room reference system, and a second narrow-band display system using a second set of narrow-band primaries can be deployed in cinematic or residential distribution. As the deisplay systems evolve with newer technologies, use of a standard or reference system having specified standard primaries can provide a standard distribution encoding and can enable archival storage, but without providing observer metameric failure correction, the colors would not have the desired appearance if they were directly displayed on a system having a different set of primaries. Thus, it should be understood that a similar process can be applied to adapt input data that was previously prepared for viewing by a particular display with a first set of narrow-band primaries for viewing by an alternate display with a second set of narrow-band primaries. In this case, the wide-band primaries 502 in the above-described methods can simply be replaced with the first set of narrow-band primaries, and the second set of narrow-band primaries can be used for the narrow-band primaries 504.

As noted previously, digital cinema image content is commonly distributed as data files encoded according to the DCDM digital cinema specification. Today, these images are optimized for projection by a projector having three broad bandwidth primaries (e.g., using filtered xenon lamp light, as represented by digital cinema projector spectrum 410, in FIG. 5). As shown in FIG. 4, after file decryption and decompression, any necessary projector specific image corrections are applied via image processor 240, before the data is passed forward for projection. For example, these corrections can further optimize the incoming image data for projection by a DLP or LCOS based projector, as appropriate. However, for the purposes of the present invention, projector 100 can further include metameric color corrector 250 that alters the color reproduction to optimize the incoming image data for projection by a narrow-bandwidth primary projector for the purpose of reducing the occurrence of observer metameric failure. As an example, metameric color corrector 250 can provide CIEXYZ space multiplicative scaling corrections or CIELAB additive corrections to compensate for the metameric failure induced color shifts shown in FIGS. 7A-7D and 10A-10B. In particular, the incoming data can be altered to apply metamerism corrections 530 (FIG. 9A-9B) to compensate for to the average perceived color shifts, so that the observers 60 (FIG. 2) will tend to view the displayed colors on the narrow-band projection system as being closer to the colors that they would see if the image were displayed on a conventional wide-band projection system.

As the present invention has been described thus far, the image processor 240 and metameric color corrector 250 reside within the projector data path 200 and provide the image analysis that identifies image content or colors that can benefit from metameric failure color correction, and then provide the appropriate color corrections. Metameric color corrector 250 can use matrices, look-up tables (LUTs), parametric functions or algorithms, or combinations thereof, to apply appropriate metamerism corrections 530. Metameric color corrector 250 can also be enabled using a programmable logic device, such as a FPGA device. A memory or frame store can be included with image processor 240, to compile the altered image frame, including both normal image quality corrections provided by image corrector 245 and metameric failure reduction image corrections provided by metameric color corrector 250. The resulting image frames can then be passed to frame buffer 260.

Alternately, the data processing system that applies metameric failure color corrections can be operated at the content source (including studios, post-house, cinematographer, or colorist) or other location, such that pre-corrected image data files or image data altering files can be delivered to the exhibitor. For example, when it is determined or known that the image content will be viewed on a display with narrow-band primaries, whether in a cinema, home theatre, or other venue, pre-color corrected image content can be provided or pre-determined, and accompanying metadata or data files with the DCDM content files can enable or provide the metameric color corrected image content.

In summary, the previously discussed papers by Konig et al., Fairchild et al., and J. Bergquist, suggested that observer metameric failure can only be effectively reduced by displays using N>3 nominally intermediate- to wide-band (e.g., 30-100 nm) primaries. However, the present invention provides a method applicable to displays having N=3 narrow-band primaries by which color-dependent metamerism corrections 530 are determined and applied to reduce the average magnitude of observer metameric failure for a set of target observers. In particular, the exemplary metameric correction modeling methods of FIGS. 9A-9B are used to calculate appropriate metamerism corrections 530. These metamerism corrections 530 can then be applied via the exemplary metameric failure compensation method 600 of FIG. 13 to provide at output corrected output colors 660 as appropriate on a pixel-wise basis. However, while this method primarily corrects for the predominant shifts in color perception (e.g., the yellow-green color shifts observed in the exemplary color perception difference plots of FIGS. 7A-7D), other approaches for reducing observer metameric failure can complement or extend this method.

The displays and projectors 100 of the present invention have been nominally described as being three primary (N=3) systems, where the three primaries are each provided by narrow-band light sources (e.g., lasers or LEDs). However, it will be obvious to one skilled in the art that the inventive method can also be used in displays having mixed primaries, where some primaries are narrow-band and other are wide-band. As one example, a display system having two narrow-band primaries (e.g., red and green) and one wide-band primary (e.g., blue) can still apply metameric corrections determined in accordance with the present invention to compensate for the observer metameric failure contributions from the use of the narrow-band primaries.

The discussion to this point has assumed that the input color is adapted for display on a conventional wide-band display, and has generally been directed at reducing color perception differences between the wide-band display and a narrow-band display that result from observer metameric failure. However, observer metameric failure will also cause perceived color differences between two narrow-band displays having different sets of narrow-band primaries. For example, an input image can be optimized to be displayed on a narrow-band display having a first set of narrow-band primaries, and it can be desired to apply appropriate metemaric corrections in order to display the image on a narrow-band display having a second set of narrow-band primaries. The method of the present invention can also be used to compensate for these color differences. In this case, the wide-band primaries 502 in FIGS. 9A-9B can be replaced with the first set of narrow-band primaries, and the second set of narrow-band primaries can be used for the narrow-band primaries 504.

As another example, a six primary projection system could be constructed where three wide-band primaries ($R_w G_w B_w$) define a conventional color gamut and three narrow-band primaries ($R_n G_n B_n$) define an extended color gamut. In operation, the three wide-band primaries principally provide colors within the conventional color gamut, while the three narrow-band primaries principally provide colors extending to the boundaries of the extended color gamut, but not the colors inside the conventional wide-band color gamut 330. In such an example, the color perception difference modeling method described herein can be used to determine perceived color difference values and corresponding metamerism corrections 530 for pixels having colors that are displayed using the narrow-band primaries, or with combinations of the wide-band and narrow-band primaries. Scaled color corrections and transitions zones 360 can be used for colors near the boundary of the conventional wide-band color gamut 330, and can overlap with the conventional wide-band color gamut 330 produced by the wide-band primaries (RwGwBw). This approach has the disadvantage that two complete projectors are essentially required, which likely have many significantly different optical components as the light sources are so different. However, it has the advantage of providing an expanded color gamut, while reducing the occurrence of observer metameric failure artifacts.

The invention can also be applied to display systems having more than three narrow band primaries (e.g., N=6). Such systems can be useful for expanding spectral color diversity so as to reduce observer metameric failure among the observers 60, while using a common optical design with mostly identical components. For example, such a display system can have two blue laser primaries (e.g., 445 nm and 465 nm), two green laser primaries (e.g. 532 nm and 560 nm), and two red laser primaries (e.g. 632 nm and 650 nm). In some embodiments, a first projector 100 (FIG. 4) can display an image using one set of primaries (e.g., 445 nm, 560 nm, and 650 nm) onto the display surface 190, and a second projector 100 can display an overlapping image using the second set of primaries (e.g. 465 nm, 532 nm, and 632 nm) onto the same display surface 190. As a result, a color provided for a pixel, unless it is on or very near the spectrum locus 325, can be rendered using primaries provided by both projectors 100. As both the white point color balance and the primary color coordinates of the two projectors 100 will not be identical, the data signals provided to the spatial light modulators 170 are not identical between common (e.g., blue) color channels for the two projectors 100. This display system, per the present invention, can use the color perception difference modeling method and the metameric failure correction method described above to provide metamerism corrections 530 appropriate for the image data provided by each projector 100.

This approach bears some similarity to the projection technology of Infitec GmbH, Ulm, Germany, which uses wavelength multiplexing with two sets of color primaries to provide 3-D imagery to observers 60 who are wearing appropriate viewing glasses. The Infitec approach provide channel separation for stereo projection by filtering broadband light sources to match left and right eye color band filter glasses (e.g., left eye: red=629 nm, green=532 nm, blue=446 nm, and right eye: red=615 nm, green=518 nm, blue=432 nm). In contrast, although the exemplary N=6 laser primary projector may provide 3-D imagery, it mainly provides reduced observer metameric failure with narrow primaries by increasing spectral color diversity providing while providing metamerism corrections 530 per the method of the present invention, thus addressing a distinct and separate problem.

As a variation on N=6 laser primary projection, one projector 100 can be used instead, where each spatial light modulator 170 receives illumination light from both types of laser sources for that color. In that case, white point balancing can essentially work with a wavelength averaged color channel. While the greater spectral color diversity is still present, and only one projector 100 is required, controlling color reproduction can be more difficult.

Alternately, each color channel can use the two laser wavelengths per color in a sequentially time multiplexed fashion (e.g., scrolling color), using both sets of primaries within a frame time to render the pixel colors. Such spectral color time multiplexing depends on the modulation capabilities within the display or projector 100. In the case of digital cinema systems, the base projection frame rate is typically 24 fps (or 24 Hz), which corresponds to a frame time of 41.67 ms. In a film projector, a shutter effectively doubles the frame rate to reduce flicker perception by providing two pulses of illuminating light to a film frame. Digital or electronic projectors can have similar frame replication effects.

Figure 15A:
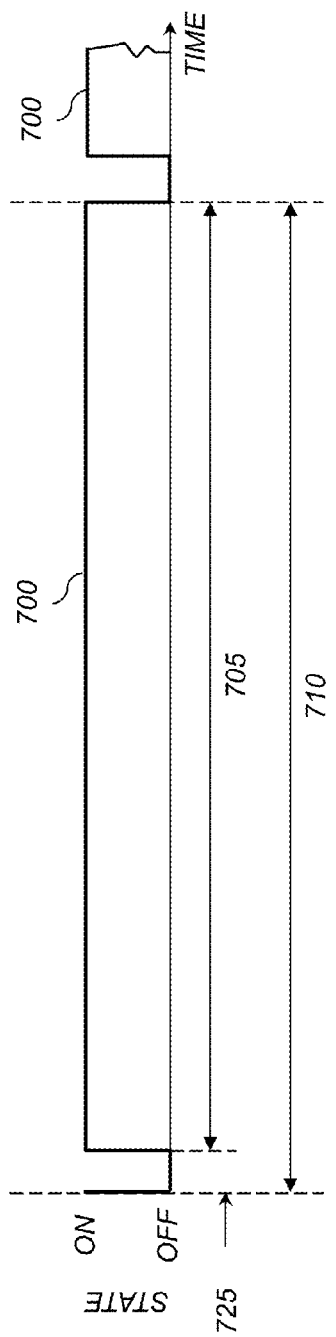
FIGS. 15A and 15B depict frame and sub-frame timing diagrams, respectively.

Consider the timing diagram of FIG. 15A, in which an image frame 700 is projected during a frame time 710 that includes a blanking time 725 and a frame ON time 705. The blanking time 725 is an OFF state, during which light is nominally not sent to the display surface 190 (FIG. 2), and other activities occur (e.g., the loading of image data). The frame ON time 705 is the portion of the frame time 710 during which the projector 100 (FIG. 2) provides image light to the 190 with the light intensity in spatial and temporal accordance with the image content.

Figure 15B:
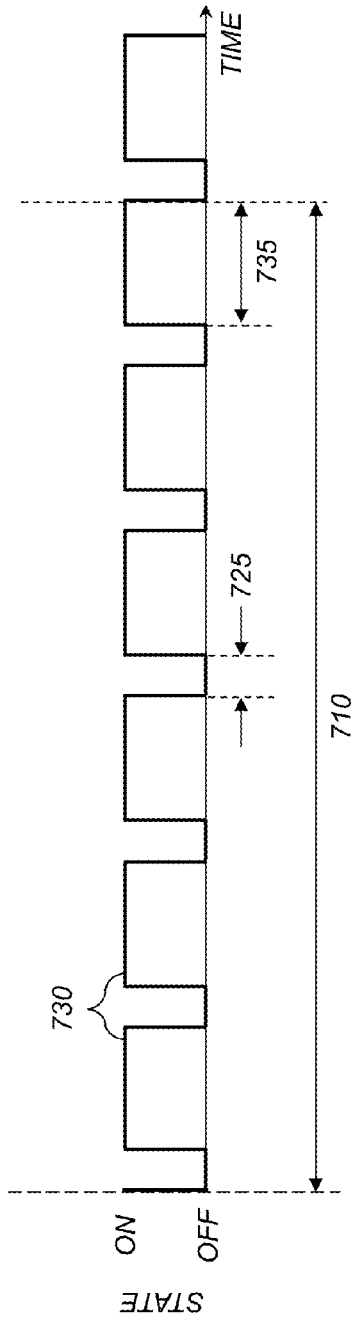

At present, to enable 3-D image presentation, DMD or DLP projectors typically utilize "Triple Flash" projection, where six sub-frames 730, having sub-frame ON times 735, are presented per frame time 710, as depicted in FIG. 15B. In the case of 3-D image projection, the left eye and right eye images are each presented to the eye in an alternating fashion three times per frame. In the case of 2-D projection, the identical frame content is presented in each of the six sub-frames, for an effective frame rate of 144 Hz (which corresponds to a 6.94 ms sub-frame time). Within each of the sub-frames 730, whether for 2-D or 3-D image projection, DMD projection uses a temporal or pulse-width modulation (PWM) scheme on a pixel-wise basis to present the image content according to the corresponding pixel code values. The sub-frames 730 typically have a high duty cycle (~95%), with short blanking times 725 between the sub-frames 730. During the blanking times 725, various periodic timing events, such as polarization switching or DMD global reset functions, can occur without causing on-screen image artifacts. The frame ON time 705 (or the sub-frame ON times 735) represents the time that a particular set of image data are projected to the display surface 190.

In this example, the color required for a given projected image pixel during a particular frame time 710 can be created by projecting with the first set of laser primaries during the odd sub-frames 730 (e.g., 1, 3, 5) and projecting with the second set of laser primaries during the even sub-frames 730 (e.g., 2, 4, 6). The metamerism corrections 530 determined in accordance with the present invention would be different for each set laser primaries. In summary, these exemplary N=6 laser primary projection approaches provide increased spectral color diversity and metameric observer failure image artifact reduction, while only modestly reducing the color gamut and aiding speckle reduction.

It is also noted that spectral color diversity can be increased, and therefore observer metameric failure reduced, by effects applied external to the projector 100 having narrow-bandwidth primaries. In particular, commonly assigned U.S. Pat. No. 8,085,467 to Silverstein et al., entitled "Projection display surface providing speckle reduction", which is incorporated herein by reference, provides a projection screen sparsely coated with fluorescing materials that provide visible fluorescence at wavelengths near or around the visible stimulating light. For example, incident red laser light can cause a visible red fluorescence where the fluorescing bandwidth can be, for example, $\Delta\lambda \sim 30$ nm. While the principal advantage of this screen is to aid speckle reduction, the increase in spectral color diversity that it provides can also reduce the occurrence or magnitude of observer metameric failure among observers 60 of images projected onto the fluorescently enhanced projection screen. Depending on the fluorescing bandwidth $\Delta\lambda$ created, the wide color gamut provided by such a laser based projector 100, can be only modestly reduced.

The previous discussion described methods for reducing observer metameric failure by increasing spectral color diversity using more than three narrow-band primaries, including with the use of spectral color multiplexing, where the same color is generated by different sets of narrow-band primaries. In some embodiments, a spectral color "dithering" aspect can be added, where primaries from the two sets are used in an intermingled fashion to generate the same color within a frame time 710 by changing primary combinations by sub-frame 730 (e.g., sub-frame #1: $\lambda_{b1}, \lambda_{g2}, \lambda_{r2}$; sub-frame #2: $\lambda_{b2}, \lambda_{g1}, \lambda_{r2}$).

Figure 16:
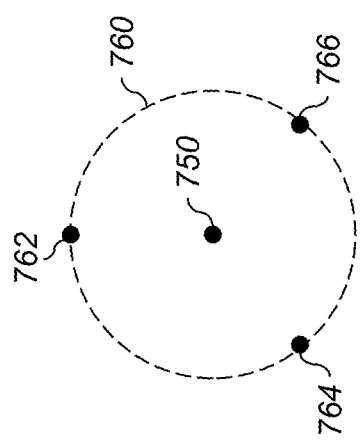
FIG. 16 illustrates a set of dithering colors arranged on a dithering locus around a target color.

Although adding more primaries can help reduce the occurrence of observer metameric failure in displays having narrow-band primaries by increasing spectral diversity, this option complicates the optical design. Thus, it would be desirable to find other opportunities for reducing observer metameric failure effects in three primary systems. As an alternative, color diversity can be provided by performing color dithering about a target color 750 as illustrated in FIG. 16. In particular, for a given target color 750, the intensities of the laser primaries can be modulated in rapid succession on a pixel-wise basis, or group-of-pixels basis, to "dither" the displayed color in a color neighborhood around the target color 750. (Within the context of the present invention, the term "dither" refers to rapidly varying between a series of different states or colors to introduce variation.) Preferably, the target color 750, around which color dithering occurs, is the corrected output color 660 (FIG. 13) determined using the previously described methods. The color dithering can be a random, periodic, or aperiodic modulation of a set of dithering colors 762, 764, 766 arranged on a color dithering locus 760 about the color center (i.e., target color 750). The dithering colors 762, 764, 766 are selected so that they temporally average to provide the colorimetry of the target color 750. The rapid projection of the series of dithering colors 762, 764, 766 will appear to the observers 60 as the target color 750. This mechanism provides display color diversity compared to displaying the target color 750 directly with constant intensity primaries, thereby increasing the likelihood that they can report seeing a common color. As discussed earlier, the magnitude of the perceptual color shifts associated with observer metamerism failure can be substantially different in different parts of color space. Therefore, in some embodiments it can be desirable to adjust the size of the color dithering locus 760 as a function of location in color space in accordance with the magnitude of the associated perceptual color shifts.

This mechanism provides display color diversity compared to displaying the target color 750 directly with constant intensity primaries. As individual observers 60 are stimulated with a larger color space area inclusive of the dithering colors 770, these color space areas will overlap among at least some observers 60, thereby increasing the likelihood that they can report seeing a common color. The color perception averaging aspect of temporal color dithering can be compared to scrolling color projectors that project colored images in rapid sequence; e.g., a red image, followed by a green image and a blue image. In such projectors, if the frame refresh rate is fast enough, the observer does not perceive a sequence of flickering colored images, but rather perceives a temporally integrated multicolored image. By comparison, with temporal color dithering, a projector 100 having a single set of narrow-band primaries ($\lambda_b, \lambda_g, \lambda_r$) can assemble the designated target color 750 for a particular image pixel in a particular frame time 710 (FIG. 15B), by projecting the dithering colors 762, 764 and 766 in sequential sub-frames 730 (FIG. 15B). For example, for a given pixel in a particular image frame 700 (FIG. 15A), the projector 100 can provide sub-frames #1 and #4 with the dithering color 762, sub-frames #2 and #5 with the dithering color 764, and sub-frames #3 and #6 with the dithering color 766. Dithering color 762 can be greener than the target color 750, dithering color 764 can be bluer than the target color 750 and dithering color 762 can be redder than the target color 750. Nonetheless, experiments have shown that observers 60 can perceive a color patch projected with this type of temporal color dithering as color matched to an adjacent color patch that is displayed a constant target color 750.

Figure 17:
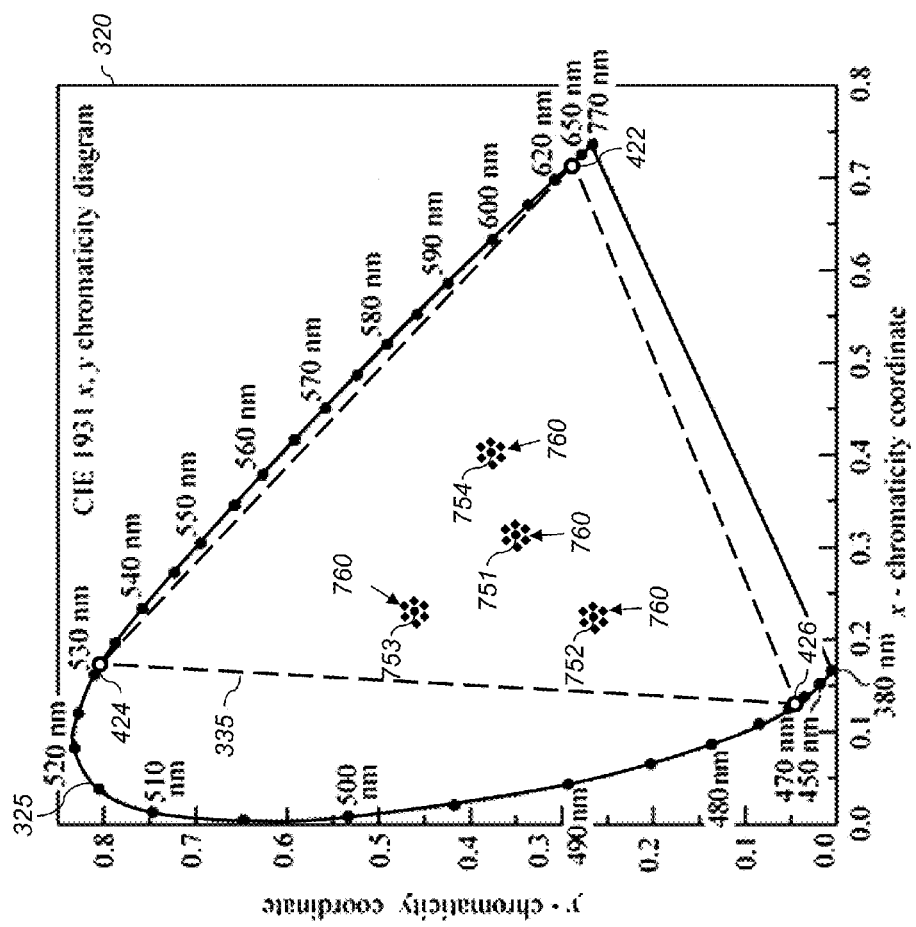
FIG. 17 depicts a set of target colors, each having an associated set of dithering colors.
Figure 18A:
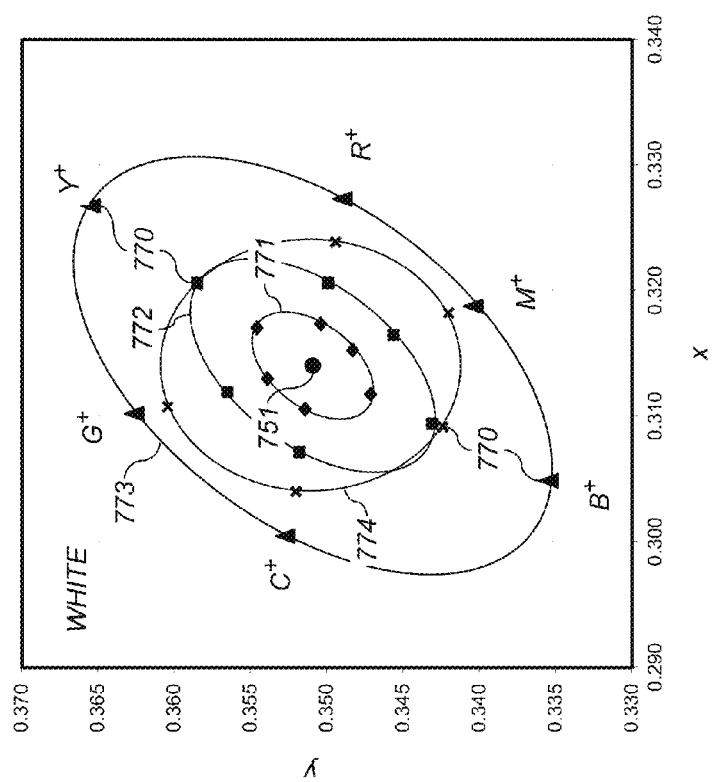
FIGS. 18A-18D illustrate exemplary sets of dithering colors arranged around white, sky blue, grass green and skin colored target colors, respectively.
Figure 18B:
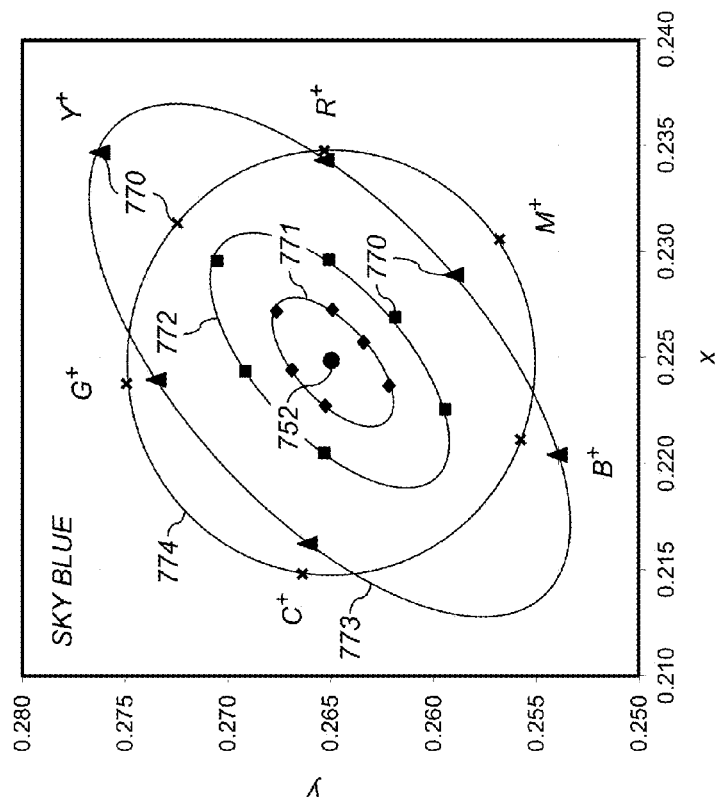
Figure 18C:
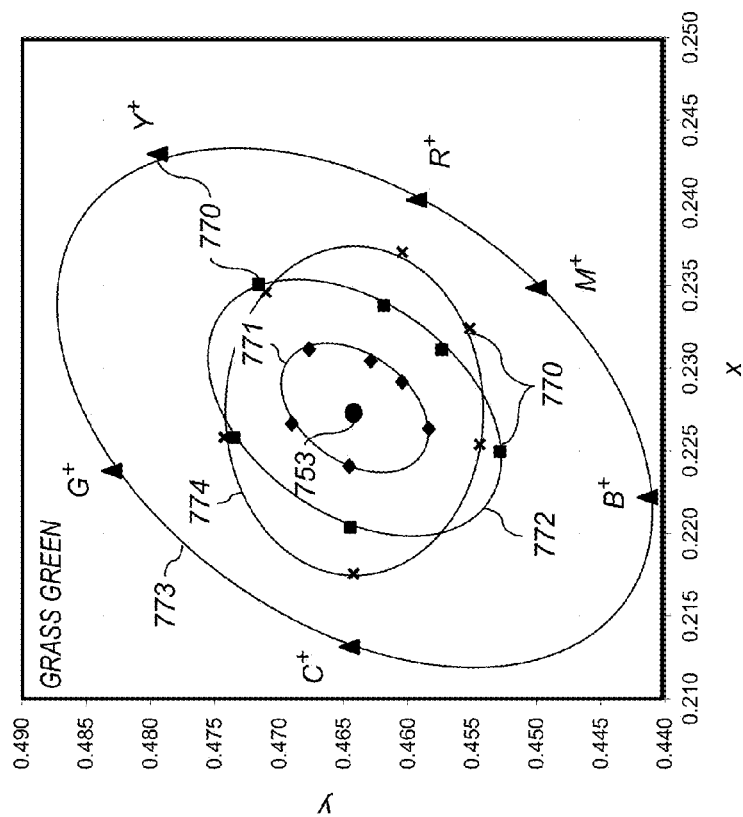
Figure 18D:
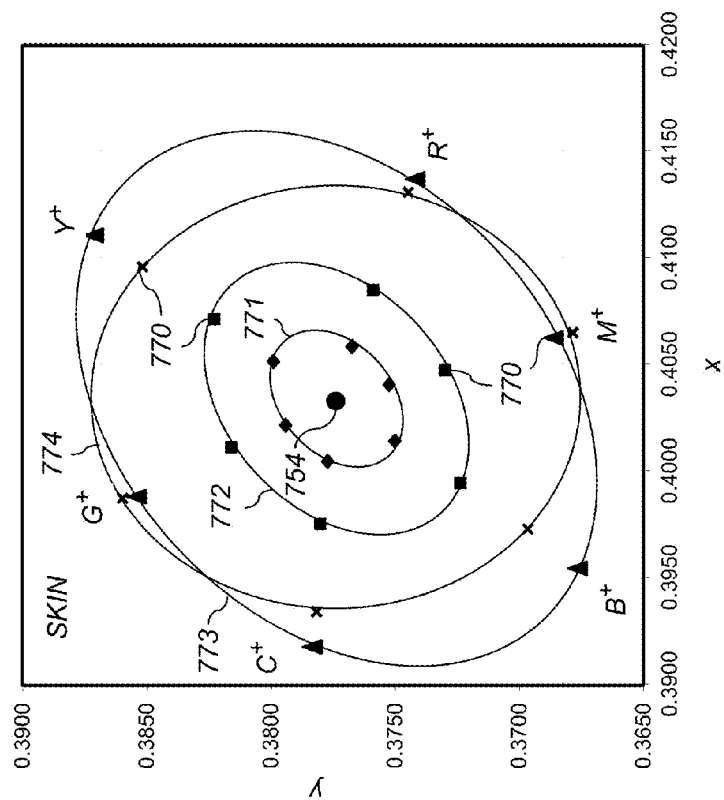

Temporal color dithering is further illustrated in FIG. 17, which depicts a CIE x,y chromaticity diagram 320 outlined by spectrum locus 325, and a laser primary color gamut 335 corresponding to red laser primary 422, green laser primary 424 and blue laser primary 426. Four exemplary target colors 750 (FIG. 16) are indicated by white target color 751, sky blue target color 752, grass green target color 753, and skin tone target color 754. About each target color, a color dithering locus 760 is depicted, which includes a set of distinct dithering colors that can be presented in a temporal sequence and temporally average to appear as the corresponding target color. The dithering colors in each color dithering locus 760 are formed by an appropriate combination of the laser primaries.

To expand on this, FIGS. 18A-18D depict enlarged views of sub-portions of the CIE x,y chromaticity diagram 320 in FIG. 17, that zoom in on the color regions including the white target color 751 (FIG. 14A), the sky blue target color 752 (FIG. 14B), the grass green target color 753 (FIG. 14C), and the skin tone target color 754 (FIG. 14D), respectively. About each of the respective target colors, are a series of exemplary color dithering loci 771, 772, 773 and 774 including dithering colors 770.

The dithering colors 770 can be defined by the magnitude and direction of color shift relative to the respective target color, and the modulation criteria amongst the dither colors. In some embodiments, the well-known MacAdam ellipses can be used as a benchmark in the definition of the dithering colors. The MacAdam ellipses indicate color regions in CIE x,y chromaticity space that contain colors which are indistinguishable to the typical human observer from the color at the center of the ellipse. In particular, colors within the MacAdam ellipses are perceived as being less than 1 JND different from the central color, while colors outside the ellipses are >1 JND different from the central color. In some embodiments, the dithering colors can be defined to lie on a color dither locus corresponding to an ellipse in CIE x,y chromaticity space centered on the respective target color, where the size and orientation of the ellipse is defined based on the MacAdam ellipses to provide a desired number of JNDs of color difference (e.g., 4 JNDs). More generally, the dithering colors 770 by defining appropriate color dithering loci in CIE XYZ, CIELAB, or other color spaces, using a variety of scales or units, including $\Delta E^*$, $\Delta a^*$, $\Delta b^*$, JNDs, or x-y vector lengths, as appropriate.

FIGS. 18A-18D illustrate color dithering loci 771, 772, 773 and 774 that are defined according to various criteria. Color dithering locus 774 is a circle centered on the associated target color with a radius of 0.01 in x-y chromaticity coordinate space, with exemplary dithering colors 770 shown as points distributed around the circle.

While the circular color dithering locus 774 is convenient to define, it has the disadvantage that it is defined based on the CIE x-y chromaticity space, which is known to be perceptually non-uniform. In a preferred embodiment, the color dithering loci is defined such that the dithering colors 770 are at equivalent visual distances from the target color. The CIELAB color space (i.e., L*a*b*) was designed to be approximately visually uniform so that equal distances approximately correspond to equal visual differences. In some embodiments, the color dithering loci can be defined to be a circle in CIELAB having a radius which is a specified number of $\Delta E^*$ units. The dithering points can be defined in terms of their L*a*b* coordinates, and then translated back to corresponding chromaticity coordinates. The color dithering loci 771, 772 and 773 in FIGS. 18A-18D were defined in this manner, with color differences of 1, 2, and 4 $\Delta E^*$, respectively. (A color shift of 1 $\Delta E^*$ can be considered to be approximately equivalent to a 1 JND color change). As FIGS. 18A-18D show, the color dithering loci 771, 772 and 773 are approximately elliptical in shape in the x,y chromaticity space, but of comparable size to the circular color dithering locus 774. Once the color dithering loci are defined, the dithering colors 770 can be distributed around color dithering locus so that they average to provide the corresponding target color.

In considering the color dithering plots FIGS. 18A-18D, for each exemplary color dithering locus 771, 772 and 773 arranged about the corresponding target color, the dithering colors 770 can be distributed in various ways. In some embodiments, they are spaced at certain angles in color space (e.g., equally spaced angles in L*a*b* space or in x-y chromaticity space). For example, they can be positioned at 0°, 60°, 120°, 180°, 240° and 300° relative to the target color. Alternately, the choice of the dithering colors 770 can be based on other considerations, such as whether they lie parallel to the axes of a color space that represents underlying physiological mechanisms of color vision, such as cone contrast or opponent modulation color spaces or other color spaces suggested in the literature. Cone contrast or opponent modulation color spaces are described by Brainard in "Cone contrast and opponent modulation color spaces" (in *Human Color Vision*, $2^{nd}$ edition, Ed. Kaiser and Boynton, Optical Society of America, Washington, D.C., pp. 563-579, 1996).

In some embodiments, the dithering colors 770 are distributed such that they can be achieved by increasing or decreasing the amount of one of the color primaries. That is, colors that are slightly more red ($R^+$), slightly more green ($G^+$), slightly more blue (B⁺) slightly less red (R⁻) (equivalent to more cyan (C⁺)), slightly less green (G⁻) (equivalent to more magenta (M⁺)), or slightly less blue (B⁻) (equivalent to more yellow (Y⁺)), than the target color (T). Other variants are possible, such as using two slightly more red colors ($R_1^+$, $R_2^+$) that are different from each other. The same holds for the green, blue, cyan, magenta or yellow colors.

In some embodiments, the dithering colors 770 are chosen so that they have the same luminance (Y) as the target color. (This will generally require adjusting all three primaries so that the increase in one primary is compensated by decreases in at least one of the other primaries. In some embodiments, the dithering colors 770 can include colors that vary in luminance (Y), either being brighter or dimmer, such as $R^+G1^+B^+G2^+$, where $G1^+$ is brighter than $G2^+$. In this case, the dithering colors should be chosen such that their average luminance matches the luminance of the target color.

Care is required in choosing the dithering colors 770 in order to ensure that the cumulative result of averaging the color shifts gives the same tristimulus values as the target color T. In the case that the dithering colors 770 are equidistant from the target color in $\Delta E^*$ units, averaging to match the target color T can be straightforward. However, dithering colors 770 in a color set can be defined with different shift amounts, such as 4 $\Delta E^*$ units and 2 $\Delta E^*$ units. Small luminance (Y) adjustments can be used to help the temporal color averaging of the dithered colors provide a color match to the target color.

Temporal color dithering can be applied in various sequences, including $R^+G^+B^+$, or $R^+B^+G^+$, $R^+G^+B^+R^-G^-B^-$, or $R^+G^+B^+T$, or $C^+M^+Y^+$, or $C^+M^+Y^+T$, or $R_1^+R_2^+G_1^+G_2^+B_1^+B_2^+$, and so on. The temporal color dithering using a given color set, such as $R^+G^+B^+$, can be repeated or sequenced about the target color, cyclically $R^+G^+B^+R^+G^+B^+R^+G^+B^+$ . . ., as long as the appropriate image content is present at the display surface.

Projection experiments have validated the averaging aspect of temporal color dithering. In particular, a set of observers was shown a first color patch of a static target color (T), and a second color patch comprising a set of temporal sequence of dithering colors 770, such as $R^+G^+B^+$ or $C^+M^+Y^+$ modulated at a 48 fps effective rate. The dithering colors 770 were temporally cycled, to appear in two non-adjacent sub-frames 730 (FIG. 12B) per frame time, which provided color changes without noticeable flicker for most observers. These experiments were performed separately with a broad spectrum Barco digital cinema projector and a laser digital cinema projector having the laser projector spectrum 420 shown in FIG. 5. In both cases, the individual observers generally considered the static color patches and the dithered color patches to be color matched. This was the case even if the dithering colors 770 were shifted by 4 $\Delta E^*$ units from the target color, such that the individual dithering colors 770 had enough color difference to be individually distinctive.

In terms of color averaging to synthesize the target color, the preferred amount of color noise can vary with the target color T. For example, for sky blue, whites and grays, experiments indicated that the desired color noise is preferably 3 or 4 $\Delta E^*$ units, while for the grass green color, 5 $\Delta E^*$ units of color noise was preferred. In these experiments, a color dithering locus 760 having a color set of just three dithering colors 770, such as $R^+G^+B^+$ or $C^+M^+Y^+$, seemed most effective for creating the perception of the target color using nearby colors.

To help in reducing observer metameric failure, the dithering colors 770 should be sufficiently visually distinct from the target color T, so as to provide adequate color variation or display color diversity. Thus, color noise or dithering colors 770 include values preferably altered by 3-5 $\Delta E^*$ or more, and the offsets can be scaled to at least encompass areas of the scatter plot (FIGS. 7A-7D) that include a majority of observers.

The temporal color dithering can be supplied by various methods, including via metameric color corrector 250 (FIG. 4). When colors, which are to be corrected for observer metameric failure, are determined, the metameric color corrector 250 can determine offset colors using an algorithm, a color dependent look up table, or other approaches (for example, random selection from within the color dithering locus 760) and provide the dithering colors 770 as a sequence of color noise on a frame or sub-frame basis. Alternately, metameric color corrector 250 can alter the incoming or original image data using a color noise generator, which pseudo randomly generates dithering colors 770 within a bounded color space that is constrained by rules for the sequence and amount ($\Delta E^*$, $\Delta a^*$, $\Delta b^*$, JNDs, H, L) of color shifting or differencing applied. While dithering colors 770 can be applied to every frame, computational or image processing requirements can be managed by applying changes in a common way for image data for a sequence of frames with similar image content (e.g., a scene).

In some embodiments, the correction or compensation of observer metameric failure among observers 60 (FIG. 2) viewing an image 195 provided by projector 100 having three narrow-bandwidth primaries or color channels is achieved by using the two approaches in combination (i.e., both providing compensating metamerism corrections 530 and temporal color dithering with dithering colors 770). Other methods, such as the previously mentioned fluorescent screen, can be used in combination with one or both of these methods.

It should be understood that the yellow-green shifts shown in FIGS. 7A-7D were determined based on using the Barco DP-1500 projector as an exemplary standard for explaining the present invention. However, in practice, industry participants, including studios, post production houses, directors, cinematographers, and colorists, may use particular displays as a reference standard for determining metamerism corrections 530 and dithering colors 770. For example, Digital Projection Inc. (Kennesaw, Ga.) offers a "Reference Series" of DLP-based projectors for use in critical viewing conditions including post-production houses and screening rooms. It can be expected that the metamerism corrections 530 and dithering colors 770 may be different if a different display or projector is used as the standard.

As represented by FIG. 2 and FIG. 3, the primary emphasis has been on reducing the occurrence of observer metameric failure for observers of a laser-based digital cinema projector. However, it should be understood that the described method for reducing observer metameric failure can be applied more broadly. For example, this method can be applied in laser projectors for other markets, including residential, special event (concert), or museums (planetariums), and for either front screen or rear screen projection geometries. This method is particularly adaptable to projection displays having narrow or moderate bandwidth primaries, including displays using lasers, LEDs, filtered LEDs, visible emitting super luminescent diodes (SLEDs), lamps, or combinations thereof. The method of the present invention can also be applied to projection displays where only some of the primaries or color channels have narrow or moderate spectral bandwidths, while the other primaries have wide spectral bandwidths. Additionally, this method can be applied to electronic displays more generally, including backlit displays, and displays suitable to computer monitors, televisions, and video gaming and other markets. When the temporal color dithering approach is employed, it is required that the display can be modulated fast enough to support the required temporal variations.

Figure 19:
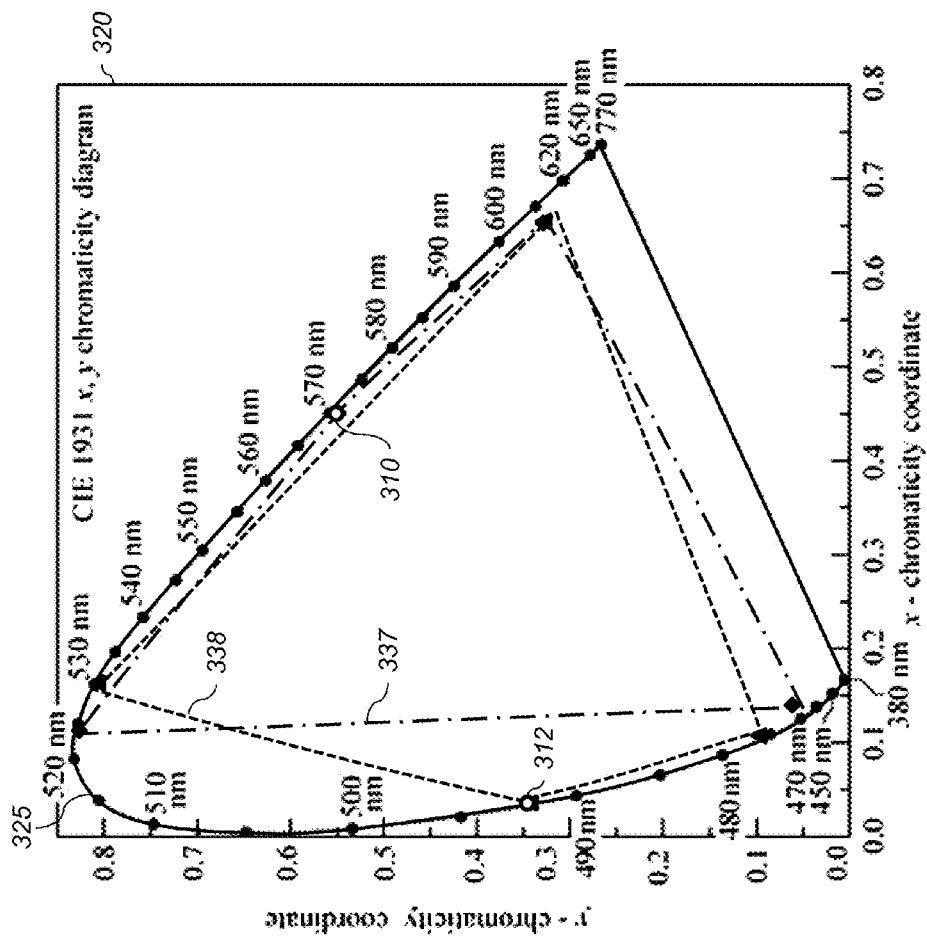
FIG. 19 depicts exemplary wide color gamuts for projection of images in accordance with the present invention.

The projector 100 of FIG. 3 is a three primary display, having red, green, and blue color primaries. However, it should be understood that the method of the present invention for reducing observer metameric failure is extensible to displays having N primaries, and particularly to displays having N>3 narrow-bandwidth primaries. While displays with many primaries, such as N=20, that use the method of the present invention are possible, multi-primary displays having N=4 or N=5 narrow-band primaries are of particular interest for expanding the accessible color gamut. In addition to extending the color gamut, displays with N=4 or N=5 narrow-band primaries can also provide spectral color diversity to reduce observer metameric failure, as discussed previously. FIG. 19 shows a CIE x,y chromaticity diagram 320 depicting two exemplary N=4 primary extended color gamuts: a yellow-enhanced wide color gamut 337 that includes a yellow primary 310, and a cyan-enhanced wide color gamut 338 that includes a cyan primary 312.

The use of a yellow-enhanced wide color gamut 337 is often considered valuable as it includes pure yellows. As noted previously, there are some naturally occurring yellow colors that are very close to the spectrum locus 325 of monochromatic colors. Thus an N=4 primary display that includes a yellow primary may not seem to add much color gamut area as seen in an CIE x,y chromaticity diagram, but there are important colors there, which other color spaces better represent.

Cyan is a common and important color in nature that can be minimally supported by even many wide color gamut displays. Thus, enhancing a display to have N=4 primaries, including a cyan primary 312, to provide a cyan-enhanced wide color gamut 338, can be particularly valuable. In such instances, even if these primaries are narrow-band sources, such as lasers, observer metameric failure can be reduced in creating a target color (T), such as turquoise, by using all 4 primaries at once, or using different combinations of 3 primaries. However, the methods of the present invention, including those for providing compensating metamerism corrections 530 and temporal color dithering with dithering colors 770, can be used with such displays to further reduce the occurrence or magnitude of observer metameric failure. Similarly, an N=5 primary display that includes both a yellow color primary and a cyan color primary can provide both a further extended color gamut and reduced observer metameric failure when using the methods of the present invention.

Selective application of the method for reducing observer metameric failure can also depend on usage dependent circumstances. As an example, television displays are bright and typically viewed in a bright environment, compared to cinema projectors, which typically have a peak luminance that is ~2× dimmer, and which are viewed in dimmer conditions. While both displays can provide viewable images under normal photopic viewing conditions, both can also provide images in dark (mesopic) viewing conditions. This is particularly true for cinema viewing, where the light levels can often slip into the mesopic range, such as when viewing films stylized with many dark scenes. Under such mesopic conditions, the human visual system adapts over time to increase sensitivity, with cone (color) sensitivity diminishing, while rods become increasingly important. As a result, typically human color perception changes dramatically, with the relative perceived brightness of colors experiencing a blue shift that favors perception of blue light relative to the perception of green or red light. Thus, human perception of yellow, orange, and red colors becomes less accurate. Human perception of blue and low green colors also suffers, but less dramatically. In the commonly-assigned U.S. Patent Application Publication 2011/0175925, to Kane et al., entitled "Adapting display color appearance for low luminance conditions", which is incorporated herein by reference, a method is provided for color correcting a display that is being viewed in low luminance conditions to provide a better color appearance for human observers who are experience adaptation shifts. This approach provides display color adjustments based on detected light levels and analysis of the time course of adaptation, but does not provide corrections for observer metameric failure when the display has a narrow or moderate bandwidth primaries. The metameric failure compensation methods of the present invention can be used in combination with the mesopic color correction method. For example, as the viewing conditions become increasingly mesopic, metamerism corrections 530 can be modified to include mesopic viewing color corrections.

It is again noted that various analysis results have been presented using the exemplary embodiments of the present invention where the 1931 CIE 2° standard observer or the 1964 CIE 10° standard observer were used as the reference observer. Additionally, the 10° color matching functions data for the twenty Wyszecki and Stiles observers has been used to represent a set of target observers. In the decades since these data sets have been published, the data has been occasionally criticized, but mostly validated, and not replaced. In particular, even though the 1931 CIE 2° standard observer is relevant as the assumed reference within the DCDM standard, and though the 1964 CIE 10° standard observer may actually be more relevant for cinema viewing conditions, in reality a perfect standard observer model is unlikely to be developed. It is perhaps more likely that color matching functions may be measured for an alternate set of target observers that can replace the WS observers, or alternately, be more relevant for cinema viewing conditions. As a set of target observers, the twenty Wyszecki and Stiles observers represent reasonable demographics as far as age and gender are concerned, although males, Caucasians, and people of ages 16-50 were perhaps over represented. For example, as it was previously noted that human color matching functions vary among individuals are somewhat correlated with observer age, due to yellowing of the eye lenses with age, a broader age demographic may be relevant.

The methods of the present invention can be used with alternate sets of reference observer color matching functions, should appropriate alternatives be developed. As one example, a set of standard observer color matching functions and a set of target observer color matching functions can be developed for demographic sub-groups of target observers, such as youth, and then used when displaying content that is predominately watched by such as an audience. As another example, measurement or assembly of a set of human color matching functions for target observers encountering cinema equivalent viewing conditions can also account for different viewing distances and the simultaneous presence of wide field of view illumination into the eye. In summary, the present inventive methods for reducing observer metameric failure, can benefit from efforts to determine additional color matching functions for one or more sets of relevant target observers.

It is noted that other visual effects aside from observer metameric failure can also occur with narrow-bandwidth primary displays. In particular, these include the Helmholtz-Kohlrausch (H-K) effect and the Bezold-Brücke (B-B) effect.

The H-K effect describes perceived changes in brightness that can occur when humans experience highly saturated light near the spectrum locus 325, while the B-B effect describes perceived changes in hue that humans can experience when viewing bright light of particular wavelengths. For example, due to the B-B effect, high intensity long-wavelength red light (such as 660 nm) can appear to be tinged with yellow. These effects will generally have minimal impact for cinema, due to the typical light levels, the distant position of the audience to the screen, and the typical color content of images. The wavelength or bandwidth of the primaries can also impact the occurrence of these effects. However, these effects are more likely to occur when viewing high luminance displays that provide image content having large areas with bright saturated colors. While such conditions tend to be less critical for color viewing, the observer metameric failure reduction methods of the present invention, or variations thereof that also correct for these effects, can also be applied for these viewing conditions, as is appropriate. For example, when the displayed image content includes large image areas having spectral colors that stimulate the H-K effect, the color signals can be corrected by locally modifying the effective brightness or the displayed color gamut.

A computer program product for implementing the present invention can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the method according to the present invention.

The invention has been described in detail with particular reference to certain preferred embodiments thereof, but it will be understood that variations and modifications can be effected within the spirit and scope of the invention.

PARTS LIST 50 theater
60 observers
100 projector
110b blue illumination assembly
110g green illumination assembly
110r red illumination assembly
115 illumination light
120b blue laser light source
120g green laser light source
120r red laser light source
140 illumination optics
145 illumination lens
150 light integrator
155 mirror
160 combiner
162 first combiner
164 second combiner
170 spatial light modulator
175 image light
180 imaging optics
185 optical axis
190 display surface
195 image
200 data path
210 image file package
220 data input interface
230 data decryption
235 data decompression
240 image processor
245 image corrector
250 metameric color corrector
260 frame buffer
265 modulator timing control
300 color matching functions
300a CIE 2° color matching functions
300b CIE 10° color matching functions
310 yellow primary
312 cyan primary
320 CIE x,y chromaticity diagram
325 spectrum locus
327 line of purples
330 wide-band color gamut
331 red primary
332 green primary
333 blue primary
335 laser primary color gamut
337 yellow-enhanced wide color gamut
338 cyan-enhanced wide color gamut
340 white color coordinate
342 sky blue color coordinate
344 grass green color coordinate
346 skin tone color coordinate
350 chromaticity difference plot
352 average chromaticity difference
355 average color shift
358 inner color gamut
360 transition zone
362 extended color gamut zone
370 aim chromaticity difference
400 film projector spectrum
410 digital cinema projector spectrum
420 laser projector spectrum
422 red laser primary
424 green laser primary
426 blue laser primary
432 Thornton red laser primary
434 Thornton green laser primary
436 Thornton blue laser primary
440 color management method
442 color correction method
444 color correction method
446 color management method
448 color correction method
450 input color values
451 input device model
452 device-independent color values
453 inverse output device model
454 output color values
455 composite color transform
456 inverse output device model
457 output color values
460 metamerism correction transform
461 corrected device-independent color values
462 corrected output color values
463 composite metamerism correction transform
465 metamerism correction transform
466 composite metamerism correction transform
467 composite metamerism correction transform
500 input color XYZ
502 wide-band primaries
504 narrow-band primaries
506 determine wide-band spectrum step
508 wide-band spectrum 510 determine narrow-band spectrum step
512 narrow-band spectrum
514 target observer color matching functions
516 determine perceived color step
518 target observer perceived wide-band color
520 determine perceived color step
522 target observer perceived narrow-band color
524 determine perceived color shift step
526 target observer perceived color shift
528 determine metamerism correction step
530 metamerism correction
540 perceived color shift determination method
545 matching color determination method
550 input color
552 determine wide-band spectrum step
554 determine matching color
556 matching output color
558 determine metamerism correction
560 perceived color shift plot
562 input color coordinate
564 outlier color vectors
565 target observer color vectors
566 average observer color vector
568 average color vector
570 perceived color shift plot
575 color vectors
580 perceived color difference plot
585 target color gamut
590 color difference contour lines
600 metameric failure compensation method
605 metamerism correction data
610 input color
615 inside conventional color gamut test
620 apply full metamerism correction step
625 inside transition zone test
630 apply partial metamerism correction step
635 transition function
640 apply no metamerism correction step
650 continuity function
660 corrected output color
670 linear transition function
675 sigmoid transition function
700 frame
705 frame ON time
710 frame time
725 blanking time
730 sub-frames
735 sub-frame ON time
750 target color
751 white target color
752 sky blue target color
753 grass green target color
754 skin tone target color
760 color dithering locus
762, 764, 766 dithering colors
770 dithering colors
771, 772, 773, 774 color dithering locus

The invention claimed is:

1. A method for color correcting a color image to account for color vision characteristics associated with a set of target observers in preparation for displaying the color image on a color display device having a plurality of device color primaries, at least one of the device color primaries being a narrow-band primary, comprising:

receiving an input color image in an input color space, the input color image having input color values and being adapted for display on a reference color display device having a plurality of input color primaries having associated input color primary spectra;

using a data processing system to apply a metamerism correction transform to the input color image to determine an output color image having output color values in an output color space appropriate for display on the color display device, the output color image having a plurality of output color channels, each of the output color channels being associated with one of the device color primaries, wherein the metamerism correction transform modifies colorimetry associated with the input colors to provide output color values such that an average observer metameric failure is reduced for a distribution of target observers that includes a plurality of target observers who are simultaneously viewing the color display device, the plurality of target observers having disparate color vision characteristics; and storing the output color image in a processor accessible memory.

2. The method of claim 1 wherein the metamerism correction transform is determined by:

defining a set of input color values in the input color space;

for each input color value in the set of input color values determining a corresponding distribution of matching output color values in the output color space, wherein the matching output color values displayed using the device color primaries are determined to have the same color appearance as the input color values displayed using the input color primaries for the distribution of target observers;

determining a set of corrected output color values corresponding to the set of input color values, wherein each corrected output color value is determined in accordance with the distribution of matching output color values; and forming the metamerism correction transform responsive to the set of input color values and the corresponding set of corrected output color values.

3. The method of claim 2 wherein the distribution of matching output color values for a particular input color value is determined by:

displaying a first color patch having colorimetry corresponding to the particular input color value using the input color primaries;

displaying a second color patch having an adjustable output color value using the display color primaries; and for each target observer determining the matching output color value by having the target observers adjust the adjustable output color value until they perceive that the color appearance of the second color patch matches that of the first color patch.

4. The method of claim 2 wherein the distribution of matching output color values for a particular input color value is determined by:

receiving observer-specific color matching functions associated with the plurality of target observers in the distribution of target observers;

determining an input color spectrum produced when the particular input color value is displayed using the input color primaries;

for each target observer using the corresponding observer-specific color matching functions to determine user-specific input colorimetry corresponding to the input color spectrum; and for each target observer determining the matching output color value by determining an output color value that produces corresponding user-specific output colorimetry that substantially matches the user-specific input colorimetry, the user-specific output colorimetry being determined using the observer-specific color matching functions for an output color spectrum produced when the output color value is displayed using the device color primaries.

5. The method of claim 2 wherein the distribution of matching output color values for a particular input color value is determined by:
   receiving observer-specific color matching functions associated with the plurality of target observers in the distribution of target observers;
   combining the observer-specific color matching functions to determine combined color matching functions representative of an average target observer;
   determining an input color spectrum produced when the particular input color value is displayed using the input color primaries;
   using the combined color matching functions to determine input colorimetry corresponding to the input color spectrum; and
   determining the matching output color value by determining an output color value that produces corresponding output colorimetry that substantially matches the input colorimetry, the output colorimetry being determined using the combined color matching functions for an output color spectrum produced when the output color value is displayed using the device color primaries.

6. The method of claim 2 wherein the corrected output color values are determined by computing a central tendency for the distribution of matching output color values, the central tendency being an average, a weighted average, a geometric mean or a median.

7. The method of claim 1 wherein the colorimetry modifications provided by the metamerism correction transform vary for different input color values.

8. The method of claim 1 wherein the input color space is portioned into an inner color gamut zone, an extended color gamut zone, and a transition zone containing the colors between the inner color gamut zone and the extended color gamut zone, and wherein the color metamerism correction transform applies color shifts determined in accordance with the distribution of matching output color values for input color values within the inner color gamut zone and applies no color shifts in the extended color gamut zone, and wherein the color metamerism correction transform provides a smooth transition across the transition zone between the color shifts applied in the inner color gamut zone and the extended color gamut zone.

9. The method of claim 8 wherein a width of the transition zone varies responsive to a size of the color shifts applied in a corresponding portion of the inner color gamut zone.

10. The method of claim 8 wherein the color shifts applied for input color values in the transition zone are modified to maintain continuity of local image content.

11. The method of claim 1 wherein the metamerism correction transform is a parametric function having a plurality of parameters, and wherein the parameters are determined by applying a fitting process responsive to a set of input color values and a corresponding set of output color values determined to reduce average observer metameric failure for the distribution of target observers.

12. The method of claim 1 wherein the metamerism correction transform is a multi-dimensional look-up table that stores output color values corresponding to a lattice of input color values, the stored output color values providing reduced average observer metameric failure for the distribution of target observers.

13. The method of claim 12 wherein the output color values stored in the multi-dimensional look-up table are determined by fitting a smooth function to a set of input color values and a corresponding set of output color values determined to reduce average observer metameric failure for the distribution of target observers.

14. The method of claim 1 wherein a standard color transform is used to transform the input color values in the input color image to standard output color values, the standard color transform being adapted to determine output color values that produce output CIE colorimetry that substantially matches input CIE colorimetry determined for the input color values, the CIE output colorimetry being determined using CIE standard observer color matching functions for an output color spectrum produced when the output color value is displayed using the device color primaries and the input CIE colorimetry being determined using the CIE standard observer color matching functions for an input color spectrum produced when the input color value is displayed using the device color primaries; and wherein the metamerism correction transform transforms the standard output color values to corresponding corrected output color values that account for the color vision characteristics associated with the distribution of target observers.

15. The method of claim 1 wherein the color vision characteristics associated with the distribution of target observers are characterized by a corresponding set of observer-specific color matching functions.

16. The method of claim 1 wherein different color metamerism correction transforms are selected for use responsive to demographics of observers viewing the color display device, or responsive to a state of adaptation for observers viewing the color display device.

17. The method of claim 1 wherein the distribution of target observers is a plurality of target observers determined to be representative of a population of target observers.

18. The method of claim 1 wherein at least one of the device color primaries is provided by a laser light source or an LED light source.

19. The method of claim 1 wherein the narrow-band primaries have a spectral bandwidth of no more than 30 nm.

20. The method of claim 1 wherein the input color primaries include at least one wide-band primary having a spectral bandwidth of at least 45 nm.

21. The method of claim 1 further including displaying the output color image on the color display device, and wherein the color values displayed on the color display device are temporally dithered between a series of dithering colors having colors that surround the output color values.

22. The method of claim 7 wherein the colorimetry modifications that vary for different input color values provide compensating color shifts that correct for color-dependent characteristics in the distribution perceived color differences corresponding to the distribution of target observers.

* * * * *